(12) United States Patent
Kaufman

(10) Patent No.: US 10,726,393 B2
(45) Date of Patent: Jul. 28, 2020

(54) APPOINTMENT SCHEDULING

(71) Applicant: OpenMed, Inc., Windermere, FL (US)

(72) Inventor: Aaron Kaufman, Windermere, FL (US)

(73) Assignee: OPENMED, INC., Windermere, FL (US)

( * ) Notice: Subject to any disclaimer, the term of this patent is extended or adjusted under 35 U.S.C. 154(b) by 804 days.

(21) Appl. No.: 14/196,193

(22) Filed: Mar. 4, 2014

(65) Prior Publication Data

US 2014/0249878 A1 Sep. 4, 2014

Related U.S. Application Data

(60) Provisional application No. 61/772,407, filed on Mar. 4, 2013.

(51) Int. Cl.
*G06Q 10/10* (2012.01)

(52) U.S. Cl.
CPC .............................. *G06Q 10/1095* (2013.01)

(58) Field of Classification Search
None
See application file for complete search history.

(56) References Cited

U.S. PATENT DOCUMENTS

| 7,188,073 | B1* | 3/2007 | Tam | G06Q 10/02 705/5 |
| 7,742,954 | B1* | 6/2010 | Handel | G06Q 30/08 705/26.5 |
| 8,244,566 | B1* | 8/2012 | Coley | G06Q 10/109 705/7.11 |
| 2002/0035572 | A1* | 3/2002 | Takatori | G16H 40/20 |
| 2002/0040324 | A1* | 4/2002 | Dunning | G06Q 30/02 705/26.81 |
| 2002/0049753 | A1* | 4/2002 | Burrows | G06F 17/30622 |

(Continued)

OTHER PUBLICATIONS

Bookeo. Web Archive, Mar. 27, 2012, <www.bookeo.com>. (Year: 2012).*

(Continued)

*Primary Examiner* — Christine M Behncke
*Assistant Examiner* — Abhijit B Sadananda
(74) *Attorney, Agent, or Firm* — Andrew M. Calderon; Roberts Calderon Safran & Cole, P.C.

(57) ABSTRACT

Systems, methods and/or services that allocate and schedules appointments based on supply and demand. In an example, a method is implemented in a computer infrastructure having computer executable code tangibly embodied on a computer readable storage medium having programming instructions operable to: gather information of a plurality of suppliers from one or more external sources, prior to a registration process for scheduling an appointment request from a consumer; validate the gathered information of the plurality of suppliers; receive a request from the consumer for scheduling of an appointment with one or more of the plurality of suppliers which meet consumer criteria; enable swapping, purchasing and auctioning of appointments; enable virtual visits and virtual visit queues for on demand virtual appointments; provide system agnostic calendar integration, and provide available suppliers to the consumer based on the consumer criteria.

29 Claims, 28 Drawing Sheets

(56) References Cited

U.S. PATENT DOCUMENTS

| | | | | |
|---|---|---|---|---|
| 2002/0082865 | A1* | 6/2002 | Bianco | G06F 19/3481 |
| | | | | 705/2 |
| 2002/0116232 | A1* | 8/2002 | Rapp | G06Q 10/02 |
| | | | | 705/5 |
| 2003/0225729 | A1* | 12/2003 | Maloche | G06F 17/30867 |
| 2005/0060324 | A1* | 3/2005 | Johnson | G06Q 30/06 |
| 2005/0102245 | A1* | 5/2005 | Edlund | G06Q 50/188 |
| | | | | 705/80 |
| 2008/0097817 | A1* | 4/2008 | Solaru | G06Q 10/06311 |
| | | | | 705/7.13 |
| 2008/0115196 | A1* | 5/2008 | Michel | G06Q 10/109 |
| | | | | 726/4 |
| 2008/0307323 | A1* | 12/2008 | Coffman | G06Q 10/109 |
| | | | | 715/753 |
| 2009/0094088 | A1* | 4/2009 | Chen | G06Q 10/06312 |
| | | | | 705/7.19 |
| 2009/0138283 | A1* | 5/2009 | Brown | G06Q 10/109 |
| | | | | 705/3 |
| 2009/0164236 | A1* | 6/2009 | Gounares | G06Q 10/00 |
| | | | | 705/2 |
| 2009/0307104 | A1* | 12/2009 | Weng | G06Q 30/02 |
| | | | | 705/26.2 |
| 2009/0313046 | A1* | 12/2009 | Badgett | G06F 19/327 |
| | | | | 705/3 |
| 2010/0011073 | A1* | 1/2010 | Kachaylo | G06Q 10/10 |
| | | | | 709/206 |
| 2011/0125545 | A1 | 5/2011 | Lehmann et al. | |
| 2011/0191122 | A1* | 8/2011 | Kharraz Tavakol | G06Q 10/10 |
| | | | | 705/3 |
| 2012/0023012 | A1* | 1/2012 | Brousseau | G06F 17/30867 |
| | | | | 705/39 |
| 2013/0030843 | A1* | 1/2013 | Schoenberg | G06Q 10/06375 |
| | | | | 705/3 |
| 2013/0218622 | A1* | 8/2013 | MacKenzie | G06Q 10/1093 |
| | | | | 705/7.19 |
| 2014/0257903 | A1* | 9/2014 | Herscovici | G06Q 10/1095 |
| | | | | 705/7.19 |

OTHER PUBLICATIONS

Booker Service Management Platform. Web Archive, Jan. 18, 2013, <www.booker.com>. (Year: 2013).*

SkedgeMe. Web Archive, Dec. 11, 2011, <skedge.me>. (Year: 2011).*

International Search Report and Written Opinion dated May 20, 2014 in related PCT Application No. PCT/US2014/020274. 13 pages.

International Preliminary Search Report dated Sep. 8, 2015 in related Application No. PCT/US2014/020274, 1 page.

* cited by examiner

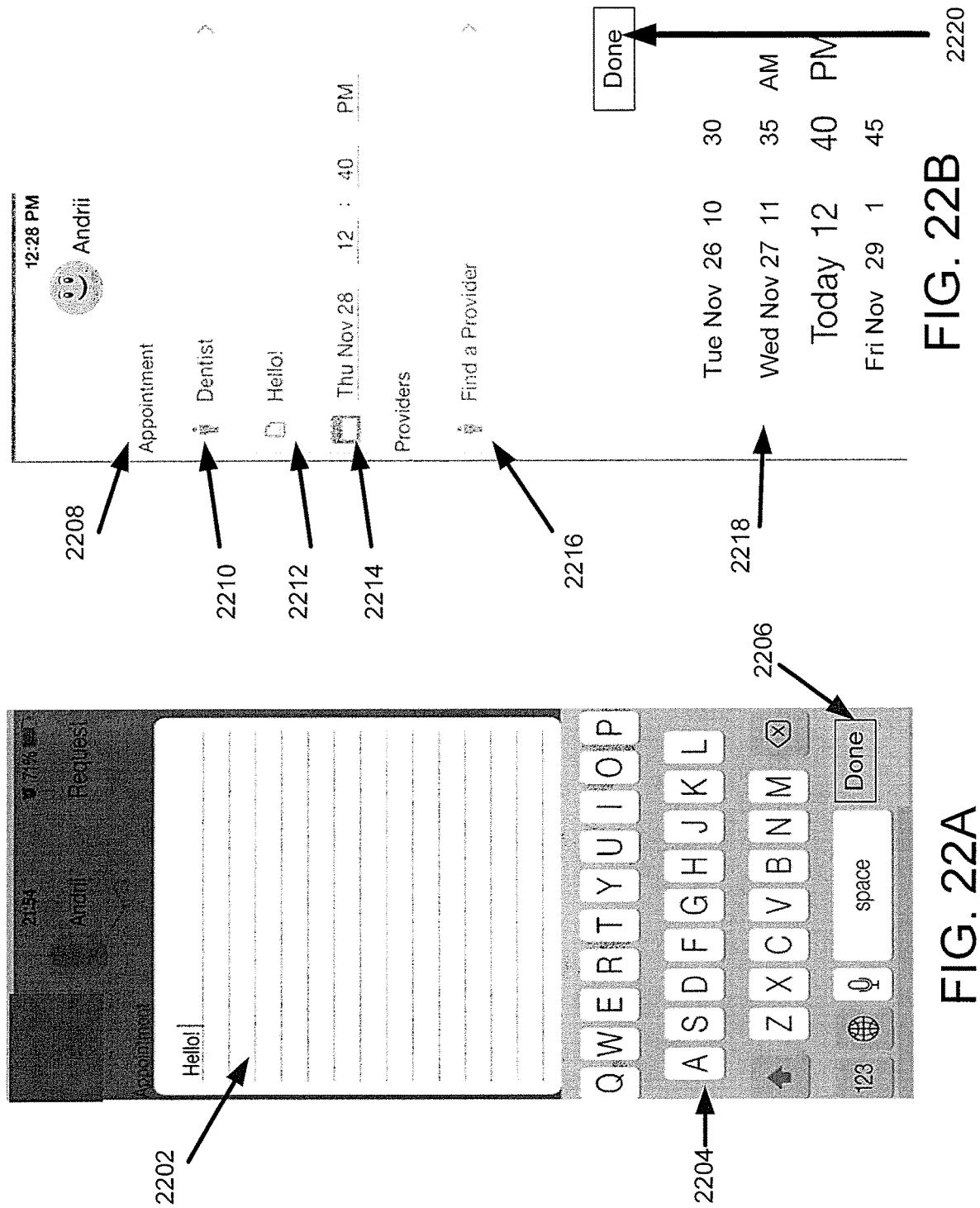

APPOINTMENT SCHEDULING

FIELD OF THE INVENTION

The present invention generally relates to appointment scheduling, and more particularly, to methods, systems and/or services that allocate and schedule appointments based on supply and demand.

BACKGROUND

In scheduling appointments, an individual or an organization may use a variety of different devices (e.g., telephone, computer, etc.) and methods to request and schedule appointments. For example, a consumer may schedule an appointment using a telephone to request an appointment with a supplier of services, e.g., doctor, beautician, mechanic, attorney or provider of services, etc. Based on the supplier's availability, e.g., schedule, the requested appointment may be accepted or, alternatively, when the appointment time is unavailable, a different time can be suggested and accepted. This can be a cumbersome and costly process, particularly for the supplier. For example, the supplier may need a dedicated person for scheduling appointments thereby increasing overhead costs significantly.

Also, if a requested time is not available, then the consumer may have to contact another supplier, repeating this same process. As such, scheduling an appointment (e.g., a doctor's appointment) may be time consuming, requiring contacting more than one supplier before an appointment request is acceptable to all involved parties. This may thus include the cumbersome process of finding other suppliers within a certain geographical area, or a supplier that has an acceptable reputation or expertise, etc. To find such a supplier, the consumer may have to consult with insurance companies, friends, colleagues or a host of other avenues, all of which are time consuming and even at times frustrating.

Additionally, once an appointment is scheduled, changing the appointment time may be difficult. This includes, for example, contacting the supplier and requesting another appointment time which may or may not be available. Also, in many known arrangements, if the appointment is not canceled within a certain time period, a penalty may be charged to the consumer. This is typically termed a cancellation fee. So, it is imperative for the consumer to reschedule an appointment within a certain time frame, which is not always possible or even practical. For example, an emergency can arise within the certain time period. In this scenario, there may be no way to avoid the cancellation fee.

SUMMARY

In a first aspect of the invention, a method is implemented in a computer infrastructure having computer executable code tangibly embodied on a computer readable storage medium having programming instructions operable to: gather information of a plurality of suppliers from one or more external sources, prior to a registration process for scheduling an appointment request from a consumer; validate the gathered information of the plurality of suppliers; receive a request from the consumer for scheduling of an appointment with one or more of the plurality of suppliers which meet consumer criteria; and provide available suppliers to the consumer based on the consumer criteria.

In another aspect of the invention, a computer program product for scheduling appointments comprises program code stored in a storage medium for implementation on a computing device to: gather information of a plurality of non-registered suppliers from one or more external resources; receive a request from a consumer for scheduling of an appointment with one or more suppliers; provide one or more perceived available suppliers to the consumer, based on consumer criteria received from the consumer; and provide a calendar to the consumer of selected ones of the one or more perceived available suppliers, for entry of dates by the consumer to schedule the appointment.

In a further aspect of the invention, a mobile application system comprises program instructions to: send a request from a consumer to schedule an appointment with one or more suppliers that meet one or more consumer criteria; receive one or more available suppliers of a plurality of registered and/or non-registered suppliers that meet the one or more consumer criteria; provide a perceived calendar of a selected one or more available suppliers of the plurality of registered and non-registered suppliers, for entry of dates by the consumer to schedule the appointment; and send the perceived calendar with the dates for the scheduled appointment to the selected one or more available suppliers for confirmation of the scheduled appointment or proposed alternate dates. The program instructions are stored on computer readable storage medium for execution by a CPU.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 14, 15, 16A, 16B, 17A, 17B, 18A, 18B, 19-21, 22A, 22B, 23A, 23B, 24-26, 27A, 27B, and 28 show example screen shots implementing aspects of the present invention.

DETAILED DESCRIPTION

Figure 1:
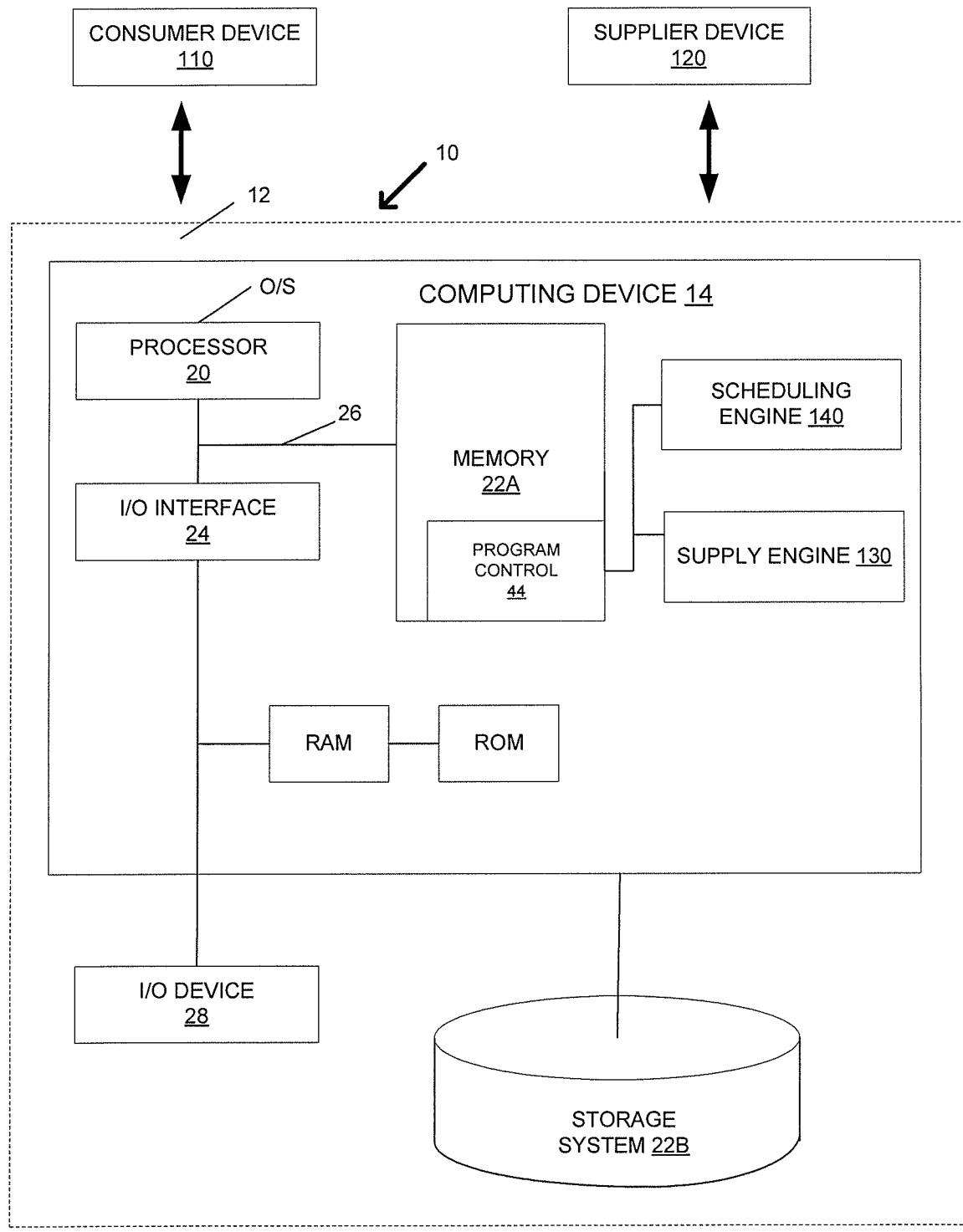
FIG. 1 shows an illustrative environment for implementing the steps in accordance with aspects of the invention.

The present invention generally relates to appointment scheduling, and more particularly, to methods, systems and/or services that allocate and schedule appointments based on supply and demand. Advantageously, the present invention can be implemented with a variety of different suppliers of services such as, for example, doctors, beauticians, mechanics, architects, lawyers, salons, or other service providers, etc. Also, the present invention can be scalable based on supply and demand, allowing many different transactions between different consumers, suppliers and even between consumers, themselves. Moreover, the network scheduling capability of the present invention allows for boundaries to be removed between consumers and suppliers by allowing collaboration amongst many different actors (suppliers and consumers) in a mass ecosystem to achieve ideal appointment times. This is true for both consumers and suppliers. For example, on the supplier side, the present methods, systems and/or services allow for a larger pool of options for schedule fulfillment with access to a larger consumer base, thereby significantly increasing revenue opportunities. By way of example, this can be accomplished by efficiently and timely scheduling appointments, filling gaps in a schedule, and rescheduling appointments or accommodating in another manner cancelations.

On the consumer side, the scheduling system of the present invention advantageously allows the consumer to simultaneously contact multiple suppliers for scheduling of an appointment using a single, integrated system. In embodiments, by using the single, integrated system, the consumer can select one or more suppliers using a host of different consumer criteria, ranging from specialties, geographic location, educational background, user ratings, etc. This provides the consumer with the flexibility and ease to select any number of suppliers when attempting to schedule appointments without having to individually schedule with the supplier directly. The single, integrated system also allows consumers to swap, purchase, auction or perform a host of other transactions with other consumers and/or suppliers, simplifying the processes of canceling, rescheduling or trading appointments. This can lead to: (i) increased revenue streams for the supplier due to, for example, a potential reduced number of cancelations and (ii) the ability and flexibility of a consumer to find other consumers that are willing to purchase or trade scheduled appointments thus avoiding, for example, cancelation fees.

In embodiments, the present invention is system agnostic and is thus not platform dependent. That is, the scheduling system of the present invention allows for multiple users to request and schedule appointments with multiple suppliers without the need for any a single type of operating system, type of device, or a system of devices, thus considered a multi-channel application Accordingly, the present invention allows for the scheduling system to occur externally from suppliers and consumers, thus allowing for a large scale system for appointment scheduling with multiple suppliers and consumers.

As such, it should be understood that the present invention allows for a variety of advantageous features and functionality including, amongst others:

(i) allowing consumers to request appointments and enter into existing appointments through a single system and/or portal with any supplier;

(ii) allowing consumers to purchase or swap appointments with other consumers, e.g., with or without a fee or within an auction market setting;

(iii) allowing consumers to fulfill their scheduling requests and suppliers to fulfill their resource and revenue requirements in a synergistic capability;

(iv) allowing consumers an opportunity to easily reschedule or cancel appointments without being charged a cancellation fee;

(v) allowing suppliers to offer available appointments and verify existing appointments with consumers upon scheduling changes and/or initial appointments;

(vi) allowing suppliers to verify existing appointments with consumers upon scheduling changes and/or initial appointments;

(vii) allowing suppliers to directly integrate their existing scheduling systems with the scheduling system of the present invention, but this is not a requirement;

(viii) allowing suppliers to minimize lost revenue when users reschedule or cancel appointments;

(ix) removing the burden from suppliers to determine cancellations, rescheduling and consumer availability;

(x) allowing suppliers access to a larger consumer pool and additional options for scheduling fulfillment;

(xi) allowing the supplier to opt into a remote video/voice enabled service capability "visit" queue, such as "telehealth", or a scheduled remote visit, such that services can be provided to the consumer over the Internet, world wide web or other remote means, for example; and/or (xii) creating a network scheduling capability where technology boundaries and limitations are removed between different users, creating collaborative relationships between consumers and suppliers.

As such, the present invention overcomes the challenges associated with scheduling appointments and making changes to previously scheduled appointments. The challenges overcome by the present invention include, for example, dealing with a volume and scale of requests for cancellation of appointments and reducing lost revenues and resources for individuals and/or organizations that occur due to changes in previously scheduled appointments. Furthermore, the present invention overcomes the challenges associated with an individual supplier appointment booking workflow, such as limitations of scale and capabilities of an individual supplier's resources (e.g., a doctor's office). For example, resources that can limit an appointment scheduling system include the supplier's network and computing resources, employee resources, and/or other types of resources.

Additionally, the present invention creates a universe of supplier information that creates a perception by the consumer that there are multiple suppliers who are registered with the scheduling system, as described herein. As such, consumers are attracted into using the scheduling system due to the volume of perceived suppliers which, in turn, attracts suppliers to register with the system upon receiving appointment requests from consumers (e.g., due to the number of potential new consumers amongst other reasons). By having such a network of suppliers, much of the burdens are now taken from the consumer in finding an appropriate and/or desirable supplier of services.

Aspects of the present invention may be embodied as a system, method or computer program product. Accordingly, the present invention may take the form of a hardware embodiment, a software embodiment or a combination thereof. Furthermore, the present invention may take the form of a computer program product embodied in one or more computer readable storage medium(s) having computer readable program code embodied thereon. The computer readable storage medium may be a computer readable storage medium, memory and/or device, all of which are referred to as computer readable storage medium(s). The computer readable storage medium is a tangible, physical storage such as a portable computer storage medium (e.g., USB Drive), a hard drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible, non-transitory medium that can contain or store a program for use by or in connection with an instruction execution system, apparatus, or device.

FIG. 1 shows an illustrative environment 10 for managing the processes and/or services in accordance with the invention. The environment 10 includes a server 12 or other computing system that can perform the processes described herein. A consumer device 110 and supplier device 120 can be connected to the environment using any networking paradigm. Consumer device 110 and supplier device 120 can be any computing device capable of being used to send and/or receive information to and from the server 12, in accordance with aspects of the present invention. While FIG. 1 shows a single consumer device 110 and supplier device 120, access and communication between multiple consumer devices and supplier devices are contemplated by the present invention.

In particular, server 12 includes a computing device 14. The computing device 14 can be resident on a network infrastructure or computing device of a third party service provider (any of which is generally represented in FIG. 1). The computing device 14 includes a processor 20 (e.g., CPU), memory 22A, an I/O interface 24, and a bus 26. The memory 22A can include local memory employed during actual execution of program code, bulk storage, and cache memories. In addition, the computing device includes random access memory (RAM), a read-only memory (ROM), and an operating system (O/S). The computing device 14 can use the computer readable storage medium, noted above, or the computer readable storage medium can be part of the computing device, e.g., implemented as memory, RAM, ROM, storage system 22B, etc By way of example, the program code can be stored in the computer readable storage medium to direct the computing device 14 to function in a particular manner, such that the instructions stored in the computer readable storage medium produce an article of manufacture. The computer program instructions may also be loaded onto the computing device 14 to cause a series of operational steps to be performed thereon to produce a computer implemented process for implementing the functions/acts specified in the flowcharts described herein. The computer program instructions (code) can be provided in any combination of any known languages.

The computing device 14 is in communication with external I/O device/resource 28 and storage system 22B. I/O device 28 can comprise any device that enables an individual to interact with computing device 14 (e.g., user interface) or any device that enables computing device 14 to communicate with one or more other computing devices using any type of communications link.

The processor 20 executes computer program code (e.g., program control 44), which can be stored in memory 22A and/or storage system 22B. In accordance with aspects of the invention, program control 44 controls a supply engine 130 and/or scheduling engine 140, e.g., the processes described herein. Supply engine 130 and scheduling engine 140 can be implemented as separate, dedicated modules or as combined modules. Additionally, supply engine 130 and/or scheduling engine 140 may be implemented as separate dedicated processors or a single or several processors to provide the function of these tools. While executing the computer program code, the processor 20 can read and/or write data to/from memory 22A, storage system 22B, and/or I/O interface 24. The bus 26 provides a communications link between each of the components in computing device 14.

In embodiments, supply engine 130 gathers, validates, and stores information regarding suppliers and/or consumers. For example, in embodiments, supply engine 130 can communicate with other computing devices (e.g., servers on the Internet, Intranet, etc.) and trawl information to obtain/gather information associated with suppliers of services throughout a geographical region (e.g., country of use), with different specialties, backgrounds, combinations thereof and/or other criteria. In this way, when a consumer logs onto the systems of the present invention, all known and practicing suppliers, e.g., doctors, would be shown as available for appointment scheduling, even though all suppliers may not yet be registered with the system of the present invention to supply services. The registration of the suppliers and participation in the services would be irrelevant and unknown (e.g., opaque) to the consumers. In this way, the systems, processes and/or services of the present invention would appear completely integrated to the consumer, e.g., complete with all suppliers being registered and participating. This provides the consumer with the perception that the suppliers are already registered with the systems and services of the present invention, thus providing the advantage of the system appearing to be completely seamless to the consumer and offering nearly all suppliers of their interest to request an appointment to.

In an example, supply engine 130 can request and obtain information from other servers or sources about medical doctors or other suppliers. This information can be obtained using, for example, spiders, crawlers, requests from multiple sources, etc. Illustratively, the retrieved information may include doctor's name, address, phone number, email address, specialty, years in practice, insurance network participation, etc. Furthermore, supply engine 130 can analyze (validate) the information and remove (i.e., cleanse) certain information thus resulting in only valid information for each supplier. For example, supply engine 130 may receive unnecessary or incorrect information about a doctor, e.g., incorrect address information, and, thus, supply engine 130 can remove and/or correct this information through a verification process and, in embodiments, manual intervention. Once supply engine 130 has validated the information, the information can be stored for use by consumers for scheduling appointments. The information can also be used to send messages to selected suppliers for participation and/or registration into the systems, processes and/or services of the present invention. For example, supply engine 130 may send a message to a dentist, directly or via scheduling engine 140, requesting the dentist to register with scheduling engine 140, in order to schedule a current and/or future appointment with a consumer through the systems, processes and/or services of the present invention. In more specific embodiments, upon a request to schedule an appointment with a non-registered supplier, the supply engine 130 may send a message to the supplier requesting the supplier to register with the systems and/or services of the present invention prior to confirming/accepting the appointment or suggesting alternate appointments.

If the supplier registers, then the registration information may be received by scheduling engine 140 and sent to supply engine 130 to validate the information. In embodiments, the validation may include the use of validation codes, confirmation messages, etc., to ensure that the information received is from the supplier, as disclosed further herein. Accordingly, supply engine 130 can provide validated information to scheduling engine 140 which can then schedule appointments for consumers. If a supplier does not respond, supply engine 130, or scheduling engine 140, can send more messages and escalate the number and types of messages until the supplier responds and registers, or a threshold number of messages have been sent at which time the registration process will time out. Upon a supplier registering with the system, details in the supply engine are further confirmed/modified by the supplier with proper credentialing in place by the system to validate the changes the supplier is making. In embodiments, some information is validated by human process and not only by the systems and/or processes of the present invention.

In embodiments, scheduling engine 140 may be used to schedule appointments between consumers (e.g., users) and suppliers (e.g., doctors, dentists, lawyers, etc.). In embodiments, prior to scheduling appointments from a consumer and/or receiving any confirmation by a supplier to accept the appointment request, scheduling engine 140 may receive information from consumer device 110 to register the consumer and schedule appoints, as well as information from supplier device 120 to schedule appointments using scheduling engine 140, amongst other things described herein.

In embodiments, consumer device 110 and supplier device 120 may be any type of device (e.g., computer, laptop, smart-phone, etc.) that can communicate via wire or wireless mechanisms with supply engine 130 and/or scheduling engine 140 or, more generally, computing device 14. Consumer device 110 and supplier device 120 may have a user interface resident on their devices natively, but communicates via headless interfaces with the computing device 14, or provided user interface via the computing device 14 or other service, to interface with the applications of the present invention, e.g., allows users to make a particular request (e.g., request an appointment, cancel an appointment, accept an appointment request, etc.). For example, consumer device 110 may have an application, downloaded on consumer device 110, which allows the user to input information and register with a scheduling system associated with scheduling engine 140. In embodiments, the user interface allows the consumer to enter information and schedule appointments, such as:

(i) name or any other type of user identifier made up of numbers, letters, and/or symbols;

(ii) demographic information, such as age, gender, ethnicity, etc.;

(iii) address information, such as a home address, work address, email address, etc.;

(iv) insurance information, such as health insurance information that may include a name of the insurance provider, health plan type, health plan design, a policy number, a group number, and contact information for the insurance provider;

(v) name and demographic information about themselves and other individuals, such as family members covered by a particular insurance policy and who may use the scheduling system to schedule appointments;

(vi) preferences of the consumers, such as types of suppliers (e.g., doctors, dentists, mechanics, etc.), education of suppliers or a host of other criteria, communication and notification preferences, and schedules for family members or surrogate members in which the user can make or change, etc;

(vii) preferences such as, for example, recommendations for appointment times if a requested appointment time is not available (e.g., no appointments on a particular day, no appointments during the afternoon, etc.), notifications of upcoming appointments (e.g., receive a notification the day of the appointment, one hour before the appointment, etc.), auctioning activities, solicitation for their appointment time by other consumers, etc.;

(viii) financial information, such as credit card or banking information (e.g., account information, routing numbers, etc.);

(ix) security information such as a password, fingerprint detection, audio detection, etc.;

(x) contact information, such as phone number, email address, etc.; and/or (xi) any other type of information that can be used for registration and scheduling, swapping, and/or placing appointments in a marketplace.

Once the consumer has provided the registration information, the systems and processes of the present invention may store the registration information in consumer device 110 and/or scheduling engine 140 or more generally in the storage system 22B of the computing device 14. Scheduling engine 140 can store the consumer's registration information in a database, e.g., storage system 22B, and use the information to further assist the consumer in scheduling appointments, such as cancelling appointments, rescheduling appointments, swapping appointments, auctioning appointments, in addition to providing other activities such as promotions, etc. In more specific embodiments, the systems, processes and/or services of the present invention may provide a calendar to the consumer, shown on the interface, to assist in the scheduling of appointments. The calendar, or more specifically, the appointment request can be, for example, a facsimile of the service supplier calendar, in order to facilitate appointment scheduling.

Furthermore, supplier device 120 may also have an application, which allows the supplier to input information and register with the scheduling system of the present invention, e.g., engines 130 and 140. In embodiments, the supplier may register with supply engine 130 and schedule an appointment using the scheduling engine 140 upon receiving an initial appointment request from scheduling engine 140. Regardless, the supplier may provide information, via the user interface on supplier device 120, such as:

(i) name of the supplier, such as a person's name or business entity name;

(ii) type of services provided by the supplier, such as skill set (e.g., medical, dental, legal, etc.) and any particular specialization (e.g. orthodontics, pediatric cardiology, etc.);

(iii) types of insurances accepted or not accepted;

(iv) preferences regarding appointment requests, e.g., only be notified for appointment requests during a particular time and/or day;

(v) preferences regarding notifications for upcoming appointments, canceled appointments, allowing double/triple/etc. bookings, not to accept appointments from consumers with poor track records on no-shows or cancelations, etc.;

(vi) financial information, such as which forms of payment they accept (e.g. credit cards are accepted or other banking information);

(vii) security information, such as a username, password, etc.;

(viii) contact information, such as a phone number, email address, etc.;

(ix) hours of operation, e.g., lunch closing hours, open and close times, vacation times, etc.; and/or (x) any other type of information that can be used for registration with the scheduling system.

Once account information is received and stored, scheduling engine 140 may begin the scheduling process, e.g., schedule appointments through the systems, processes and/or services of the present invention. This may include accepting scheduled appointments, canceling appointments, rescheduling appointments and/or requests to swap appointments. Further, once account information received from supplier device 120 is received and stored, scheduling engine 140 may receive from supplier device 120 requests to accept/deny an appointment from one or more consumers. In embodiments, consumer device 110 and supplier device 120 may display the request for the appointment, displayed in a calendar format, a list format, or any other type of format on either or both of the consumer device 110 and the supplier device 120.

By way of an illustrative example, scheduling engine 140 may receive a request for a new appointment from consumer device 110 and determine whether to send the request to supplier device 120 based on registration information. For example, the scheduling engine 140 can determine that the supplier is registered and, from the supplier's profile or access through the supplier's calendar, automatically provide the consumer with a notification that no appointments can be scheduled at certain times of the day, etc. This information can also be provided to the consumer, prior to supplier registration, from information initially received by the supply engine 130 through its request to obtain information from other sources. The request for an appointment and response thereto may be sent as an email message, a text message, a phone call, or any other type of communication method. The request may be to a particular supplier or to any supplier that has a particular profile, such as a type of service (e.g., dentistry), a geographic location (e.g., within 10 miles of the user's location), a particular gender (e.g., female doctor, male doctor, etc.), availability, and/or any other type of requirements of the user. In embodiments, the consumer can simultaneously request an appointment from multiple suppliers (e.g., "blast" a request to multiple suppliers), in order to determine which supplier has available the requested scheduled appointment. Once the request is sent, the systems, processes and/or services of the present invention can provide a confirmation notice to the consumer, e.g., notifying the consumer that the request has been received and is being processed.

The scheduling engine 140 can also interact with third party websites, systems, etc., to integrate directly to currently existing scheduling systems, websites, etc., to capture availability denoted by the supplier. For example, scheduling engine 140 can use web scraping techniques to capture scheduling information from schedules of clinics, acute care centers, etc., and directly integrate times into their systems.

In embodiments, scheduling engine 140 may determine whether time is available for the requested appointment by comparing available times in the supplier's calendar. If time is available, supplier device 120 may send a message to scheduling engine 140 that the request for the appointment can be fulfilled. In turn, scheduling engine 140 can send a message to consumer device 110 that the request for the appointment has been accepted. As such, the message to consumer device 110 may update an application stored on consumer device 110 to include the appointment time and date in a format (e.g., calendar format, list format, etc.) that can be saved by the application. Additionally, the scheduled appointment can be saved in a database stored by scheduling engine 140 which allows for scheduling engine 140 to provide further assistance to the users of consumer device 110 and supplier device 120. For example, scheduling engine 140 can, based on the saved appointment information, send reminders, and/or assist in the rescheduling of the appointment if any changes arise.

Alternatively, if time is not available, supplier device 120 may send a message to scheduling engine 140 that the request for the appointment cannot be fulfilled. The message may include alternate times and/or dates that can be provided to consumer device 110. Accordingly, scheduling engine 140 can send a message to consumer device 110 that the requested time and/or date for the appointment is not available and that alternate times and/or dates are available. As such, the user of consumer device 110 can accept one of the alternate times and/or dates. Once an alternate time and/or date is accepted, consumer device 110 saves information about the appointment and a message, including the alternate time and/or date, is sent to scheduling engine 140. Scheduling engine 140 can store the alternate time and/or date to provide further assistance to the users of consumer device 110 and supplier device 120.

In addition, if a singular request is made to a single supplier and the supplier accepts the request, the appointment is considered booked. However if the request is sent to multiple suppliers (e.g., appointment blast), the default action is that the user must still accept the appointment from the supplier that accepted the requested date/time. This is a preference that the user can toggle to auto accept the first supplier that accepts the requested scheduled appointment. It is contemplated that in most cases using the appointment blast, the user will wait for their preferred supplier to respond to the requested scheduled appointment. If, in the case, the scheduled appointment request times out and there are one or more accepted appointment by suppliers for the requested scheduled time, then the systems and/or processes of the present invention will select the first supplier accepted time for the consumer.

In embodiments, once the user of consumer device 110 has scheduled an appointment, at a later time, scheduling engine 140 may receive another request from the same or another consumer device 110 to swap or purchase the scheduled appointment with an appointment with a new time and/or with a different supplier. Scheduling engine 140 may, using a database of stored appointments associated with users, then contact other consumer devices 110 to determine whether they would be interested in swapping or purchase their appointment with another appointment time. Additionally, or alternatively, scheduling engine 140 may use a database that includes information about available appointments from different suppliers. By initiating the request to change an appointment time and/or date, scheduling engine 140 may charge the consumer a fee for swapping or a fee for purchasing their appointment time with another appointment time. This fee can be shared amongst all of the actors, e.g., supplier, service provider implementing the systems, processes and/or services of the present invention, and other consumer which accepted the swapped appointments, and even the system, thus providing a financial incentive. In embodiments, swapping or changing of appointments can also be provided without a fee.

In further embodiments, scheduling engine 140 may implement an auction system that facilitates consumer bidding for particular appointment times. Scheduling engine 140 may use an auction process, such as a Dutch auction, English auction, sealed first price auction, and/or any other type of auction system to implement a market for appointment times. As such, appointment times which have a greater demand may result in a higher price than those appointment times that have a lower demand. Additionally, or alternatively, scheduling engine 140 may implement a reverse auction system that results in different suppliers bidding for a particular appointment time. This results in a lower price to the consumer, while maintaining efficient and most productive scheduling practices. Preferences set by the consumers and providers can be made to opt-in or opt-out of such an arrangement of auctions.

Accordingly, scheduling engine 140 may implement the present invention using different modules and/or applications to improve user experience and increase supplier productivity, e.g., reducing the amount of time and human resources needed to schedule appointments, change appointments, and/or cancel appointments. In this way, scheduling engine 140 may can maximize the number of appointments for the supplier and, as a result, increase revenue stream.

The appointment, and thus revenue optimization, can also occur from scheduling engine 140 (or other module/engine of the systems and/or processes of present invention) learning and making recommendations to the supplier as to what type of appointments to capture and when to have them. For example, the scheduling engine 140 can provide information to the supplier about the consumer such as, for example, missed appointments, late arrivals, canceled appointments or other historical consumer information, in order for the supplier to make an educated decision as to whether an appointment should be scheduled and, if so, for what time. In this way, such additional information provided to the supplier when scheduling an appointment with a particular consumer, can be used with the goal of optimizing revenue and scheduled appointments. By way of illustration, if the consumer has a history of cancelations or missed appointments, scheduling engine 140 can schedule an appointment during off peak hours, e.g., when the supplier typically has a light schedule for appointments.

While FIG. 1 describes the present invention in terms of supply engine 130 and/or scheduling engine 140 as intermediary devices between consumer device 110 and supplier device 120, alternate embodiments of the present invention can allow consumer device 110 and supplier device 120 to communicate with each other directly on a fee basis. For example, consumer device 110 may send a message, such as a request to cancel an appointment, to supplier device 120, associated with a supplier. At the same time, the request to cancel the appointment can be sent to scheduling engine 140 so that scheduling engine can store the request. Furthermore, supplier device 120 may send a message to consumer device 110, such as accepting the request to cancel the appointment. The acceptance message can also be sent to scheduling engine 140 to store information that the supplier, associated with supplier device 120, has accepted a cancellation. Thus, scheduling engine 140 can maintain information about appointments while allowing the devices to communicate with each other without having to use scheduling engine 140 for every communication.

Also, it should be understood that in aspects of the invention the systems and processes and/or services can be implemented in a mobile communication device, e.g., smart phone, table, etc, as a mobile application implemented in such a hardware device. This will make the mobile communication device capable and operable to perform any combination of functions described herein. For example, the mobile application can allow a user schedule, swap and auction appointments. Also, leveraging mobile device specific notification capabilities, such as and not limited to: (i) in app notifications; (ii) SMS; (iii) email; and/or (iv) other device notification capabilities.

Figure 2:
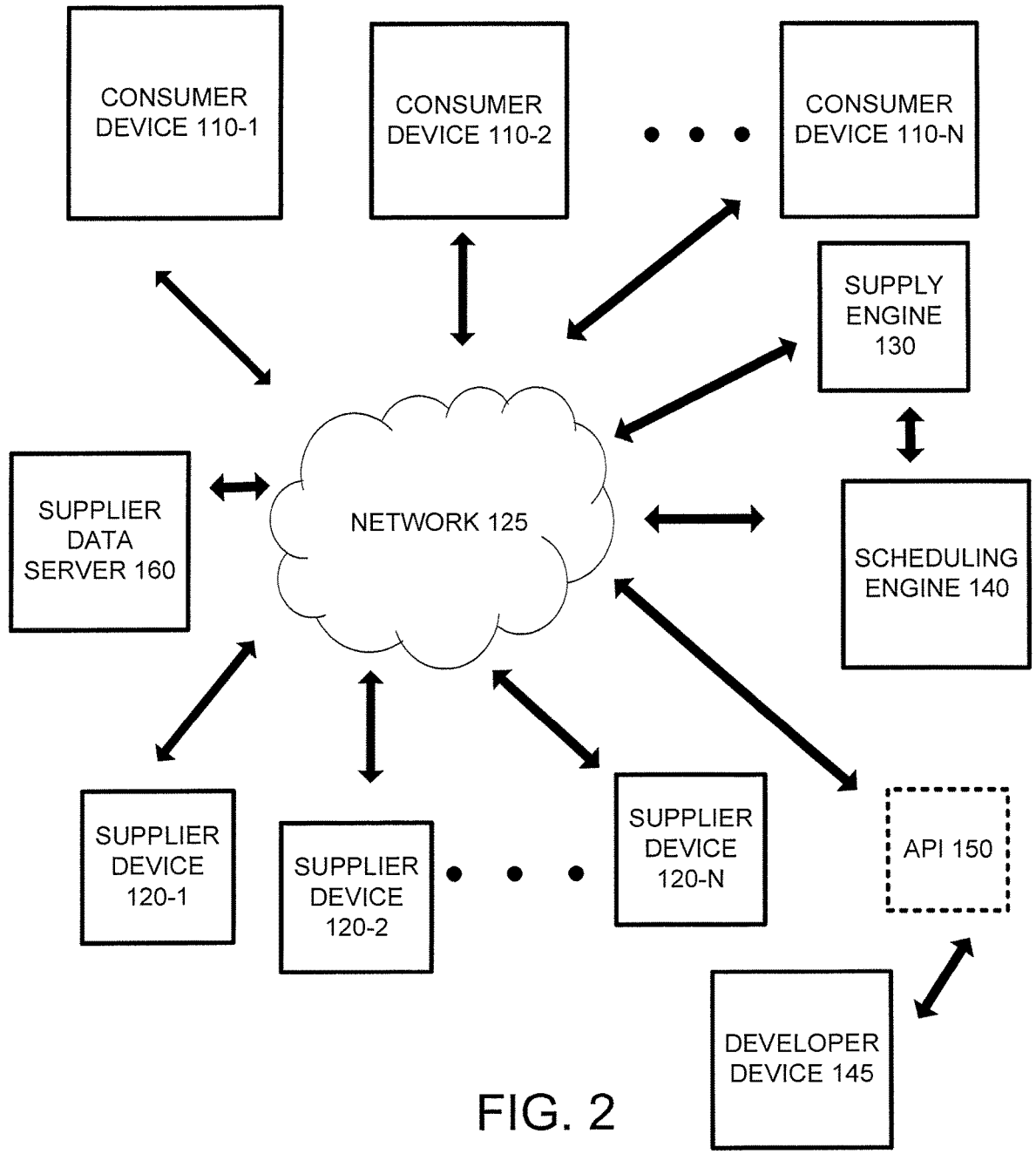
FIG. 2 shows an example network diagram in accordance with aspects of the present invention.

FIG. 2 shows an example network system in accordance with the aspects of the invention. Specifically, FIG. 2 shows consumer devices 110-1, 110-2 . . . 110-N (hereinafter referred to in the singular as consumer device 110 and in the plural as consumer devices 110), supplier devices 120-1, 120-2 . . . 120-N (hereinafter referred in the singular as supplier device 120 and in the plural as supplier devices 120), network 125, supply engine 130, scheduling engine 140, developer device 145, application programming interface 150, and supplier data server 160.

Consumer device 110 and supplier device 120 may include any computation or communication device that is capable of communicating with a network (e.g., network 125). In embodiments, consumer device 110 and supplier device 120 can receive and/or display content, which can include, for example, objects, data, images, audio, video, text, and/or links to files accessible via one or more networks. In embodiments, consumer device 110 and supplier device 120 can store different types of applications, such as mapping applications, scheduling applications, calendar applications, and/or other types of applications. By way of more specific example, supplier device 120 may display the request for the appointment to determine whether the request for the appointment can be fulfilled. The availability of times for an appointment request may be displayed in a calendar format, a list format, or any other type of format on either or both of the consumer device 110 and the supplier device 120.

Network 125 may include one or more networks that allow for communication between different devices (e.g., consumer device 110, supplier device 120, supply engine 130, scheduling engine 140, etc.). In embodiments, network 125 can comprise an Internet, Intranet, local area network (LAN), wide area network (WAN), a GPS network, radio access network, a wireless fidelity (Wi-Fi) network, a Worldwide Interoperability for Microwave Access (Wi-MAX) network, a cellular network, and/or a combination of these or other networks.

Supply engine 130 may include one or more devices and/or applications that allow for the gathering, validating, and storing information as described herein. For example, as described in FIG. 1, supply engine 130 can send messages to other devices, such as supplier data server 160, to obtain information about plural suppliers (e.g., doctors, dentists, lawyers, etc.), for consumer use and future supplier registration. Further, supply engine 130 can analyze the information and validate the information, in addition to receiving information directly from the supplier and validating the received information by using a credentialing process. The supply engine 130, advantageously, provides information such that the consumer has a seamless experience, regardless of whether the supplier is a registered user. This is accomplished by obtaining and validating supplier information prior to actual registration of the supplier.

Scheduling engine 140 may include one or more devices and/or applications that allow for the scheduling of appointments. As described in FIG. 1, scheduling engine 140 is configured and/or structured to allow for scheduling requests for appointments between consumer devices 110 and supplier devices 120. Further, scheduling engine 140 is configured and/or structured to allow for users of one consumer device 110 to swap appointments, cancel appointments, etc. In embodiments, scheduling engine 140 can also allow the supplier to opt into a virtual visit, such as "telehealth", queue such that services can be provided to the consumer over the Internet, world wide web or other remote means, for example. By way of example, the supplier can opt into a virtual visit, such as telehealth, queue under the following conditions: (i) canceled or missed appointment; (ii) down time of the supplier and/or consumer and/or (iii) supplier preference. Also, if offered by the supplier, an online visit with suppliers that provide services remotely can be directly scheduled.

Additionally, as described herein, scheduling engine 140 can also implement auctioning processes, etc. The scheduling engine 140, advantageously, provides information to the consumer and supplier in a seamless manner, regardless of whether the supplier is a registered user. This is accomplished by providing calendaring events to both the supplier and consumer to facilitate scheduling of appointments and requests thereof, even if the supplier is not yet a registered user.

In embodiments, for example, using the obtained supplier information, prior to registration, the scheduling engine 140 can use previously obtained information, e.g., office hours, to assist in the initial request for scheduling of an appointment. For example, the consumer may request an appointment at a time known to be unavailable by the systems, processes and/or services of the present invention, e.g., lunch hour of the supplier. The present invention can automatically provide a notification that such time is unavailable and request the consumer to select another time, known to be available by the scheduling engine 140, amongst other features and functionality described herein.

Developer device 145 may include any computation or communication device that is capable of communicating with a network (e.g., network 125) and other devices shown in FIG. 2. In embodiments, developer device 145 creates applications that, via application programming interface 150, are used to change the parameters of how scheduling engine 140 schedules and changes appointments, allows for third party developers (e.g., health plans) to develop their own white labeled version of a scheduling apparatus detailed in this invention, and how supply engine 130 can obtain information. In addition, the developer device 145 can be used to change the interface of the applications, the requested information, or other functionality and/or features of the present invention.

Application programming interface (API) 150 specifies how software components interact with each other. In addition to accessing databases or computer hardware, such as hard disk drives or video cards of any of the components of the present invention, the API 150 can be used to ease the work of programming graphical user interface components. In practice, the API 150 comes in the form of a library that includes specifications for routines, data structures, object classes, and variables. An API specification can take many forms, including an International Standard such as POSIX, vendor documentation such as the Microsoft Windows API, RESTful services, the libraries of a programming language, e.g., Standard Template Library in C++ or Java API. Web APIs are also a vital component of today's web fabric. In embodiments, API 150 allows for a computing device to communicate with scheduling engine 140 and supply engine 130 to create, update, change, etc. different parameters (e.g., rules for auctions, rules for verification, rules for notification, rules for storage, etc.) and act as a software development kit (SDK) to enterprises and third parties wishing to leverage the network and the systems, processes and/or services of the present invention.

Supplier data server 160 may include any computation or communication device that is capable of communicating with a network (e.g., network 125). In embodiments, supplier data server 160 can store information about multiple suppliers (e.g., dentists, doctors, architects, lawyers, mechanics, hair salons, or other service providers, etc.). In embodiments, supplier data server 160 may itself have data-mined other servers and computing devices within a networking environment to receive the supplier information. In embodiments, supply engine 130 may send requests/messages to supplier data server 160 to obtain non-validated supplier information. Alternatively, supplier data server 160 may automatically send supplier information to supply engine 130.

Figure 3:
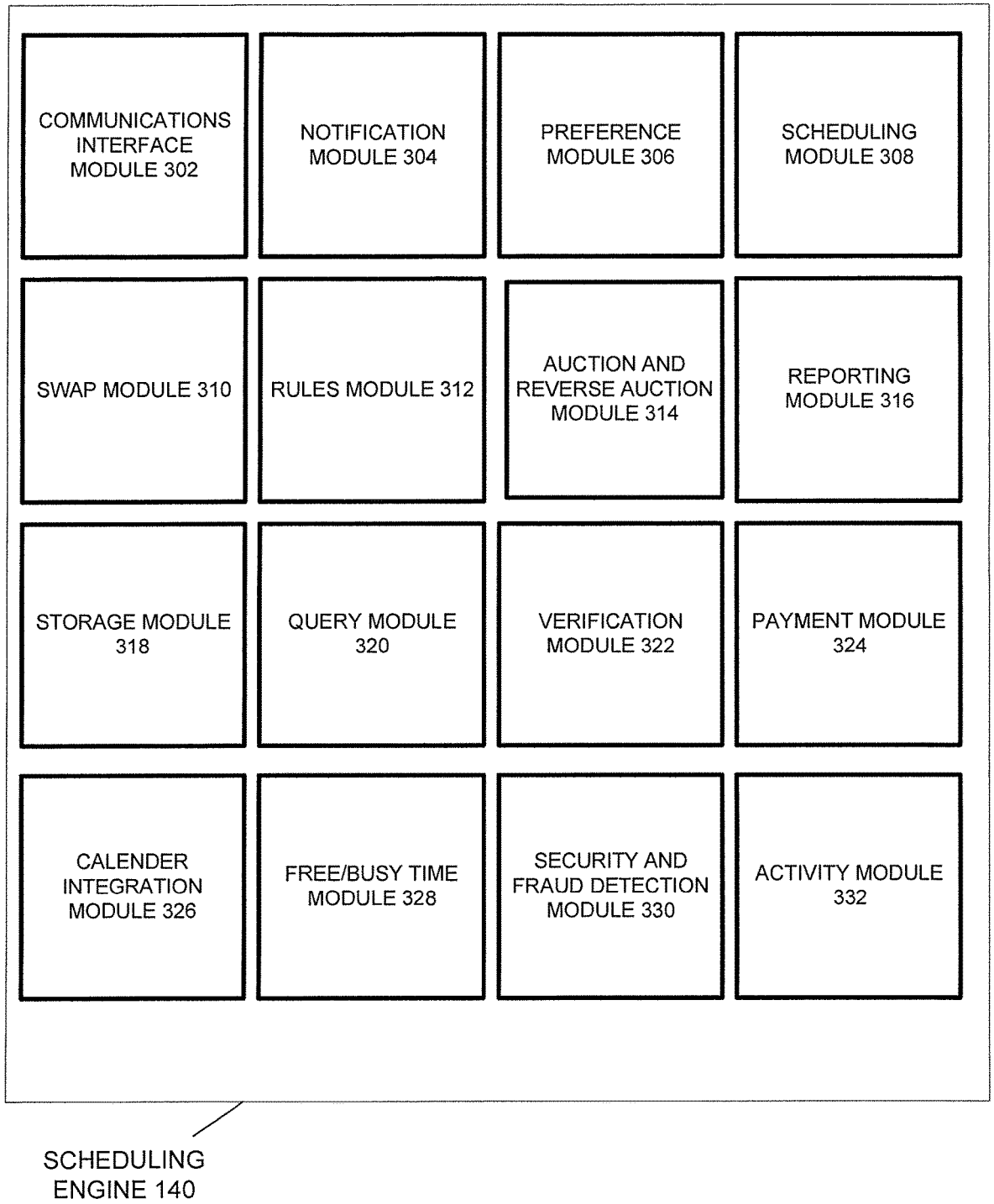
FIGS. 3 and 4 show example block diagrams implementing modules in accordance with aspects of the present invention.

FIG. 3 shows an example block diagram of scheduling engine 140 in accordance with aspects of the present invention. Specifically, FIG. 3 shows several modules which are implemented by the scheduling engine 140. These modules can be implemented as separate, dedicated modules or as combined modules. Additionally, these modules may be implemented as separate dedicated processors or a single or several processors to provide the function of these tools, as discussed in FIG. 1. These modules include: communication interface module 302, notification module 304, preference module 306, scheduling module 308, swap module 310, rules module 312, auction and reverse auction module 314, reporting module 316, storage module 318, query module 320, verification module 322, payment module 324, calendar integration module 326, free/busy time module 328, security and fraud detection module 330, and activity module 332. Each module within scheduling engine 140 can communicate with one or more other modules within scheduling engine 140 and also with one or more modules within supply engine 130, as well as the other devices and computing systems described herein, particularly as shown and described with regard to FIGS. 1 and 2.

In embodiments, communication interface module 302 communicates information from the scheduling engine 140 to other devices, such as supplier devices, consumer devices, supply engine, and/or other devices via a networking environment. In embodiments, communication interface 302 is a multi-channel communications engine. For example, in embodiments, communication interface module 302 can utilize different types of communication processes (e.g., telephone, email, facsimile, text messages, short message service (SMS) messages, multimedia message service (MMS) messages, messages via access point network gateway associated with long term evolution (LTE) networks, etc.) to send and receive information amongst different components and devices used within the environment of the present invention. In embodiments, communication interface module 302 can be implemented on a web based platform, and can provide for telephone and facsimile communications. By way of example, communication interface module 302 can digitize voice communications in order to notify a supplier of appointments and request registration, via the telephone.

In embodiments, notification module 304 generates messages to consumers and suppliers regarding different aspects of scheduling appointments. The messages can be sent using communications interface module 302. In embodiments, notification module 304 can be based on a pull or push system, to generate an acceptance or rejection message based on when scheduling engine 140 receives an appointment request and determines whether the appointment time is available. Furthermore, notification module 304 can generate a cancellation notification based on scheduling engine 140 receiving a cancellation request from a consumer device. The cancellation notification can be sent to other consumer devices and/or supplier devices, via various modes of communication through communication interface module 302. Additionally, or alternatively, notification module 304 can generate messages that are sent to consumer devices regarding a request to swap an appointment time or a message indicating that an appointment time is available for auction, purchase, etc. These notifications can be set up based on consumer and/or supplier preferences, e.g., text message vs. email. In embodiments, notification module 304 can generate these notifications by itself or with rules module 312 and communication interface module 302 creates a message format for the communication channel.

In embodiments, preference module 306 allows for scheduling engine 140 to use supplier and consumer preferences in association with creating appointments, scheduling changes, swapping, purchasing, auctioning appointments and/or other functionality described herein in any combination. In embodiments, preference module 306 can store or obtain different preferences of the consumers and/or suppliers, and analyze the stored information to make determinations as to how to manage appointment scheduling, etc. Preferences may include, for example, preferred doctors, geographical locations for appointments, educational background of the supplier, times for appointments, gender preferences, e.g., female or male doctor, preferred age, race, etc. of the supplier, suppliers that accept certain insurance information, communication preferences (e.g., text vs. email), participation in swapping and purchasing of appointments, amongst limitless other preferences. For example, preference module 306 can extract from stored consumer information that a particular consumer is only interested in appointments with doctors who are within a specific geographic region (e.g., within Miami, within a zip code, etc.) and/or during only particular times of the day. On the supplier side, preferences may include accepting new patients on only certain days or with certain types of insurance, etc. Thus, preference module 306 extracts preference information which is used by other modules (i.e., scheduling module 308) to schedule appointments with appropriate suppliers.

In embodiments, scheduling module 308 schedules appointments amongst consumers and suppliers. In embodiments, scheduling module 308 can interact with consumers, via communications interface module 302, to schedule appointment times that are (i) sent to a scheduling application on the consumer device to populate a calendar within the scheduling application, (ii) send messages to the supplier that the appointment has been scheduled, and (iii) send a message to storage module 310 to store the scheduled appointment time between the consumer and the supplier. In embodiments, scheduling module 308 can store the availability of the supplier, whether it be integrated with the systems and/or processes of the present invention, or manually entered by the supplier.

In embodiments, scheduling module 308 can receive preference information from preference module 306 to determine whether requested appointment times meet the consumer and/or supplier preferences. For example, if scheduling engine 140 receives a request from a consumer for an appointment on Saturday at 4:00 p.m. with Dr. Smith, scheduling module 308 may determine that Dr. Smith does not work on Saturdays. Scheduling module 308 may then communicate with notification module 304 to send a message to the consumer that Dr. Smith is not available for appointments on Saturdays.

In embodiments, swap module 310 coordinates swapping of appointments between consumers and/or suppliers. In embodiments, swap module 310 can send notifications, using notification module 304 and, e.g., communications interface module 302, from one consumer to another consumer requesting an appointment swap. For example, Tom may have scheduled a 10:00 a.m. appointment with Dr. Smith on Monday; but, Tom wants to change the appointment to 2:00 p.m. with Dr. Smith on Monday. Jane, though, has an appointment with Dr. Smith at 2:00 p.m., on Monday. Swap module 310 may determine based on preference information, via preference module 306, that Jane is interested in swapping appointments. Thus, swap module 310 can send a notification to Jane that Tom is requesting an appointment swap. If Jane accepts, swap module 310 can implement and process a swap of appointments between Jane and Tom. In embodiments, swap module 310, in conjunction with, e.g., scheduling engine 308 and communication interface module 302, sends messages to the scheduling applications to change Jane's and Tom's respective calendars. Furthermore, swap module 310, in conjunction with, e.g., scheduling engine 308 and communication interface module 302, sends a message to Dr. Smith regarding the swap and to update the scheduling application of Dr. Smith.

In embodiments, rules module 312 determines how each module within scheduling engine 140 operates. Rules module 312 may receive new rules and updated rules via an application programming interface which allows for developers to change the operation of scheduling engine 140 or manually through code submitted into the system. In embodiments, rules module 312 can store rules regarding communications, notifications, preferences, scheduling, swapping, reporting, auctioning, storage, verifying information, preventing fraud, receiving payments, registration processes and/or any other operational feature regarding how suppliers and consumers can interact with each other. By way of illustrative, non-limiting example, rules module 312 can include a set of escalation rules designed to notify a supplier to register with the systems, processes and/or services of the present invention. Illustratively, the rules can include first contacting the supplier by telephone (via a digitized voice), and if no response is received, by email, and if still no response is received, by mail or facsimile. In embodiments, the rules can also include time out provisions, e.g., after no response is provided by the supplier, the systems, processes and/or services will end contacting/registration activities within a predetermined time. Similarly, the systems, processes and/or services can be timed out if the systems, processes and/or services is activated by a consumer, but there is no activity for a specified time. The rules module 312 can also provide consumer action items escalation (e.g., alert the suppliers of the demand every few hours). The rules module 312 can also provide escalation for the consumer when the supplier responds with alternative times.

In embodiments, auction and reverse auction module 314 initiates and conducts auctions between different consumers and/or suppliers. In embodiments, auction and reverse auction module 314 may receive information from preference module 306 regarding whether particular consumers are interested in auctioning their scheduled appointment. For example, Jane may not be able to attend a 3:00 p.m. dental appointment with Dr. Jones. Since Jane does not want to incur any cancellation fee, Jane may send a message to scheduling engine 140 that she is interested in auctioning her appointment time. Auction and reverse auction module 314 may also receive from preference module 306 or scheduling module 308, which consumers are interested in a dental appointment with Dr. Jones. Thus, auction and reverse auction module 314 may send messages, via notification module 304 and/or communication interface module 302, to consumers interested in bidding for Jane's appointment time. In embodiments, auction and reverse auction module 314 may use rules, generated by rules module 312, to initiate an auction. In embodiments, the auction can be a silent auction, a Dutch auction, an English auction, or reverse auction etc., performed within a particular amount of time (e.g., bids are received within the hour, two hours, a day, etc.).

In embodiments, once a winning bid is determined, auction and reverse auction module 314 can communicate with scheduling module 308 to schedule the new appointment of the winning consumer. Thus, scheduling module 308 in conjunction, e.g., with communication interface module 302, can send a message to the consumer device of the winning bidder to populate the calendar on the consumer device with the appointment. Furthermore, scheduling engine 308, e.g., with communication interface module 302, can send a message to the consumer device of the consumer who no longer wanted the appointment to remove that particular appointment time from their calendar. Also, scheduling module 308 in conjunction, e.g., with communication interface module 302, can send a message to the supplier device to populate or update their calendar with the new appointment information. In embodiments, auction and reverse auction module 314 may also communicate with payment module 324 to initiate payment between the consumers and/or supplier for rescheduling the appointment.

In embodiments, auction and reverse auction module 314 can initiate and conduct reverse auctions between suppliers interested in obtaining an appointment from a consumer. In embodiments, a reverse auction requires a winning bidder to provide the lowest price for the service/product. As such, suppliers may compete with each other to provide the lowest priced service to win an appointment time from a particular consumer. For example, Brian may be seeking to have his wisdom teeth taken out and Brian does not have dental insurance. Brian may also provide his preferences for appointment times (e.g., a particular hour, day, week, month, etc.) and also a maximum price he is willing to pay for the bid. Auction and reverse auction module 314 can send notifications, via notification module 304, to dentists who are interested in bidding for the consumer's business. Once multiple dentists indicate their interest in bidding for Brian's business, auction and reverse auction module 314 can begin a reverse auction. Thus, Brian receives bids from multiple dentists and the reverse auction ends with a price acceptance by Brian or when the reverse auction time runs out.

Upon the end of the reverse auction, auction and reverse auction module 314 can, via notification module 304 and, e.g., communication interface module 302, send a notification to the winning and losing bidders and also to the consumer. If the consumer agrees to the price of the winning bid, auction and reverse auction module 314 can communicate with scheduling module 308 to send a message to an application stored on the consumer device to populate a calendar with information (e.g., date, time, location, etc.) from the winning bidder. Moreover, auction and reverse auction module 314 can communicate with scheduling module 308 to populate a calendar of the supplier with information (e.g., date, time, location, etc.). Also, in embodiments, auction and reverse auction module 314 may communicate with payment module 324 to initiate payment from the winning bidder.

In embodiments, reporting module 316 generates reports regarding different activities by consumers and/or suppliers. In embodiments, reporting module 316 can generate reports requested from consumers and/or suppliers. For example, reporting module 316 can receive a request from a consumer to generate a report regarding the number of times the consumer has seen suppliers or a particular supplier during a particular period of time. Additionally, or alternatively, reporting module 316 can receive a request from a consumer to generate a report regarding the number of times the consumer has swapped appointments, paid cancellation fees, participated in auctions, and/or any other type of consumer activity in association with scheduling engine 140. The reporting module 316 can also give third parties, such as Health Plans, the ability to see rolled up activity of the membership in their plan with relation to activities scheduled in the past or future.

Additionally, or alternatively, reporting module 316 can receive a request from a supplier to generate a report. These reports can be, for example, associated with how much money the supplier has made by using the scheduling system associated with scheduling engine 140. Additionally, or alternatively, reporting engine 316 can generate a report regarding the number of times the supplier has received notices of cancelled appointments, number of successful/unsuccessful auctions, and/or any other type of supplier activity in association with scheduling engine 140.

In embodiments, storage module 318 stores information, for example, from other modules including consumer and supplier related information. In embodiments, storage module 318 can store the information within scheduling engine 140 or send the information to a separate storage device which interacts with scheduling engine 140. For example, storage module 318 may store information regarding consumers, such as their age, name, gender, date of birth, insurance information, address, preferences for types of suppliers, preferences for appointment times, preferences for swaps or auctions, family members and their demographic information. and/or any other information. In further embodiments, storage module 318 may store information regarding suppliers, such as age, name, profession, education, licensure information, office hours, locations, preferences for appointment times, and/or any other type of information.

The storage module 318 can store preference information of consumers and suppliers, as well as contact information, rules, reports, etc. In further embodiments, the storage module 318 can store reviews for the supplier(s) and consumer(s), which is entered upon completion of an appointment. This information can include, for example, any information of the supplier and consumer in order for others to review, prior to making an appointment or accepted a requested scheduled appointment. The previous point is simplified into a star rating system, such as, a 5 star consumer is the ultimate consumer for the supplier and vice versa for the supplier with one star being the least viable supplier/consumer. In this way, it is possible for the consumer to determine whether they would accept an appointment with a particular supplier, as well as used by the supplier to determine whether they would accept an appointment with a particular consumer. For example, a first supplier could enter information about the consumer, e.g., frequently cancels appointments, which is then reviewed by a second supplier in order to make a decision to accept or deny an appointment from this consumer. This information can be entered into the systems of the present invention via a user interface on the consumer device and supplier device.

In embodiments, the storage module 318 can be the storage system 22B of FIG. 1. In embodiments, other modules in scheduling engine 140 can request stored information from storage module 318.

In embodiments, query module 320 initiates searches for particular suppliers as requested by a consumer. In embodiments, a consumer may send a request for an appointment with suppliers that meet particular requirements (e.g., location, specialty, gender, education, etc.) to scheduling engine 140. The scheduling engine 140 may, in turn, send the request to query module 320. In embodiments, query module 320 can initiate a search for suppliers that meet the consumer's preferences by either using a search engine to search supplier information stored by supply engine 130 and/or scheduling engine 140.

In embodiments, verification module 322 verifies consumer and/or supplier information. In embodiments, verification module 322 interacts with supply engine 130 to verify information regarding different suppliers (e.g., verified name, address, licensure information, phone number, email, etc.). In embodiments, the verification module 322 can also be used to verify preregistration supplier information, e.g., information obtained from sources other than the supplier. Additionally, verification module 322 can verify information received from different consumers, such as their name, insurance information, date of birth, gender, etc.

In embodiments, payment module 324 obtains payment information and can process payments from consumers and/or suppliers. In embodiments, payment module 324 may interact with financial institutions (e.g., banks) to receive or send payments. For example, if a consumer wishes to pay for a particular appointment, payment module 324 may receive payment from the consumer's bank account via direct withdrawal or through a credit card payment. In embodiments, payment module 324 may store credit card information or credit/debit information. For example, a consumer may have 10 credits, where each credit has a $1 value, and when the consumer wins an auction for 3 credits, the consumer's credit account is reduced to 7 credits by payment module 324. In another example, payment module 324 may process auction payments from the consumer's financial institution.

In embodiments, calendar integration module 326 can integrate different calendars and/or scheduling applications, amongst consumers and suppliers. The calendar integration module 326 can integrate different calendars and/or scheduling applications, regardless of platform, operating system, etc. Hence the calendar integration module 326 is system agnostic. The calendar integration module 326 receives calendar information from a consumer device or supplier device, via scheduling engine 140. In embodiments, the consumer can select which calendars to share within the systems of the present invention. The calendar integration module 326 obtains graphical and textual information/code from a consumer device, converts the information into a format that can be viewed by the supplier, and sends the calendar information to the supplier. Similarly, in embodiments, calendar integration module 326 can obtain graphical and textual information/code from a supplier device, convert the information into a format that can be viewed by the consumer, and send the calendar information to the consumer. In embodiments, calendar integration module 326 thus allows sharing of calendar information between the supplier and consumer, regardless of calendar types, operating systems, etc.

In embodiments, calendar integration module 326 can show a calendar display that only shows the blocks of time that are available and hides information regarding unavailable times. The calendar integration module 326 can also select calendar profiles for certain consumers with profiles on a single device. For example, a particular consumer device may include the calendars and/or profiles of several family members, in which case the calendar integration module 326 can show a particular colander of a particular family member requesting the appointment. By implementing the calendar integration module 326, human resources and systematic resources can be more efficiently used and scheduled appointments for the supplier can be increased and more efficiently allocated, especially eliminating significant back and forth proposed time options between the supplier and consumer.

In embodiments, free/busy time module 328 allows for a supplier to determine optimal recommendations for consumer appointment times. In embodiments, free/busy time module 328 can obtain calendar information from any type of device and can then determine availability of a consumer based on the consumer's calendar. In embodiments, free/busy time module 328 can determine which times are available within the consumer's calendar, which times are available within the supplier's calendar, stored on the supplier device, and determine which times are available for an appointment by comparison of the different calendars. In embodiments, free/busy time module 328 is system agnostic; that is, it can interface with different supplier and consumer platforms to determine free/busy times. In an example use, by accessing calendars of the supplier and consumer, if free/busy time module 328 determines that there is a conflict between a requested appointment time from a consumer and the supplier's calendar, free/busy time module 328 may determine alternate times to present to the consumer for scheduling an appointment. In embodiments, free/busy time module 328 may communicate with preferences module 306 to determine alternate times that conform with the consumer's and/or supplier's preferences (e.g., time of day, days of the week, weekends, gender of supplier, etc.).

In embodiments, security and fraud detection module 330 ensures that consumers and suppliers work within boundaries and rules that define the scheduling system initiated by scheduling engine 140. In embodiments, security and fraud detection module 330 can ensure that consumers are not scheduling multiple appointments with multiple suppliers over a particular period of time. For example, security and fraud detection module 330 may determine that a consumer has scheduled five appointments with five different doctors over 24 hours, and, if so, security and fraud detection module 330 may determine that the consumer is improperly scheduling appointments based on the similarity of the doctor's specialty (e.g. all pediatric doctors) and the proximity of the appointment times. In embodiments, this will prevent the consumer from obtaining a financial benefit from impermissibly auctioning appointments, etc.

In embodiments, security and fraud detection module 330 can determine any fraudulent activity associated with health insurance, payments, illegal activities regarding the Health Insurance Portability and Accountability Act (HIPPA), fraudulent payments, and/or any other types of activities. This can be done by, for example, (i) accessing other servers or a database that stores rules associated with, for example, information regarding HIPPA, payments, and/or any other types of activities, (ii) and comparing the rules to the actual activities. Accordingly, security and fraud detection module 330 can ensure that consumers and suppliers are conforming to the boundaries of the scheduling system and within the confines of laws, regulations and other rules. Furthermore, security and fraud detection module 330 also ensures that passwords and user identifiers are valid and prevents unauthorized users to illegally use a registered consumer's or supplier's account. Additionally, security and fraud detection module 330 can prevent any appointments to be scheduled with a supplier, if there are fraudulent activities (e.g. criminal activities) associated with a particular supplier. These above noted activities can be performed by a comparison of such activities to known rules, stored passwords, user identifiers, etc.

In embodiments, activity module 332 stores activity information for consumers and suppliers. In embodiments, activity module 332 is configured and/or structured to allow a consumer and/or a supplier to view all their activities over a period of time, in an unfiltered format. For example, activity module 332 may generate a scrollable display that includes all activities, such as appointment requests, auction requests, cancellation requests, etc. If consumer and/or supplier are interested in filtering their activity, the consumer and/or supplier can use reporting module 316 to generate specific activity reports that can filter information stored by activity module 332.

Figure 4:
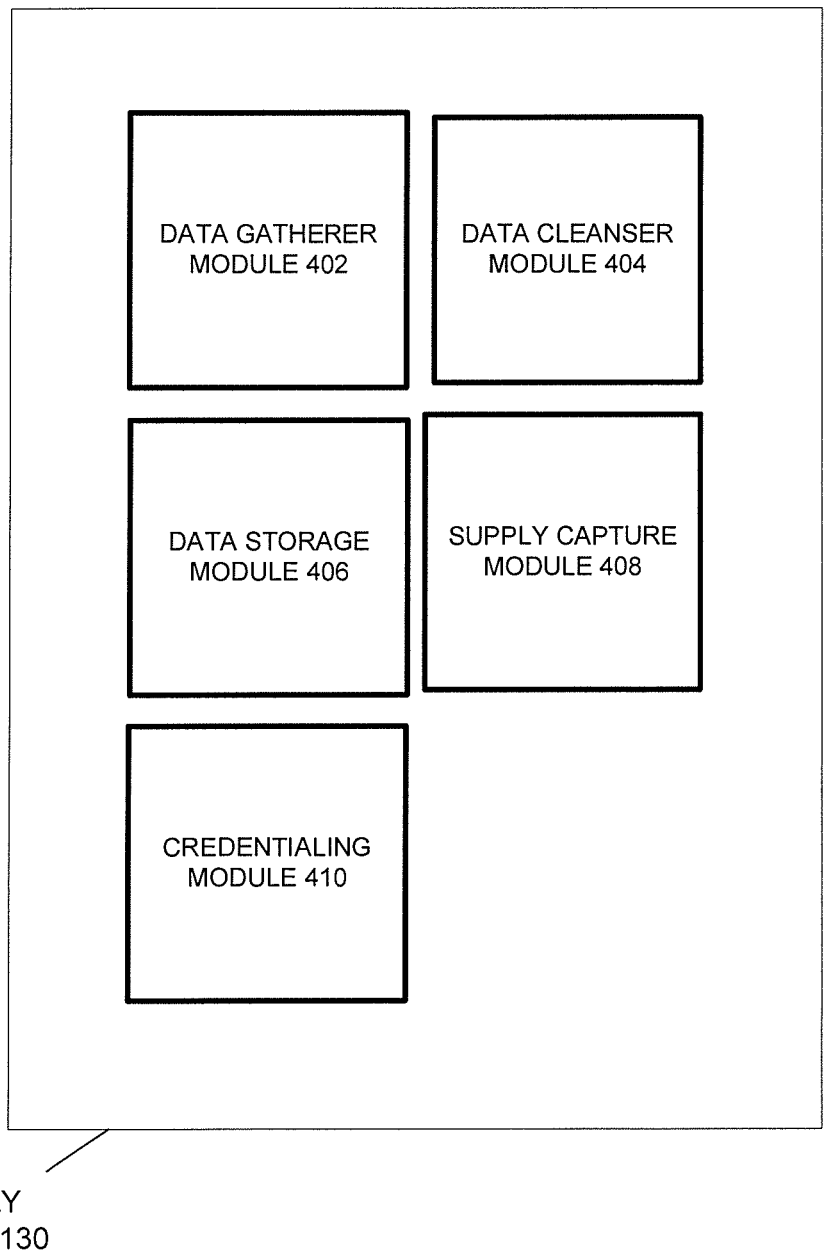

FIG. 4 shows an example block diagram of supply engine 130 in accordance with the aspects of the invention. Specifically, FIG. 4 shows data gatherer module 402, data cleanser module 404, data storage module 406, supply capture module 408, and credentialing module 410. Each module within supply engine 130 can communicate with one or more other modules within scheduling engine 140, as well as the other devices and computing systems described herein, particularly as shown and described with regard to FIGS. 1, 2 and 3. These modules can be implemented as separate, dedicated modules or as combined modules. Additionally, these modules may be implemented as separate dedicated processors or a single or several processors to provide the function of these tools, as discussed in FIG. 1.

In embodiments, data gatherer module 402 requests and obtains information regarding different suppliers from other devices, servers, and/or computing devices within a networking environment. In embodiments, data gatherer module 402 can send messages, pings, notifications, etc., to other computing devices to request information associated with suppliers. For example, data gatherer module 402 data mines for information by sending a message requesting information regarding doctors from a particular server or servers. In alternate embodiments, data gatherer module 402 can receive information automatically from multiple devices or manual entry or other sources, e.g., proprietary databases, social networks, or other consumer based networks, e.g., Angie's list, etc. Accordingly, the capturing of the supplier information generates a universe of supplier information that provides a consumer with a perceived quantity of available suppliers.

In embodiments, data cleanser module 404 validates and confirms the information received by data gatherer module 402. In embodiments, data cleanser module 404 can analyze the gathered information by determining that the information is correct, such as whether the supplier is the correct type of supplier (e.g., is the supplier a doctor and not a mechanic, is the doctor within a particular country, etc.). Additionally, data cleanser module 404 ensures that there is no duplicate information for a particular supplier. For example, if duplicative information is found, the data cleanser module 404 can delete such duplicative information. In embodiments, data cleanser module 404 can use system based methods (e.g., algorithms, matching programs, etc.) to determine that the information is valid, or can use manual intervention. In a manual intervention mode, data cleanser module 404 can provide the supplier information to an administrator of supply engine 130, who can confirm that the information is valid through manual validation and/or checking processes.

Thus, by implementing the cleanser module 404 it is now possible to provide the consumer with accurate information, thereby enticing the consumer to use the scheduling system. Also, by implementing the cleanser module 404 in combination with the data gatherer module 404, the consumer is provided with a complete listing of suppliers, even before the supplier registers with the systems, processes and/or services. This provides the consumer a sense that the systems, processes and/or services of the present invention are universal, complete and accurate for immediate use. This, in turn, attracts a consumer to use the scheduling system, which in turn attracts suppliers to register with the scheduling system to obtain the consumer's business.

In embodiments, data storage module 406 stores the information validated by data cleanser module 404. In embodiments, data storage module 406 can send information to storage module 318 in scheduling engine 140. As such, the validated information can then be provided to users/user groups who are registered with scheduling engine 140.

In embodiments, supply capture module 408 generates messages (e.g. digitized phone calls, emails, text messages, etc.) that are sent as notifications to validated suppliers in order to register with the scheduling system associated with scheduling engine 140. Supply capture module 408 can send notifications to a supplier by escalating notifications over a period of time. Also, in embodiments, supply capture module 408 receives information from suppliers who are registering with scheduling engine 140. In embodiments, supply capture module 408 can receive information such as a supplier's name, title, associates, gender, age, educational background, licensure background, location, specialty, supplier's profession, and/or any other type of information that identifies the supplier.

In embodiments, credentialing module 410 validates the information received by supply capture module 408. In embodiments, credentialing module 410 initiates procedures used to ensure that the supplier provided information is valid. In embodiments, credentialing module 410 may generate tokens or codes that are sent to a supplier's email or as a digitized phone message to a validated phone number to ensure that the supplier provided information is from the supplier and not from a fraudulent source. For example, credentialing module 140 may send the code "XYZ143" to Dr. Jones' email account. Dr. Jones' administrative assistant may view the code and enter the code into a registration page within the scheduling application, downloaded on Dr. Jones' computing device. Thus, the code is used by supply engine 130 to validate that the supplier is Dr. Jones. As such, fraudulent use is prevented within the scheduling system.

Flow Diagrams

FIGS. 5-13 show exemplary flows for performing aspects of the present invention. The steps of FIGS. 5-13 may be implemented in the environment of FIG. 1, and/or the block diagrams of FIGS. 2, 3 and 4, for example. The flowcharts illustrate the architecture, functionality, and operation of implementations of systems, methods and computer program products according to various embodiments of the present invention. In this regard, each block in the flowchart or block diagrams may represent a module or portion of code, which comprises one or more executable instructions for implementing the specified logical function(s). It should also be noted that, in some alternative implementations, the functions noted in the block may occur out of the order noted in the figures. It will also be noted that each block of the flowchart illustrations, and combinations thereof, can be implemented by special purpose hardware-based systems that perform the specified functions or acts, or combinations of special purpose hardware and computer instructions, as already described herein.

Figure 5:
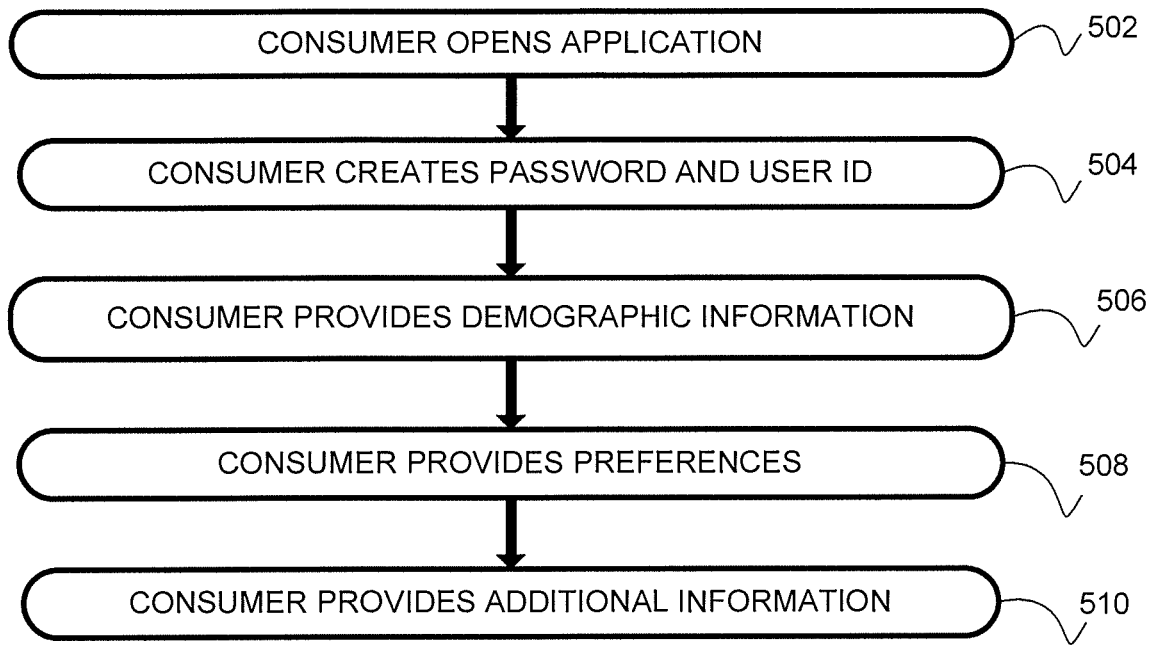
FIGS. 5-13 show various example flow diagrams implementing steps in accordance with aspects of the present invention.

FIG. 5 depicts an example flow for a consumer registration process, e.g., a user, in accordance with aspects of the present invention. At step 502, a consumer opens an application for display on their device. In embodiments, the device can be a mobile device (e.g., smart phone, personal digital assistant (PDA), cellular phone, gaming device, etc. with an application loaded therein), a computing device (e.g., laptop, desktop computer, etc.), and/or any other device capable of allowing the user to view images and information on display screen. The consumer may view a login page which includes a request for a password, a user identification (ID), and/or a selection to register with the scheduling system via the application.

At step 504, the consumer requests to register with the system by creating a password and a user ID. In embodiments, the application provides a registration display for the consumer to create a password and user ID. By way of example, the user ID can be a person's name, an email address, or can be made up of any arrangement of letters, numbers, and/or symbols. Once the consumer has created a password and user ID, the consumer can provide additional information such as preferences, etc. At step 506, the consumer can provide demographic information, which can include the consumers' name, address, date of birth, phone number, email, gender, languages spoken, and/or any other identifying information. In embodiments, the consumer can also provide information regarding social networks that can be used as portals to receive scheduling information from the scheduling system. In embodiments, the consumer can also provide demographic information about the consumer's family, such as each family member's name, address, date of birth, phone number, email, gender, languages spoken, and/or any other identifying information. This allows the consumer to schedule appointments for family members and other individuals who may be dependent upon the consumer for financial and/or medical assistance.

At step 508, the consumer can provide preferences regarding how the consumer interacts with the scheduling system, via the application on a consumer device. In embodiments, the preferences are associated with how and when the consumer is alerted by the scheduling system regarding updates, changes, and other actions with regards to an appointment. For example, the consumer can choose to be alerted via an email address, a phone number, a fax number, SMS messages, MMS messages, and/or any other type of communication method. Furthermore, the consumer can choose when to receive alerts by entering in particular times of days and/or particular days (e.g., only during 9:00 a.m. to 5:00 p.m. on weekdays, only on Wednesday to Friday, etc.) to receive alerts. The preferences can also include types of doctors, geographical locations in which they are willing to travel for an appointment, required educational and/or specialty background of the supplier, etc.

Additionally, the consumer can choose which types of events to receive alerts. For example, the consumer can choose to only receive alerts when: (i) a particular supplier has availability for an appointment, (ii) a particular supplier has to cancel an appointment, (iii) another consumer is interested in swapping appointment times, (iv) an appointment with a particular supplier is available for auction, (v) and/or any other type of activity associated with the scheduling system. The consumer can also provide preferences regarding whether their scheduled appointments are to be tagged (e.g., a flag or attached identifier) indicating that the consumer is interested in particular types of appointments, auction availability, swapping of appointments, etc.

At step 510, the consumer can provide additional information. In embodiments, the consumer can provide credits to the scheduling system by entering a payment amount which is then used to purchase credits. In embodiments, the credits provide the consumer with the ability to bid on other appointments within the scheduling system, pay for canceled appointments, and/or other activities without having to resort to continuously providing a debit card, credit card, check, etc., to make payment. In embodiments, the consumer can enter credit card information, checking account information, debit card information, etc., to provide payment for appointments.

In embodiments, the consumer can also provide additional information regarding feedback on the consumer's experience with the application, the scheduling engine and any of the suppliers. Thus, the feedback can be used to enhance and improve the consumer's experience. For example, the consumer experience can be related to how the consumer was able to find a particular supplier, whether the consumer is able to obtain appointments with the selected supplier, whether the consumer received notifications regarding changes, and/or any other type of activity by the consumer with the application and the scheduling engine.

Figure 6:
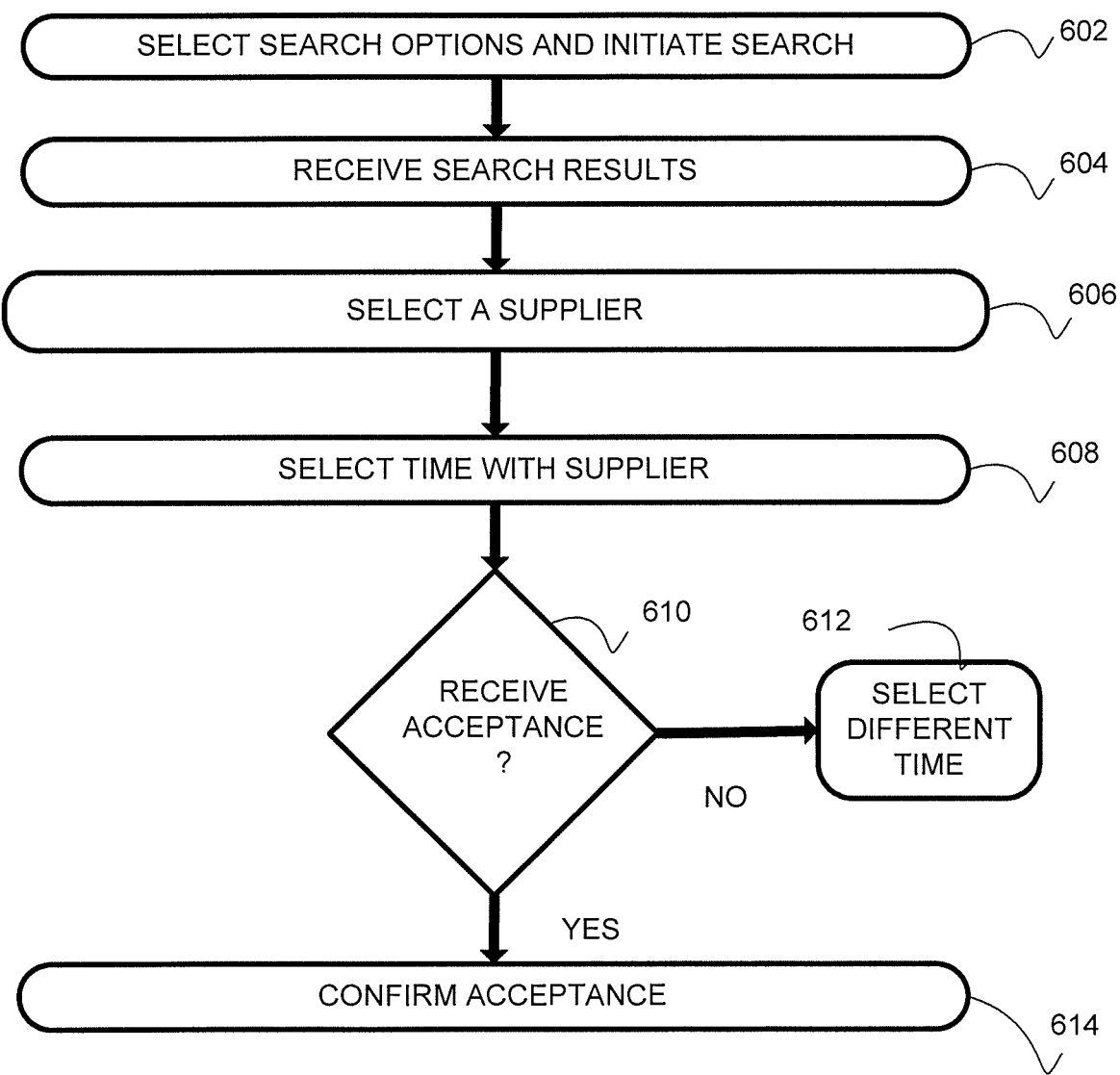

FIG. 6 depicts an example flow for scheduling an appointment by the consumer. At step 602, the consumer selects search options to find a supplier via the scheduling application. In embodiments, the consumer is provided with one or more application pages that allow the consumer to determine search options. For example, an interface can be provided which allows the consumer to search for suppliers based on:

(i) location proximity (e.g., within 10 miles of consumer's home), (ii) a locale, such as city, state, county, zip code, etc., (iii) the type of supplier, e.g., a doctor, dentist, lawyer, auto-mechanic, architect, plumber, etc., (iv) the specialty of the supplier, e.g., a pediatrician, an orthodontist, an eye specialist, an automobile specialist, etc., (v) the supplier's acceptance of particular types of payment, e.g., credit cards, cash only, etc., (vi) the supplier's acceptance of a type of insurance, (vii) the supplier's gender, (viii) the supplier's ability to speak a particular language, e.g., Spanish, Korean, French, etc., (ix) and/or any other characteristic that can be used to search for a supplier.

At step 604, the consumer receives search results which are displayed via the application on the consumer device. In embodiments, the search results can be displayed as a list of search results, e.g., perceived suppliers, with the results provided either alphabetically, by distance, and/or any other process. The search results can be overlaid on a map or provided in other forms. For example, in embodiments, the search results can be displayed on the consumer device as a map with icons indicating each search result. By selecting one or more search results (e.g., using a touch screen, keyboard, a mouse, etc.), the application can provide additional information about the selected supplier. In embodiments, the search results can also be displayed by the application as a mix of lists, maps, and/or any other type of graphical representation.

At step 606, the consumer can select one or more suppliers from the search results. The selection can be made by the consumer selecting the suppliers by using a touch screen on the device, a keypad, a mouse, and/or any other type of selection mechanism. At step 608, the consumer can select an appointment time with the one or more supplier. In embodiments, the consumer can use a calendar stored by the consumer device or provided by the scheduling engine to select the requested appointment time. For example, the calendar can be an integrated calendar of the consumer and supplier, as described with respect to FIG. 3. In alternate embodiments, the consumer can be provided a scrollable list of selectable dates and times which allow the consumer to select a date and time with the supplier. In embodiments, the time request along with the consumer's calendar can be sent to any number of selected suppliers. Thus, the supplier can use the consumer's calendar information (e.g., free and available times) to determine alternate times if the requested time is not available. A confirmation notice can be sent to the consumer.

If the consumer does not receive acceptance (step 610—NO), then the consumer is alerted that the selected time with the supplier is not available and the consumer can be provided with alternative times for an appointment, at step 612. Alternatively, the consumer can select alternate times based on their own availability, without knowledge of the supplier's alternative available times. In any scenario, the selected time may not be accepted because the selected time is not during the hours of operation for that supplier, the appointment time is already scheduled, etc. For example, the scheduling system can have default values for hours of operation (e.g., 9:00 a.m. to 5:00 p.m., closed during lunch from 12:00 p.m. to 1:00 p.m., etc.) or the scheduling system can have specific supplier information (e.g., the supplier has indicated that they do not accept appointments on Fridays). To this end, the system may revert back to step 610, in an iterative manner.

If the consumer receives acceptance (step 610—YES), then the consumer, at step 614, receives a notification from the system (or supplier), and thereafter provides confirmation of the scheduled appointment. In embodiments, the notification can be via the application, email, phone, SMS messages, etc. Once accepted, in embodiments, the scheduling engine can populate a calendar stored by the consumer device and/or supplier device with the scheduled appointment. It should be understood by those of skill in the art that the processes of FIG. 6 can be implemented using the calendar integration module and/or free busy time module of FIG. 3.

Figure 7:
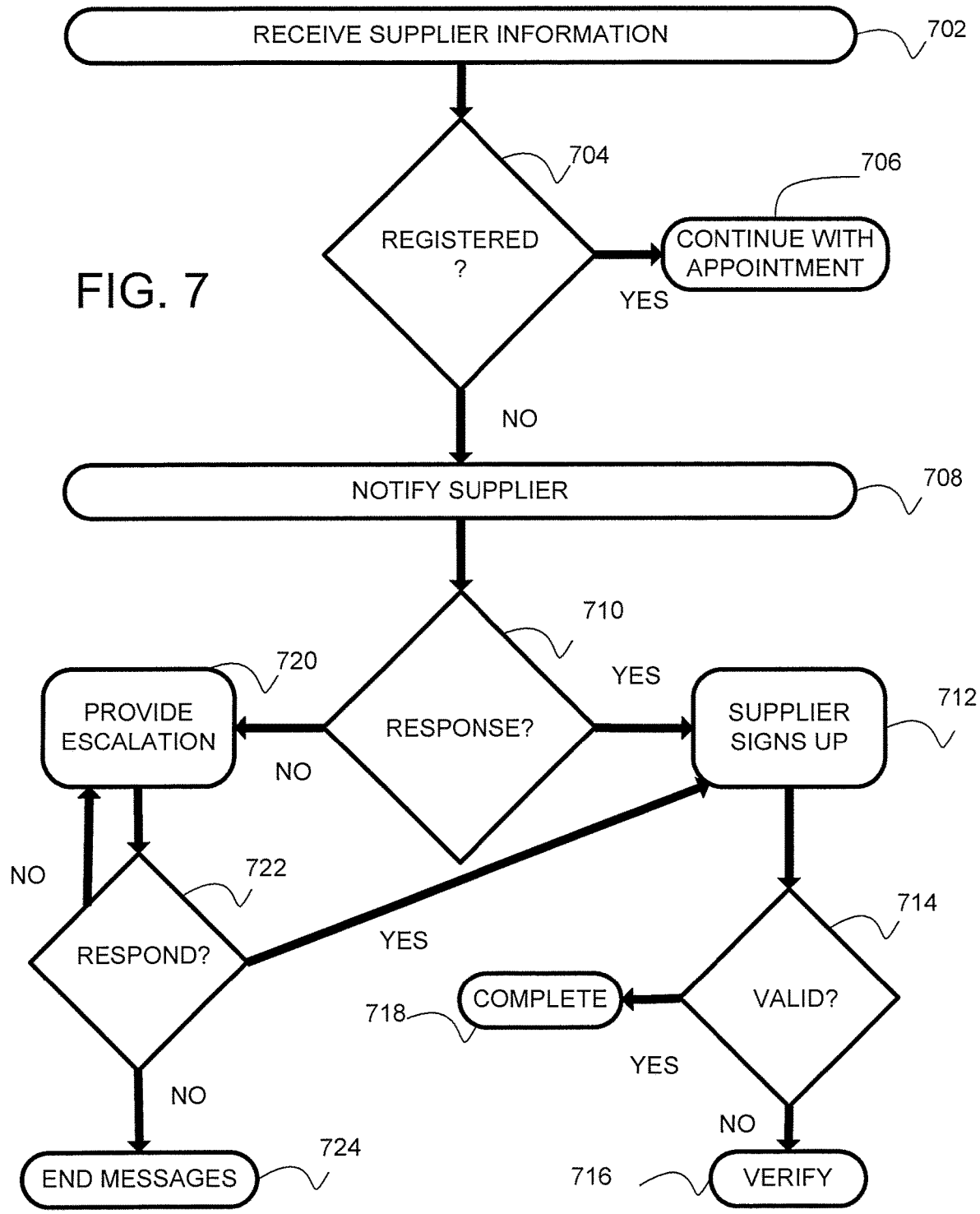

FIG. 7 depicts an example flow for registration by a supplier with the scheduling system. It is contemplated by the present invention that registration processes can occur under different circumstances, e.g.: (i) by initiation of the supplier, prior to a consumer scheduling an appointment or (ii) in response to a consumer scheduling an appointment with a supplier that is not currently registered. In the latter situation, a step 702, a scheduling engine receives supplier information from a consumer requesting an appointment with the supplier. In embodiments, the initial supplier information has been validated and verified by a supply engine as to the authenticity of the supplier's information (e.g., name, specialty, licensure information, address, etc.). At step 704, the scheduling engine determines whether the supplier is already registered. If the supplier is registered (step 704—YES), then the scheduling engine continues with the process of scheduling an appointment between the supplier and the consumer, at step 706. If the supplier is not registered (step 704—NO), then a notification is sent to the supplier, at step 708. In embodiments, the notification can be a multi-channel notification, e.g., a digitized phone, email, facsimile and/or any other communication method. At step 710, the scheduling engine determines whether the supplier responded to any of the multi-channel notifications.

If the supplier responded (step 710—YES), the supplier registers with the scheduling system, at step 712. In embodiments, the supplier or administrator can provide their personal name, business name, number of years in business, licensure information, specialty information, phone number, email, website information, gender, types of payments accepted, types of insurance accepted, hours of operation, and/or any other type of information required by the systems, processes and/or services of the present invention. (It should be understood by those of skill in the art that steps 702-710 can be skipped or eliminated in the situation that the supplier initiates the registration process, prior to a consumer scheduling an appointment.)

At step 712, information of additional suppliers can also be added during this registration process based on rules in the rules module. For example, registration of additional supplier(s) can be performed if such additional suppliers have some relationship to the original supplier, e.g., they have the same office address, telephone number (or facsimile number), same supplier identifier, such as a provider NPI number, and/or, in embodiments, the same administrator that is entering the supplier information. In the latter situation, a registered administrator associated with multiple suppliers may enter information for all of the suppliers during a single registration process. At step 714, the scheduling engine determines whether the supplier registration information is valid. For example, the scheduling engine can analyze stored information about the supplier and/or send out messages to other devices, such as messages to state licensure departments, phone companies, landlords, etc. in order to confirm validation of the information.

If the scheduling engine determines that the supplier registration information is valid (step 714—YES), then the scheduling engine completes the registration process, at step 720. If the scheduling engine determines that the supplier registration information is not valid (step 714—NO), then the scheduling engine verifies the information through different mechanisms. In this and/or other scenarios, the scheduling engine may send a code or other verification information to a valid phone number or email address to confirm that the registration information is correct. Thus, the supplier can enter the code into the scheduling application to verify the supplier information. In further embodiments, the scheduling engine may schedule/request a brief phone interview between the supplier, or the supplier's administrative staff, and an employee of the service provider of the scheduling engine to confirm the supplier's information.

If the supplier does not respond (step 710—NO), then the scheduling engine provides an escalation of the notifications. In embodiments, the escalations can be additional phone calls, emails, faxes, etc., as provided by the rules module, for example. At step 722, the scheduling engine determines whether it has received a response from the supplier. If there is a response (step 722—YES), then the supplier begins to register with the scheduling engine, at step 712. If there is no response (step 722—NO), then the scheduling engine can either send more notifications, at step 720, or the supplier can stop sending messages, at step 724. In embodiments, the scheduling engine can determine whether to stop sending messages based on the amount of messages sent, the period of time during which the messages are sent, and/or a combination of the amount of messages sent during a period of time.

Figure 8:
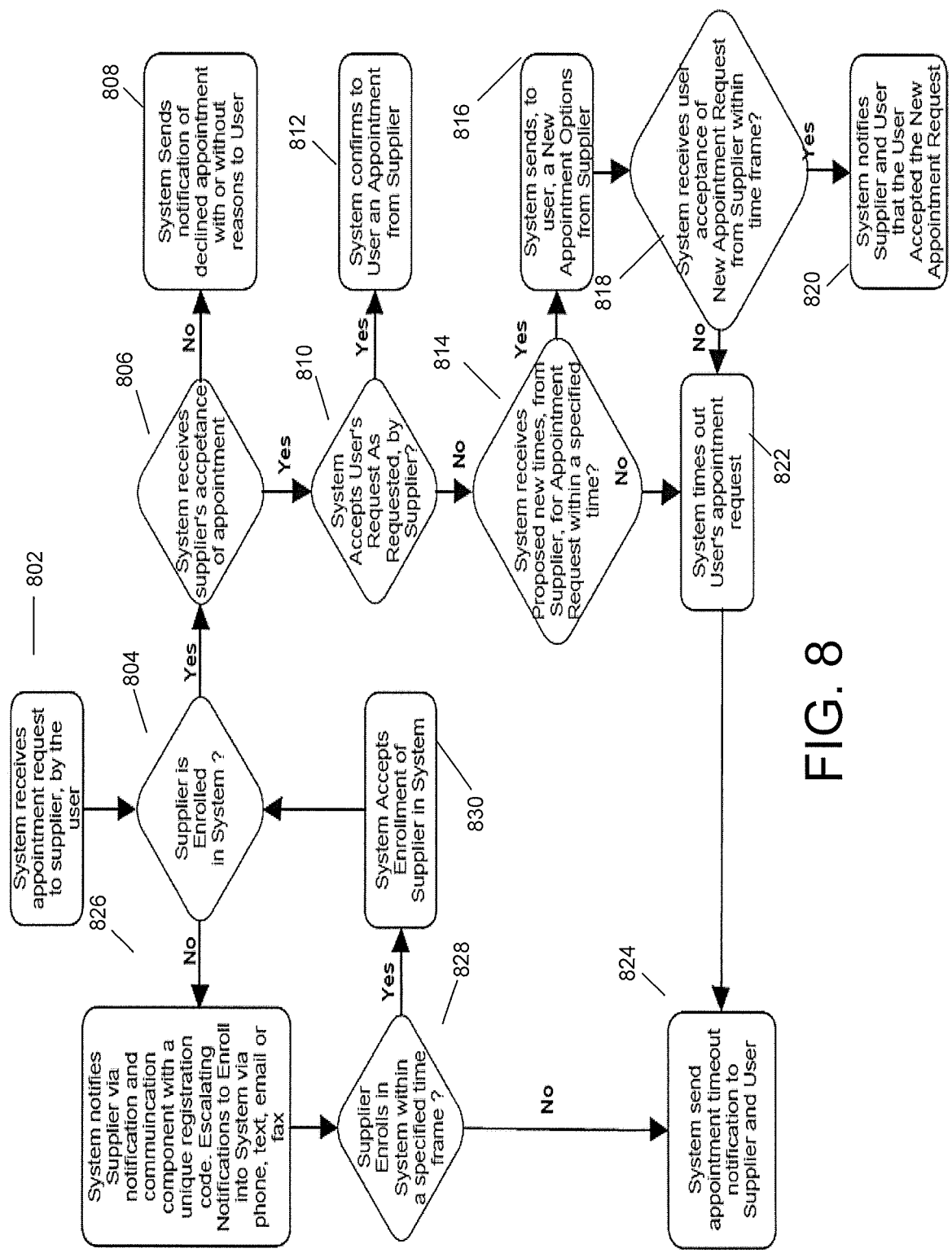

FIG. 8 depicts an example flow for a scheduling system receiving and fulfilling appointment requests. In embodiments, the scheduling system can include the scheduling engine, the supply engine, and/or any other computing device as already described herein. At step 802, the system receives a request for an appointment with a supplier. At step 804, the scheduling system determines whether the supplier is enrolled in the system. If the supplier is enrolled in the system (Step 804—YES), then, at step 806, the scheduling system determines whether it has received the supplier's acceptance of the appointment request. If the supplier does not accept the appointment request (step 806—NO), then the scheduling system sends a decline appointment notification with or without reasons to the user (i.e., the consumer), at step 808. For example, the consumer can be notified that the appointment is declined because it is during the supplier's lunch hour.

If the supplier accepts the appointment request (step 806—YES), then the scheduling system determines whether the supplier will accept the consumer's scheduled appointment request as requested, at step 810. If the supplier does accept the appointment request as requested (step 810—YES), then the scheduling system provides confirmation to the consumer that the consumer has a scheduled appointment with the supplier, at step 812. If the supplier does not accept the appointment request as requested (step 810—NO), then the scheduling system determines, at step 814, whether it receives proposed new times from the supplier within a period of time (e.g., within one hour, 12 hours, etc.) commencing from when the initial request for an appointment was made. At step 814, the system and/or administrator of the supplier can also provide alternate affiliated or non-affiliated suppliers at the requested scheduled time or alternate times. If the system receives proposed new times and/or alternate suppliers (step 814—YES), then the system sends the new appointment options to the consumer, at step 816.

At the time of scheduling an appointment, the supplier can view the behavior of the consumer, e.g., missed visits, late arrivals, canceled appointments, etc. for this and/or other registered suppliers. This permits the supplier a mechanism to determine whether the supplier wants to schedule an appointment with the consumer. Alternatively, such information can be used by the supplier to schedule appointments during certain working hours, e.g., peak or non-peak time working hours. For example, noting that the consumer habitually cancels their appointments, the supplier may deliberately give priority to other consumers during peak work hours, while still scheduling an appointment of the requesting consumer (the consumer that habitually cancels their appointments) during non-peak appointment periods. In this way, if the consumer does cancel their appointment, the supplier will still be able to maximize their scheduled times and optimize their potential revenue stream.

The same information above can also be used by the scheduling engine to recommend optimized schedules for the supplier and respond quickly to known behaviors of the consumers. For example, the scheduling engine can use this behavioral information (e.g., missed, canceled, rescheduled, supplier tardiness and/or efficiencies) to provide recommendations for reshuffling the schedule automatically with the consumers. This would result in recommended new times for existing appointments. This can be done by revenue optimization, consumer demand, and/or based on other criteria. By way of a simple example, the scheduling engine can determine, by a ranking, which consumers have the best attendance records and, using this information, adjust the schedule to ensure that the consumers with the best attendance to their appointments will be offered the optimal time slots for their appointments. By do so, the scheduling engine (e.g., by way of the communication module) can provide notifications to the consumers about rescheduling of appointments.

At step 818, the system determines whether the consumer has accepted the new appointment request within a threshold period of time (e.g., within one hours, six hours, two days, etc.). If the system receives acceptance from the consumer within the threshold time (step 818—YES), then the system notifies the supplier and the consumer that an appointment has been scheduled, at step 820. As such, the consumer device and the supplier device both populate stored calendars with the scheduled appointment.

If the system does not receive acceptance from the consumer (step 818—NO), then the scheduling system times out the consumer's appointment request, at step 822. Similarly, if the scheduling system does not receive new appointment times from the supplier within the period time (step 814—NO), then the system times out the consumer's appointment request at step 822.

At step 824, the scheduling system sends out appointment timeout notifications to the consumer and the supplier. Thus, the consumer and the supplier are notified (e.g., by email, phone, SMS message, etc.) that the consumer and/or the supplier did not respond within a period of time to accept an appointment time.

If the supplier is not enrolled in the system (step 804—NO), then the system requests the supplier's registration information with the scheduling system, at step 826. In embodiments, the scheduling system can provide a unique code (e.g., numbers, symbols, letters, etc.) that the supplier can use to register with the scheduling system. In embodiments, the scheduling system can provide escalating notifications to the supplier, via digitized phone calls, emails, faxes, etc., within a period of time, which is further described in FIG. 9.

At step 828, the scheduling system determines whether the supplier enrolls/registers within the period of time. If the supplier enrolls/registers within the period of time (step 828—YES), then the system accepts the supplier's registration information at step 830. If the supplier does not enroll/register within the period of time (step 828—NO), then the scheduling system sends out appointment timeout notifications to the consumer and the supplier, at step 824. Thus, the consumer and the supplier are notified (e.g., by email, phone, SMS message, etc.) that the consumer and/or the supplier did not respond within a period of time to accept an appointment time.

Figure 9:
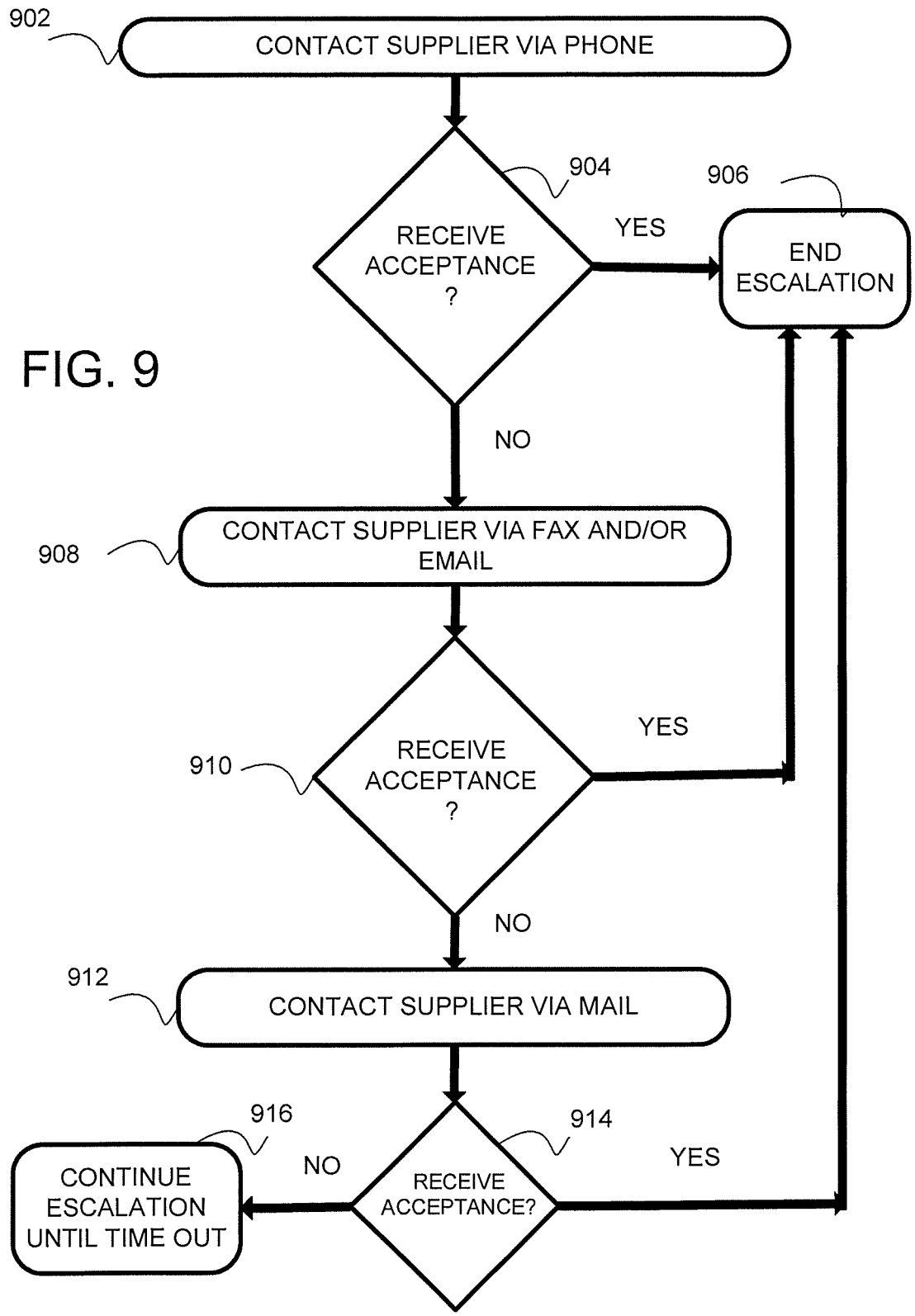

FIG. 9 depicts an example flow for registering the supplier with the scheduling system. As already discussed, it is contemplated by the present invention that registration processes can occur under different circumstances, e.g.: (i) by initiation of the supplier, prior to a consumer scheduling an appointment or (ii) in response to a consumer scheduling an appointment with a supplier that is not currently registered. In the latter scenario, at step 902, a supply engine contacts the supplier via a phone call or other communication means. In embodiments, the phone call can be a digitized phone call. In embodiments, a digitized phone call utilizes digital electronics to initiate the communication. In cases in which the supplier uses an interactive voice response (IVR) system, the processes of the present invention will try to navigate through the IVR system to a human or, alternative, kick the process to a human business representative at the service provider, e.g., a provider of the systems, processes and/or services of the present invention, to find the key to bypass the IVR of the supplier and retry the initial registration process. Also, if the above procedures are not successful, then the present invention contemplates human intervention (e.g., manual processes) to reach the supplier.

At step 904, the supply engine determines whether it has received acceptance from the supplier. If the supply engine has received acceptance (step 904—YES), then the supply engine stops escalation of notifications, at step 906. If the supply engine has not received acceptance (step 904—NO), then the supply engine contacts the supplier via fax and/or email, at step 908. At step 910, the supply engine determines whether it has received acceptance from the supplier. If the supply engine has received acceptance (step 910—YES), then the supply engine stops escalation of notifications, at step 906. If the supply engine has not received acceptance (step 910—NO), then the supply engine contacts the supplier via postal mail, such as regular mail, registered mail, express mail, etc., at step 912. At step 914, the supply engine determines whether it has received acceptance from the supplier. If the supply engine has received acceptance (step 914—YES), then the supply engine stops escalation of notifications, at step 906. If the supply engine has not received an acceptance (step 914—NO), then the supply engine continues escalation of notifications until the escalations time out after a particular threshold time (e.g., stop after one day, one week, etc.). It should be understood that other escalation sequences are also contemplated by the present invention, e.g., in order of email, text message, phone, facsimile, mail, or any combination or sequence thereof.

Alternatively, the supplier can initiate the registration process without prompting by the system. In this scenario, step 902 can be representative of the supplier directly logging into the systems of the present invention and providing supplier information, e.g., specialty, education, address information, telephone and facsimile numbers, email address, etc., as discussed herein.

Figure 10:
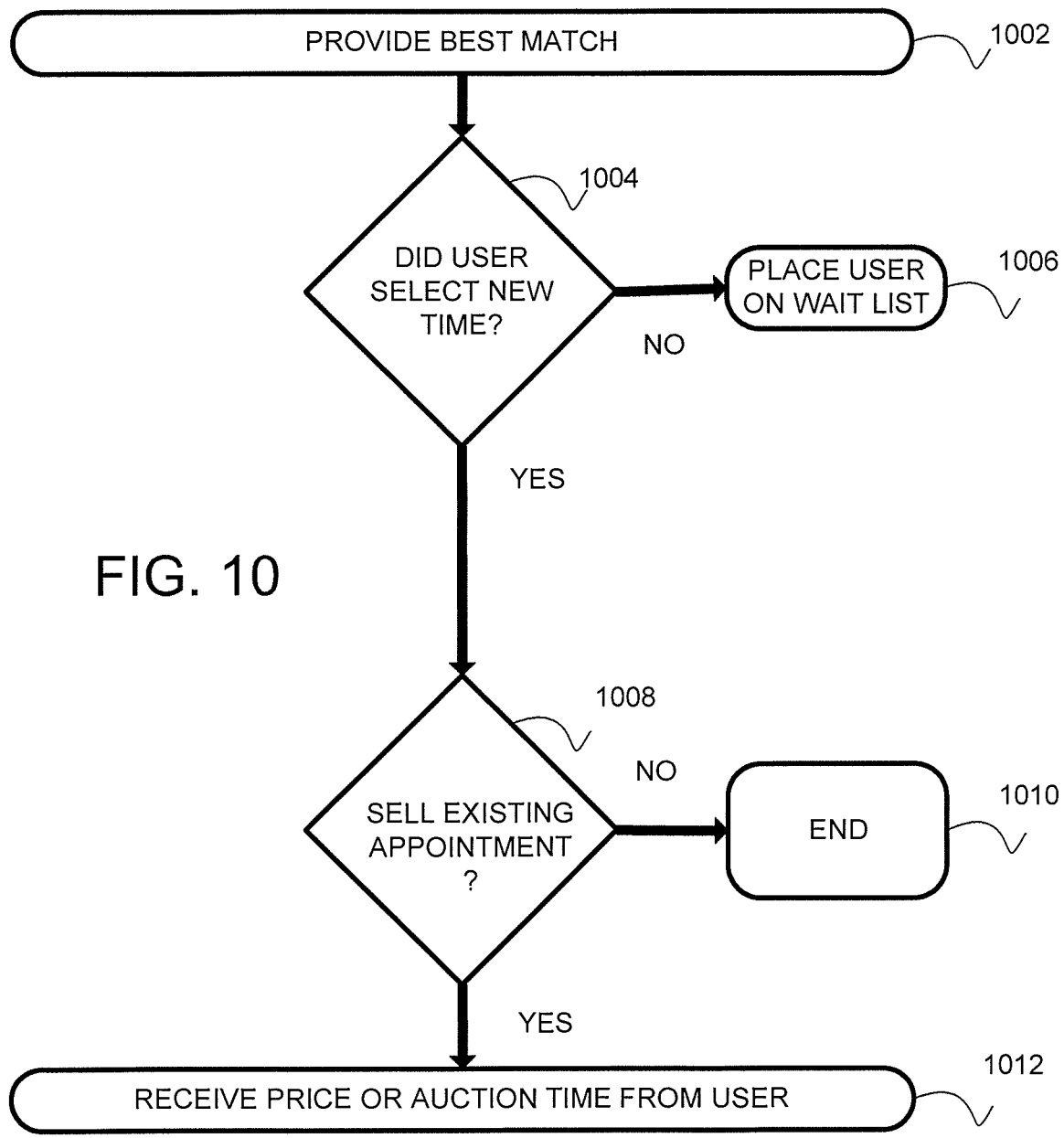

FIG. 10 depicts an example flow for determining a best match for an appointment between a supplier and a consumer. At step 1002, the scheduling engine performs a best match between an appointment request and a supplier's availability. In embodiments, the scheduling engine can determine the best match based on whether the consumer is interested in paying an increased fee for the appointment, the geographic proximity between the supplier and the consumer, whether the supplier is providing alternative times, and/or any other factors relating to determining an appointment, e.g., known available times as noted in the consumer's calendar. At step 1004, the scheduling engine determines whether the consumer selected a new time for an appointment with a supplier. If the consumer did not select a new time (step 1004-NO), then the scheduling engine places the consumer on a wait list until an alternate time or that particular time becomes available from the supplier. If the consumer did select a new time (step 1004—YES), then the consumer can be requested to sell their existing appointment, at step 1008. If the consumer decides not to sell the existing appointment (step 1008—NO), then the scheduling engine keeps the existing appointment and ends the process. If the consumer decides to sell the existing appointment or there is no existing appointment (step 1008—YES), then the scheduling engine receives a price and period of time to conduct an auction, at step 1012. Alternatively, if there is no auction, the consumer can select the best match for scheduling the appointment.

Figure 11:
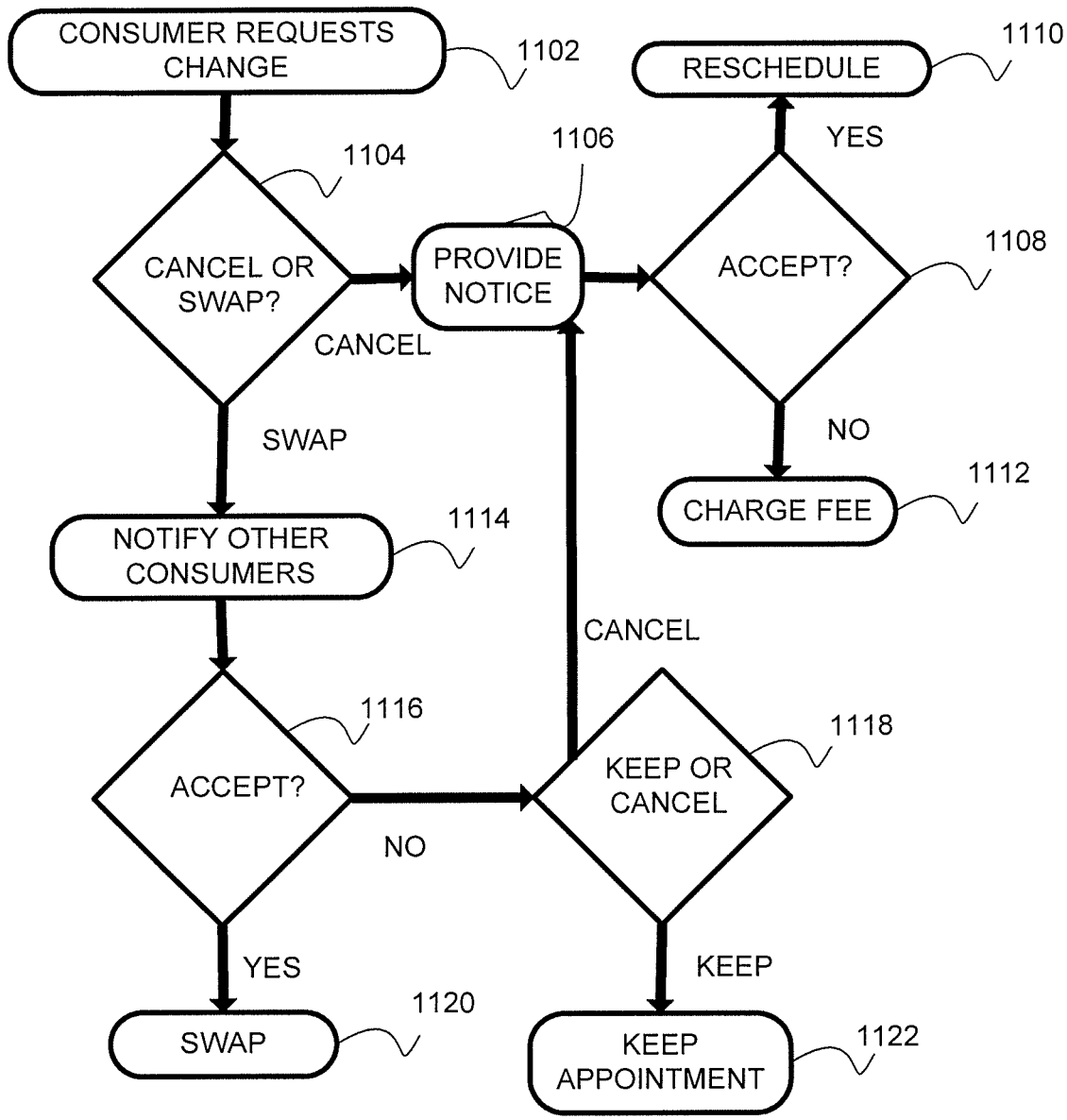

FIG. 11 depicts an example flow for changing an appointment request. At step 1102, the scheduling engine receives a consumer's request to change an appointment. At step 1104, the scheduling engine determines whether the request is to cancel or swap the appointment. In embodiments, the scheduling engine can determine the request based on a message sent by the consumer. Alternatively, the scheduling engine can determine whether particular scheduled appointments are flagged/tagged to be available for swapping. If the request is to cancel the appointment (step 1104—CANCEL), then the scheduling engine provides notice to other consumers (particularly those consumers with an appointment with the same supplier and/or same needs as determined through the modules of the present invention, e.g., scheduling engine and/or preferences, etc.) regarding the availability of the appointment, at step 1106. At step 1108, the scheduling engine determines whether it receives acceptance from another consumer for the canceled appointment.

If the scheduling engine receives acceptance from another consumer (step 1108—YES), then the scheduling engine changes the appointment with the other consumer. Thus, the scheduling engine sends a notification to the consumer who accepted the canceled appointment, the consumer who canceled the appointment, and the supplier. Accordingly, the scheduling systems' application on each consumer device makes the respective changes to calendars stored on each consumer device and the supplier makes changes to their stored calendar. If the scheduling engine does not receive any acceptance from another consumer (step 1108—NO), then the scheduling engine can charge a fee to the consumer for canceling the appointment.

If the scheduling engine receives a request to swap the appointment time (step 1104—SWAP), then, at step 1114, the scheduling engine sends a notification to other consumers regarding whether they are interested in swapping their appointment time with another appointment time. This notification can be provided to other consumers that have flagged their accounts, or to consumers that have scheduled appointments, which are requested by the swapping consumer. At step 1116, the scheduling engine determines whether any other consumers have accepted the request to swap. If the scheduling engine determines that no other consumer has accepted the request to swap (step 1116—NO), then the scheduling engine requests whether the consumer wants to keep the appointment or cancel the appointment, at step 1118.

If the consumer communicates to the scheduling engine that the consumer wants to cancel the appointment (step 1118—CANCEL), then the scheduling engine sends a notice to other consumers to determine whether they are interested in taking the canceled appointment, at step 1106. If the consumer communicates to the scheduling engine that they want to keep the appointment (step 1118—KEEP), then the scheduling engine keeps the appointment scheduled between the consumer and the supplier.

If another consumer sends a message to the scheduling engine to accept swapping their appointment time (step 1116—YES), then the scheduling engine swaps the appointment times between the consumers in step 1102. Thus, the scheduling engine sends a notification to the other consumer who accepted the swapped appointment, the consumer who requested to swap their appointment, and the supplier. Accordingly, the scheduling systems' application on each consumer device makes the respective changes to calendars stored on each consumer device and the supplier makes changes to their stored calendar.

Figure 12:
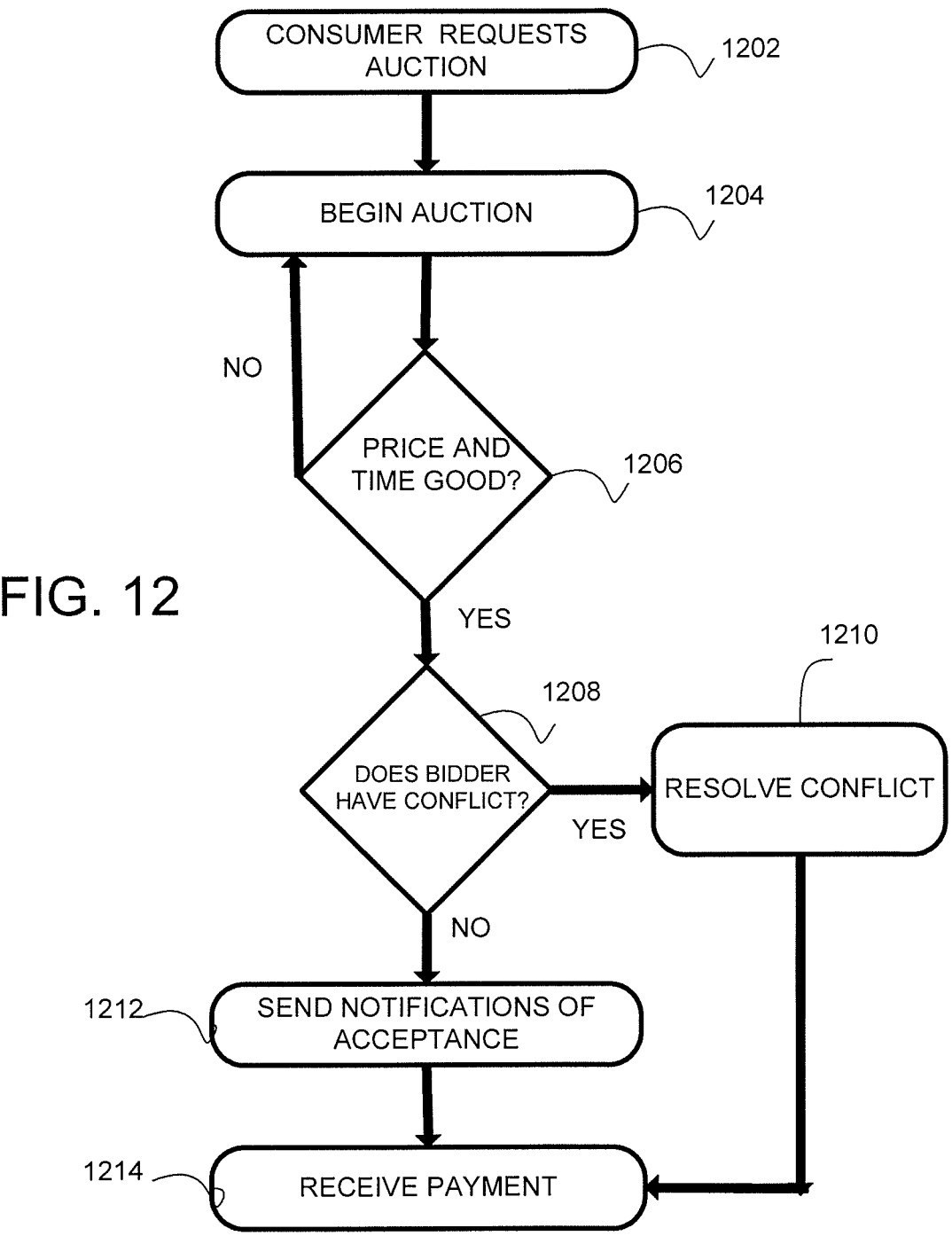

FIG. 12 depicts an example flow for initiating and conducting an auction for scheduled appointments. At step 1202, a consumer requests an auction to solicit an appointment time with a supplier from other consumers, or to auction an already existing appointment. In embodiments, the scheduling engine determines whether any consumers have flagged/tagged any of their scheduled appointments, stored within the consumer's profile by the scheduling system, to participate in an auction. Alternatively, the scheduling engine can push notifications to consumers that have desirable appointment times, for participation in an auction. If the consumer does not want to auction their appointment, then the scheduling engine notifies the requesting consumer that the appointment time is not available for auction and the auction process ends.

If one or more consumers indicate that they are interested in an auction, the scheduling engine proceeds with the auction at step 1204. In embodiments, the auction can have various parameters, such as a threshold amount of time to enter bids, a minimum bid, a particular type of auction (e.g., a Dutch auction, an English auction, silent auction, reverse auction etc.), and/or other parameters. At step 1206, the scheduling engine determines whether a bid has a price and time that are acceptable to the consumer, supplier, and/or the system itself. If the price and time are not acceptable (step 1206—NO), then the scheduling engine continues with the auction, at step 1204, until the price and time are accepted. If the price and time are acceptable (step 1206—YES), then the scheduling engine determines whether there are any appointment conflicts, at step 1208. For example, the system can determine whether the winning consumer has another appointment at the same time.

If there is an appointment conflict (step 1208—YES), then the scheduling engine resolves the conflict, at 1210. For example, the scheduling engine can request the consumer to cancel the conflicting appointment, swap the conflicting appointment with another time (e.g., as described in FIG. 11), and/or take any other types of action, at step 1210. If there is no resolution of the conflict, then the system will not schedule the appointment for the winning consumer, or other consumer requesting the appointment. If the conflict is resolved, at step 1212, the winning bidder is notified of the successful bid and, in embodiments, the appointment can be scheduled. At step 1214, the scheduling engine can receive payment from the winning bidder for the appointment time. In embodiments, the payment can be made by deducting credits or can be made by using a credit card, debit card, etc.

Figure 13:
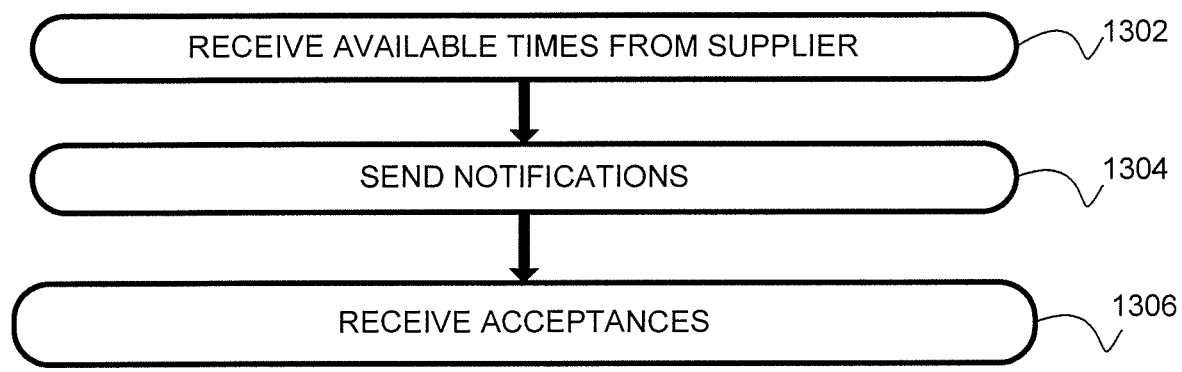

FIG. 13 depicts an example flow for a supplier to sell available times for appointments. At step 1302, the scheduling engine receives available times from the supplier which have not been scheduled. In embodiments, the supplier can pay a fee to promote the available times. At step 1304, the scheduling engine can send notifications to consumers who, based on their profiles, may be interested in an appointment with the supplier for a certain time and day. At step 1306, the scheduling engine can receive confirmation from one or more consumer who have selected to have an appointment with the supplier for the available time and day.

FIGS. 14, 15, 16A, 16B, 17A, 17B, 18A, 18B, 19-21, 22A, 22B, 23A, 23B, 24-26, 27A, 27B, and 28 show example screen shots in accordance with aspects of the present invention. In embodiments, the example displays illustrate the various user capabilities and functions of the present invention in order to schedule and/or change appointment times amongst consumers and different suppliers. In embodiments, the example displays can use touch screens (e.g., by touching, swiping, etc.), keypad inputs, and/or mouse selection inputs to select icons, buttons, images, and/or any other selectable portion of an example display. The example displays illustrate certain user actions and displays, e.g., the ability to touch, swipe, tap, and/or perform any other type of action. In embodiments, the consumer may provide through the displays: (i) consumer and family profile information; (ii) a date and time to schedule an appointment; (iii) search capabilities; (iv) confirm an appointment with the supplier; and/or (iv) other types of actions related to scheduling an appointment.

Figure 14:
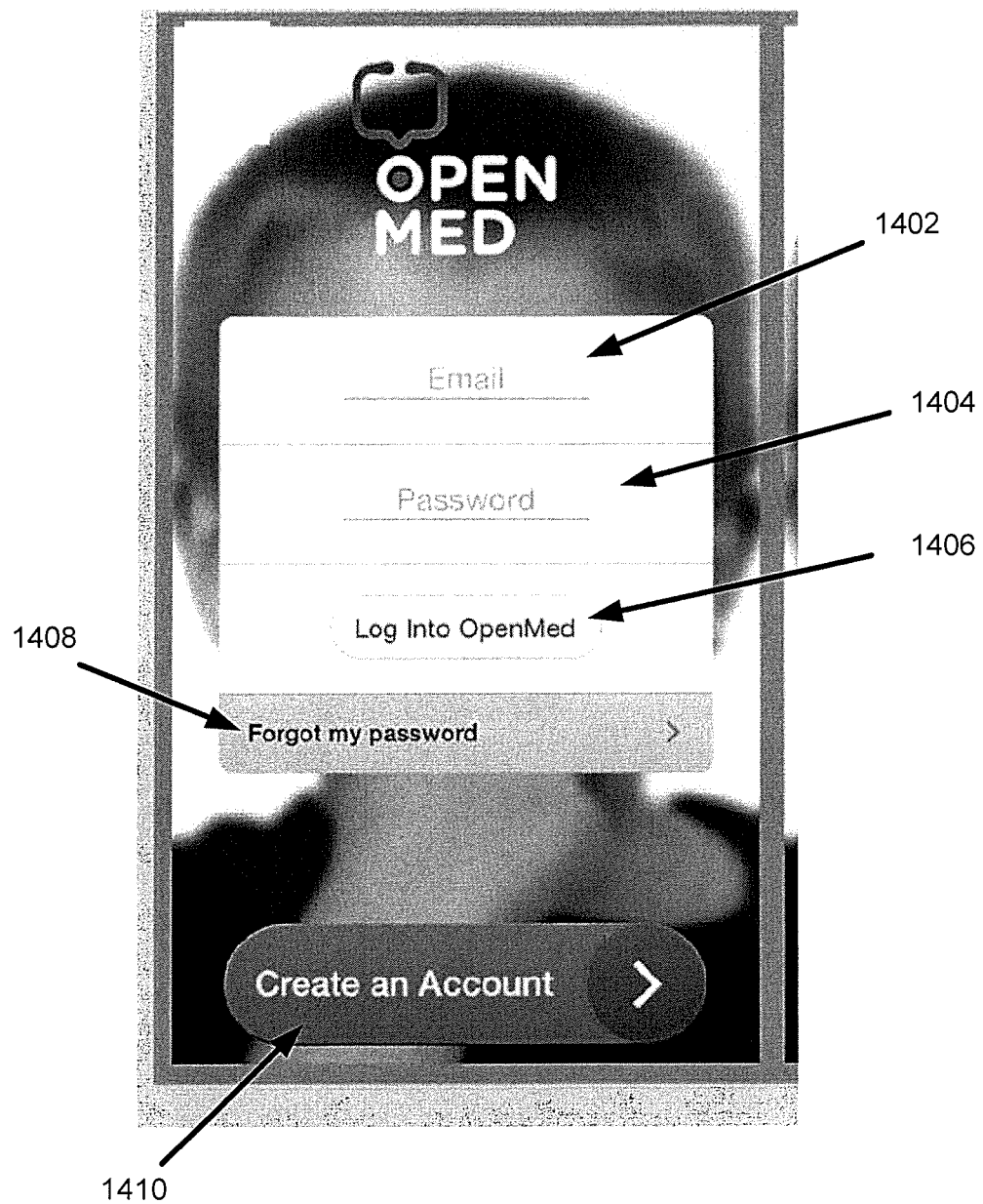

FIG. 14 shows an example display of a login page associated with a scheduling application downloaded on a consumer device (e.g., a smart phone). As shown in FIG. 14, the display includes email field 1402, password field 1404, login field 1406, forgot password field 1408, and create account field 1410. In embodiments, a registered consumer of the scheduling application can use their email address in email field 1402 as a user-name and can also enter their password in password field 1404. Once a registered consumer has entered their email address and password, the user can select login field 1406 to log into the scheduled application. If the consumer has forgotten their password, they can select forgot password field 1408 which will take them to other display screens which provide the consumer access based on validating the consumer's identity (e.g., answering a secret question, providing an account number, etc.). If the consumer is not registered with the scheduling application, the consumer can select create account field 1410.

Figure 15:
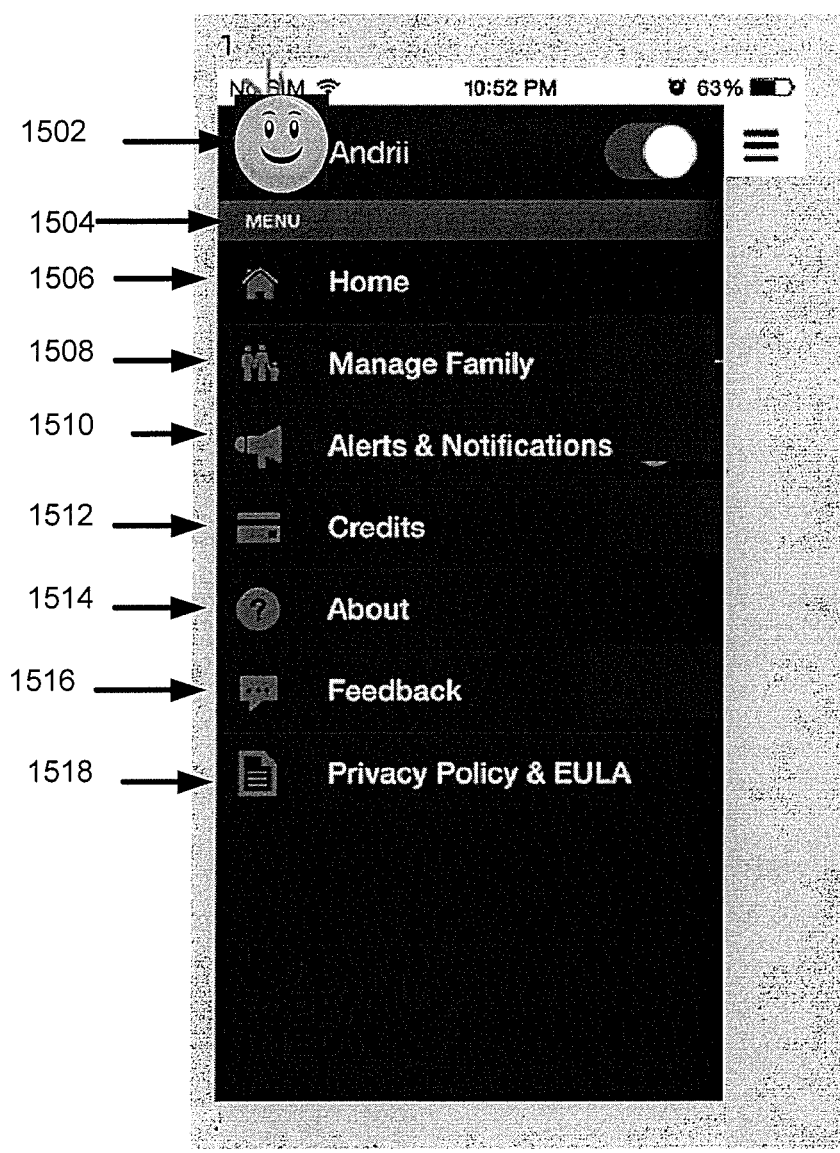

FIG. 15 shows an example display of a menu page associated with the scheduling application. As shown in FIG. 15, the display includes the following icons, scroll down fields, etc.: user icon 1502, menu 1504, home field 1506, manage family 1508, alerts and notifications 1510, credits 1512, about 1514, feedback 1516, and privacy policy 1518. In embodiments, the menu page is displayed to registered users who provided an email and password in the login page described in FIG. 14.

As shown in FIG. 15, in embodiments, user icon 1502 indicates the consumer's identification, such as an icon or title. In embodiments, menu 1504 indicates that the user is viewing the main menu page. In embodiments, home 1506 can be a selectable icon or button that allows the scheduling application to display a home page. In embodiments, the home page can include the consumer's identifier and family members. This allows for the consumer or his/her family members to select their identifier and make changes/updates to appointments for themselves or someone else.

In embodiments, manage family 1508 can be a selectable icon/button that allows the scheduling application to display a series of screens associated with information about multiple family members whose appointments are managed by the consumer. In embodiments, alerts and notifications 1510 can be a selectable icon/button that allows the scheduling application to display alerts regarding upcoming appointments, cancellations, auctions, and/or any other event that can affect an appointment. In embodiments, credits 1512 can be a selectable icon/button that displays a screen that shows the number of credits currently stored by the application. In embodiments, the credits can be used to purchase appointments or pay for fees associated with changes to appointments, amongst other things. In embodiments, about 1514 can be a selectable icon/button that displays information about the scheduling application (e.g., corporate information, legal information, etc.). In embodiments, feedback 1516 can be a selectable icon/button that displays a screen that allows the consumer to provide messages regarding improvements to the consumer experience with the application or information about the suppliers, for example. In embodiments, privacy policy 1518 can be a selectable icon/button that displays the privacy policies of the scheduling application.

Figure 16B:
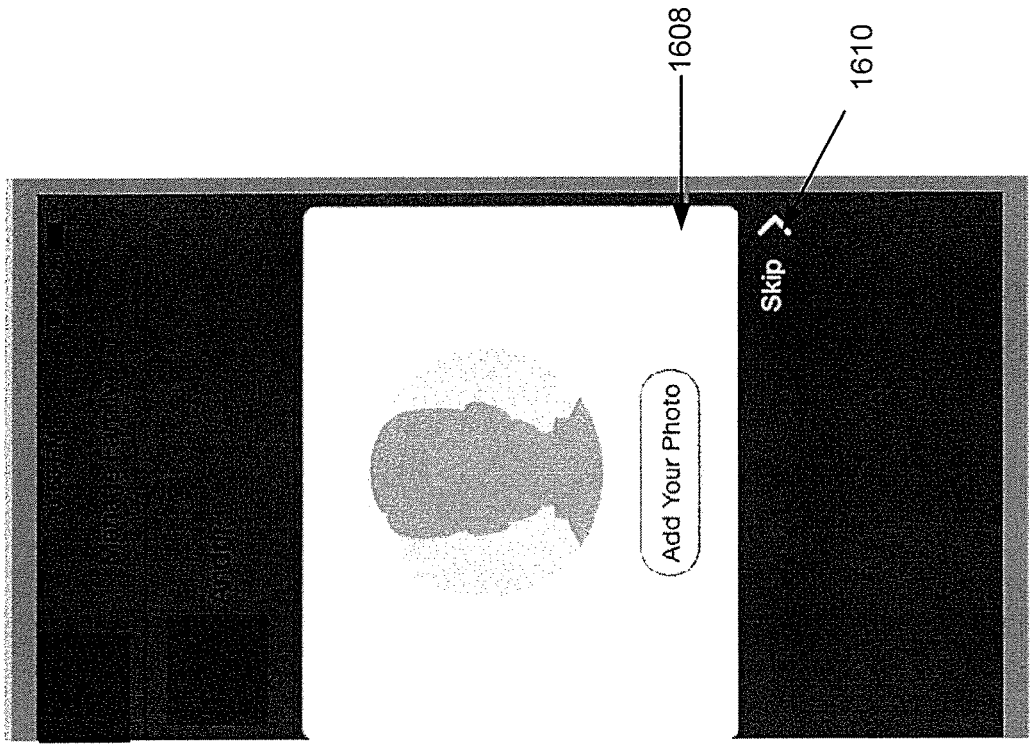
Figure 16A:
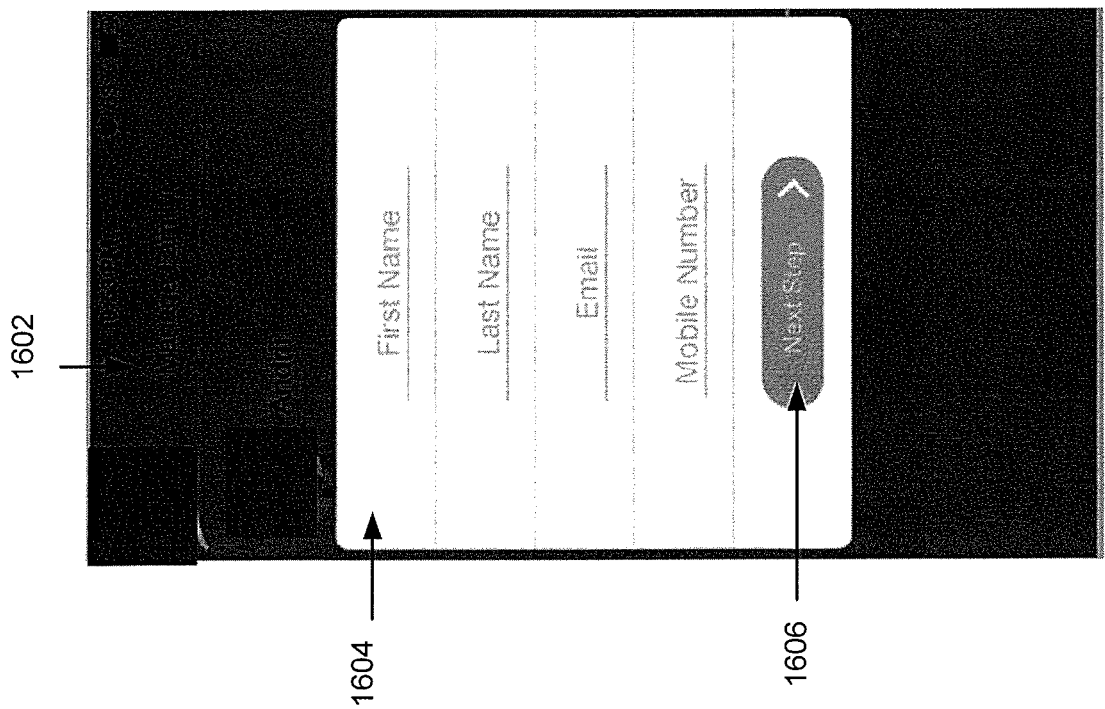

FIGS. 16A and 16B show example displays for managing family members. By using these displays, a single application can be used to schedule appointments for any number of consumers. As shown in FIG. 16A, the display includes manage family 1602, personal information 1604, next step 1604. As shown in FIG. 16B, the display includes add photo 1608 and skip selection 1610. In embodiments, manage family 1602 is an icon that indicates to the consumer that they are on a screen that is used to manage family members and the consumer. In embodiments, personal information 1604 allows a consumer to enter their own or a family member's name, email address, and mobile number, or other information. Once the personal information is entered, the consumer can select next step 1604 which will take the user to another display, such as that shown in FIG. 16B. In embodiments, the consumer can use add photo 1608 to add a photo of himself or a family member into the scheduling application. Rather than just using names, this allows for an improved consumer experience by using photos to identify the consumer and their family members since the photo imagery provides greater distinctiveness between different users. If the consumer does not want to add a photo, then the consumer can select skip selection 1610.

Figures 17A, 17B:
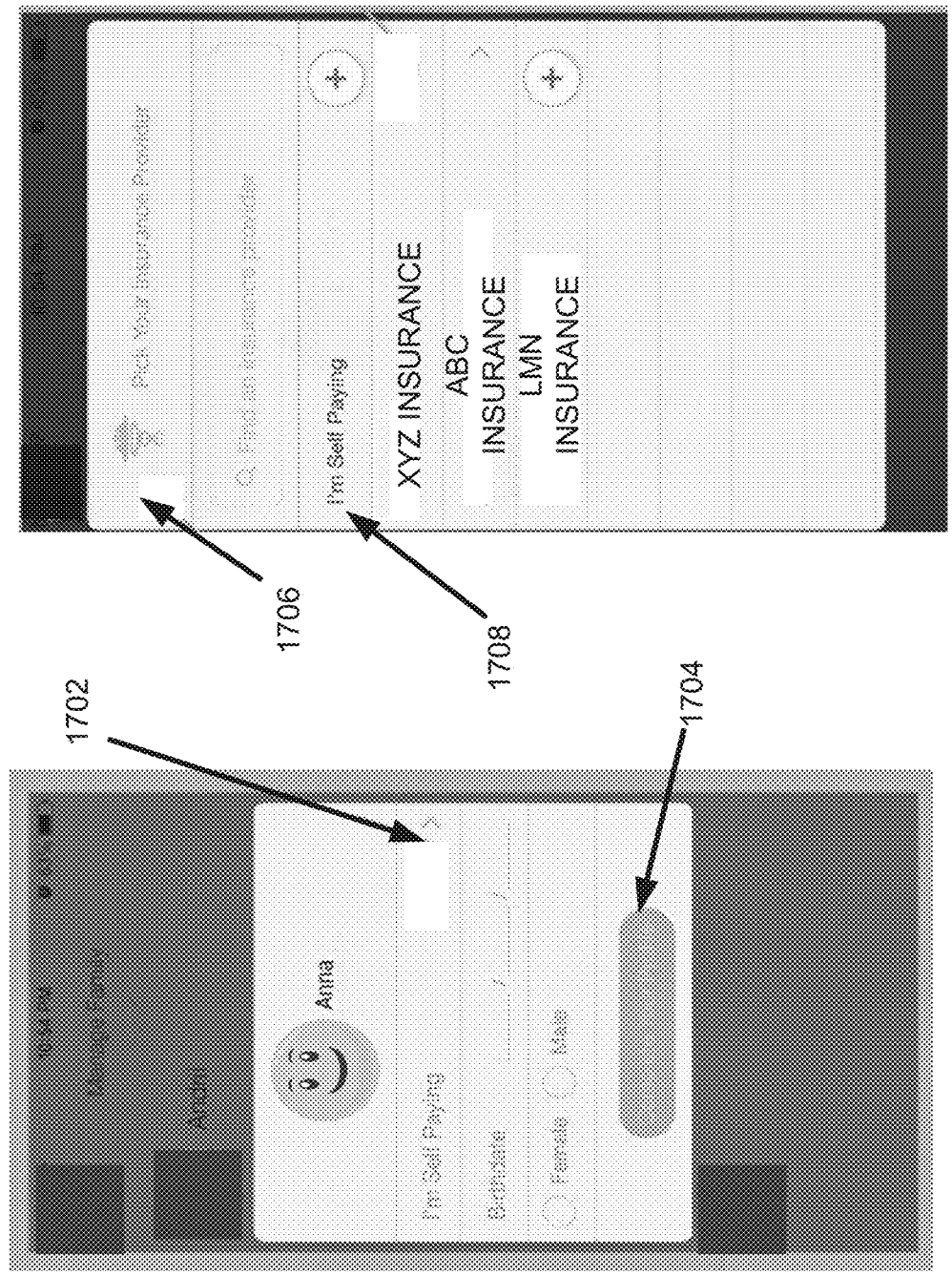

FIGS. 17A and 17B show example displays for providing demographic and financial information for a selected consumer. As shown in FIG. 17A, the display includes demographics 1702 and complete profile 1704. As shown in FIG. 17B, the display includes insurance 1706, and payment method 1708, and search 1710. In FIG. 17A, demographics 1702 includes one or more selections that allow the consumer to enter information about themselves or family members. This includes whether the particular individual is self paying (e.g., no insurance use), birth date, and the individual's gender, amongst other things. Once entered, the consumer can use complete profile 1704 to complete the profile information of that individual, whether it is the consumer or a family member. In FIG. 17B, insurance 1706 indicates that the consumer is on a display associated with picking or confirming insurance provider information. As shown, payment method 1708 includes a number of options to the consumer. For example, the consumer can select that they are self-paying or that they are going to use one of the displayed insurance suppliers, such as XYZ insurance. The consumer can also use search 1710 to search for a particular insurance provider that may not be displayed.

Figure 18B:
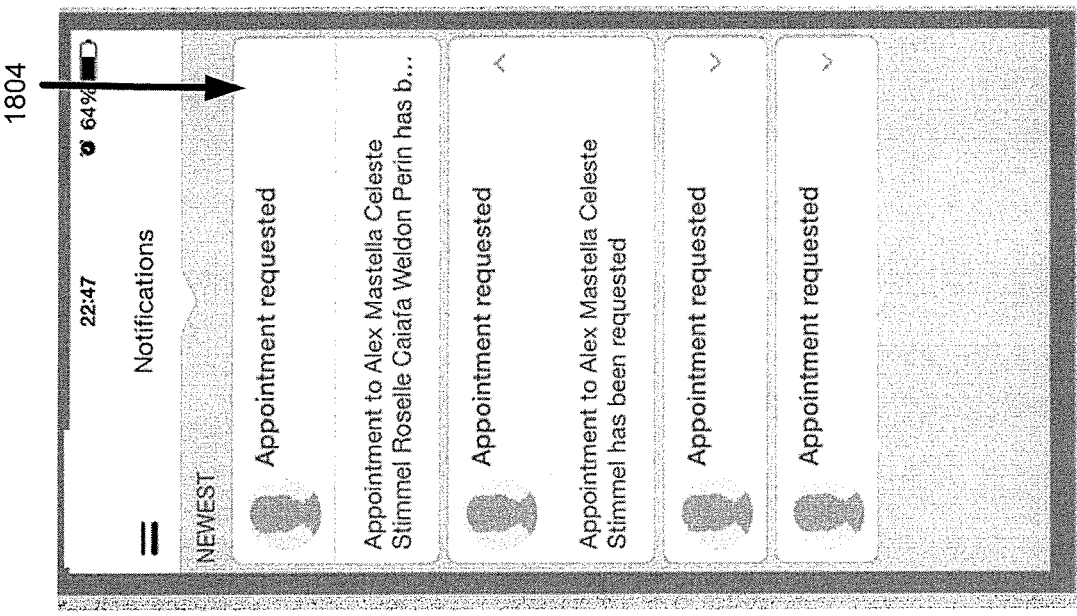
Figure 18A:
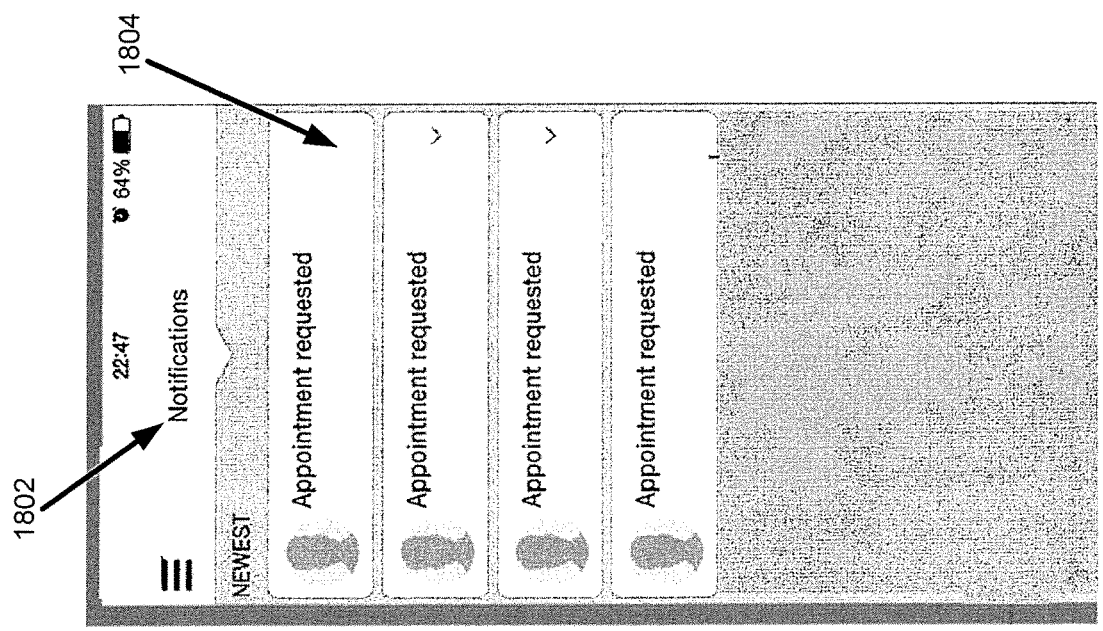

FIGS. 18A and 18B show example displays for notifications for a selected consumer. As shown in FIG. 18A, the display includes notifications 1802 and appointment requested 1804. As shown in FIG. 18B, the display includes appointment requested 1804. As shown in FIG. 18A, notifications 1802 indicates that the consumer is on a display associated with notifications. Appointment requested 1804 is an icon/button that when selected provides the consumer with additional information which is shown in FIG. 18B. As shown in FIG. 18B, the consumer has selected appointment requested 1804 and is viewing additional information which notifies the consumer regarding any alerts or notifications, such as changes, cancellations, etc.

Figure 19:
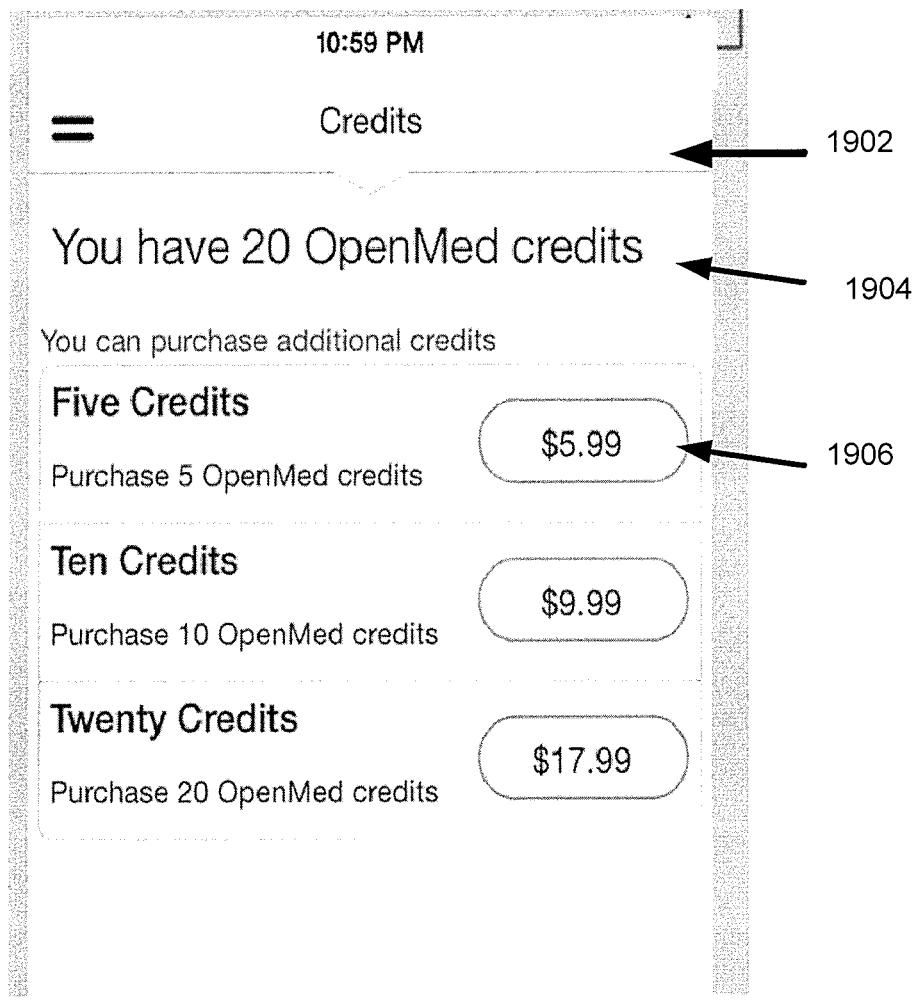

FIG. 19 shows an example display for providing or displaying credit information. As shown in FIG. 19, the display includes credits 1902, purchased credits 1904, and credit selection 1906. In FIG. 19, credits 1902 indicates to the consumer that they are on the credits page. Purchased credits 1904 indicates how many credits have been purchased by the consumer (e.g., 20 OpenMed credits). Credit selection 1906 allows the consumer to purchase additional credits (e.g. five credits, 10 credits, etc.) for a particular amount of money (e.g., $5.99, $9.99, etc.).

Figure 20:
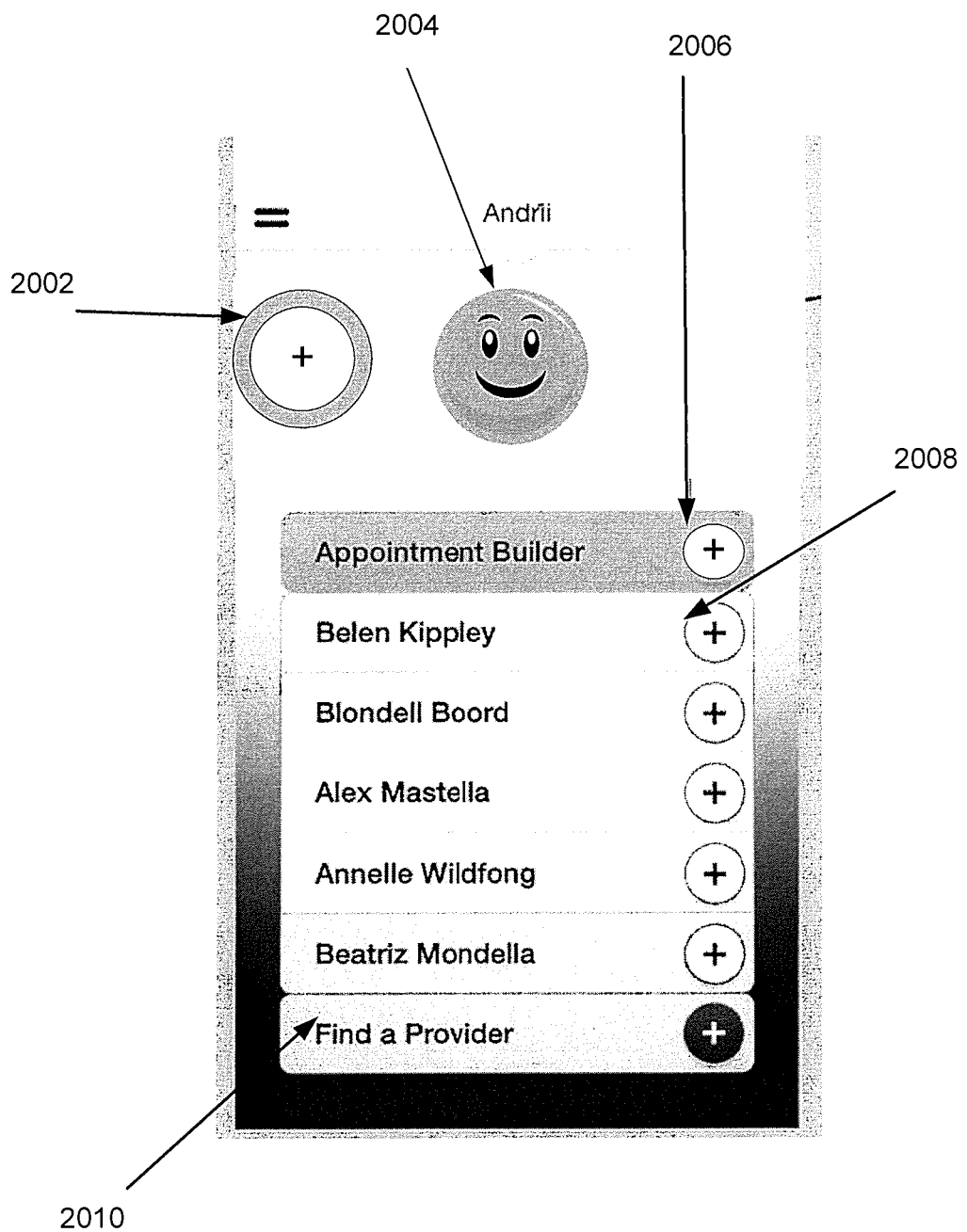

FIG. 20 shows an example display for creating an appointment. As shown in FIG. 20, the display includes selection 2002, user icon 2004, appointment builder 2006, appointments 2008, and find provider 2010. As shown in FIG. 20, selection 2002 is an icon/button that allows the consumer to select other family members associated with the consumer's account. In FIG. 20, the consumer has currently selected Andrii by using user icon 2004. Once the consumer has selected themselves or a family member, the consumer can select appointment builder 2006 to schedule an appointment which in this example display is for Andrii. Appointments 2008 show multiple icons/buttons that are appointments associated with other individuals. For example, by selecting "Belen Kippley," the consumer would be shown Belen's appointments and also to schedule new appointments. Find provider 2010 allows the consumer to select a supplier with the appointment.

Figure 21:
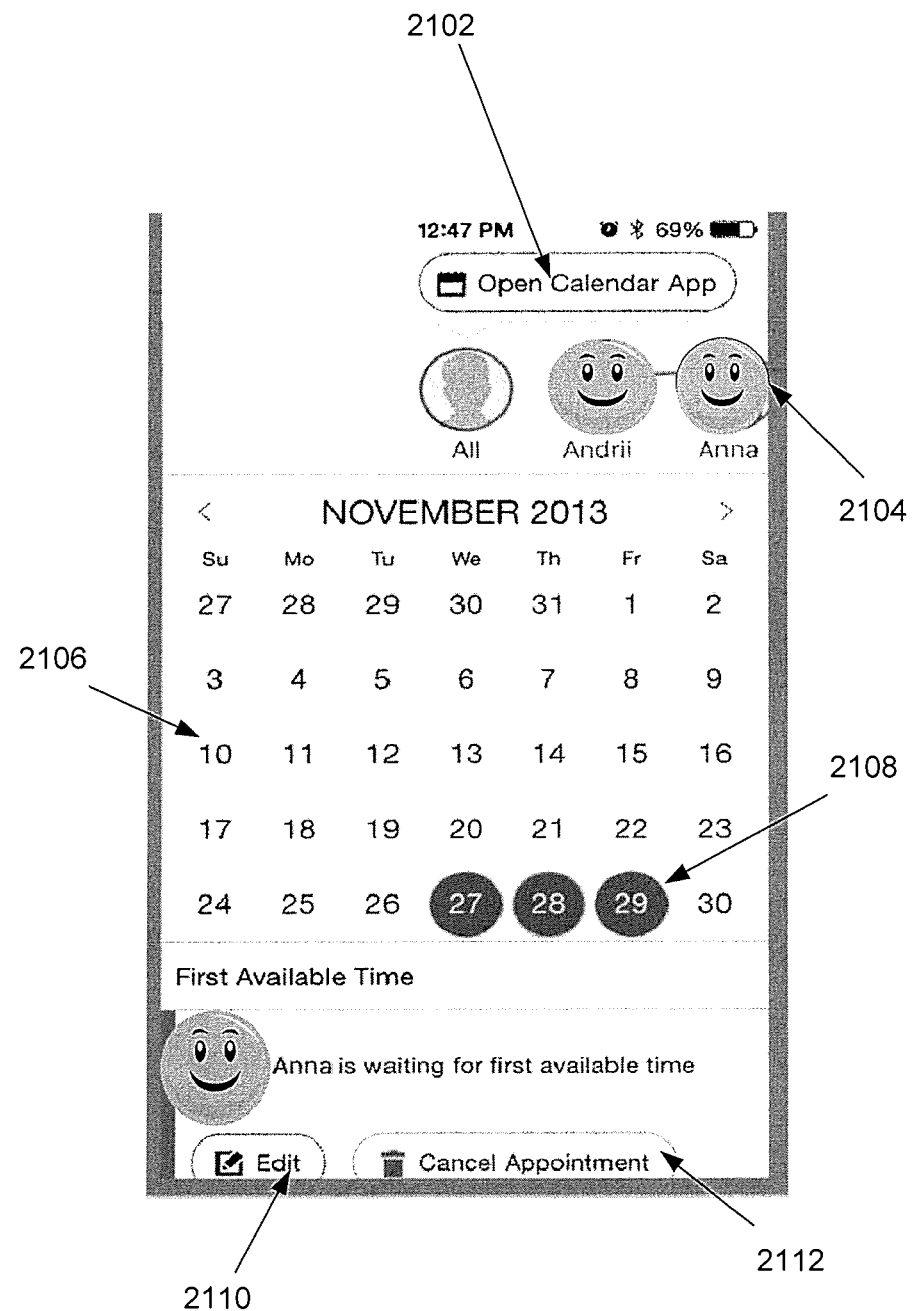

FIG. 21 shows an example display for creating an appointment. As shown in FIG. 21, the display includes open calendar application 2102, user icon 2104, calendar 2106, blocked dates 2108, edit 2110, and cancel appointment 2112. As shown in FIG. 21, open calendar application 2102 is a selectable icon/button that allows for the consumer to use a calendar to select dates for scheduling an appointment. Furthermore, user icon 2104 shows which user is scheduling the appointment, which in this example is Anna. Calendar 2106 shows a calendar with selectable dates. In FIG. 21, the calendar shows that November 27, 28, and 29, are blocked and are not available for appointments. The consumer can use calendar 2106 to select a date for a requested appointment. Edit 2110 allows the consumer to edit previously selected appointments, and cancel appointment 2112 allows the consumer to cancel the appointment.

FIGS. 22A and 22B show example displays for creating an appointment. As shown in FIG. 22A, the display includes message 2202, keypad 2204 and done 2206. As shown in FIG. 22B, the display includes appointment 2208, supplier type 2210, message title 2212, date request 2214, find provider 2216, scrollable calendar 2218, and done 2220. In FIG. 22A, message 2202 shows an area of the screen that allows to the consumer to create a personalized message. The consumer can use keypad 2204 to enter the message. In embodiments, keypad 2204 can be a touch-screen keypad displayed on the device screen. Once the message is entered, the consumer can select done 2206 and the consumer can be taken to FIG. 22B.

In FIG. 22B, appointment 2208 indicates to the consumer that they are on an appointment creation screen. FIG. 22B shows supplier type 2210 which indicates the type of supplier that the consumer is interested in visiting. In embodiments, the consumer can select supplier type 2210 to change or initially enter the supplier type. Message title 2212 shows the title of the message created by the consumer, as described in FIG. 22A. This message will be sent to the supplier upon completion of the consumer's selections. Find provider 2216 is a selectable icon/button that will send the consumer to other display screens and allows the consumer to find a particular provider. Scrollable calendar 2218 allows the consumer to select a date and time for the appointment and done 2220 allows the consumer to complete the appointment request information. Once completed, the consumer can send the request to the selected supplier and await confirmation of the appointment.

Figure 23B:
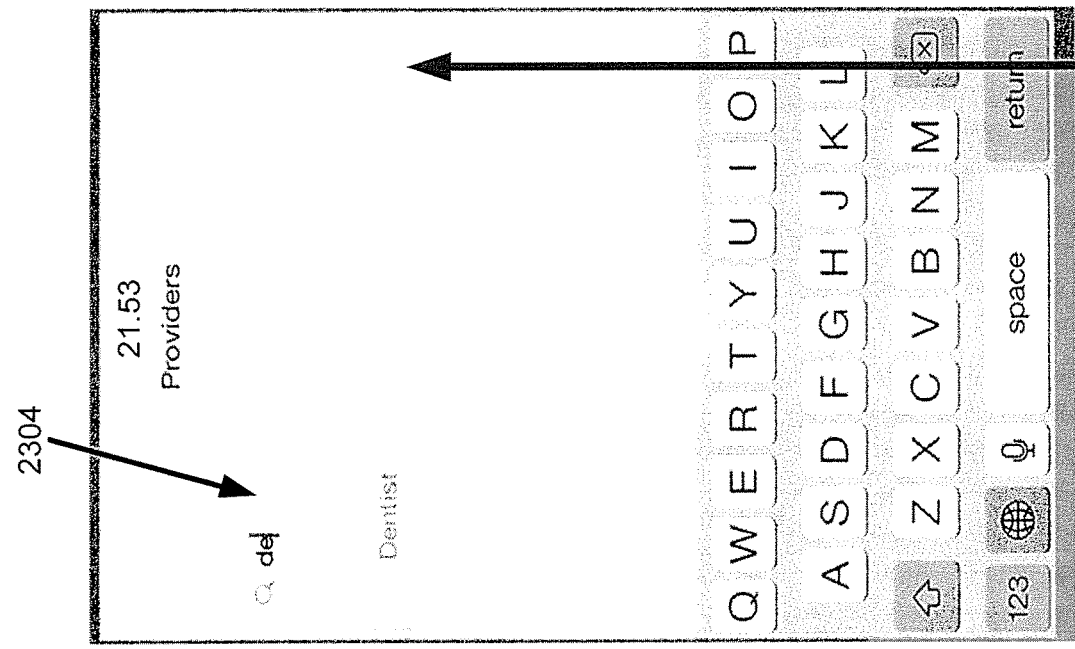
Figure 23A:
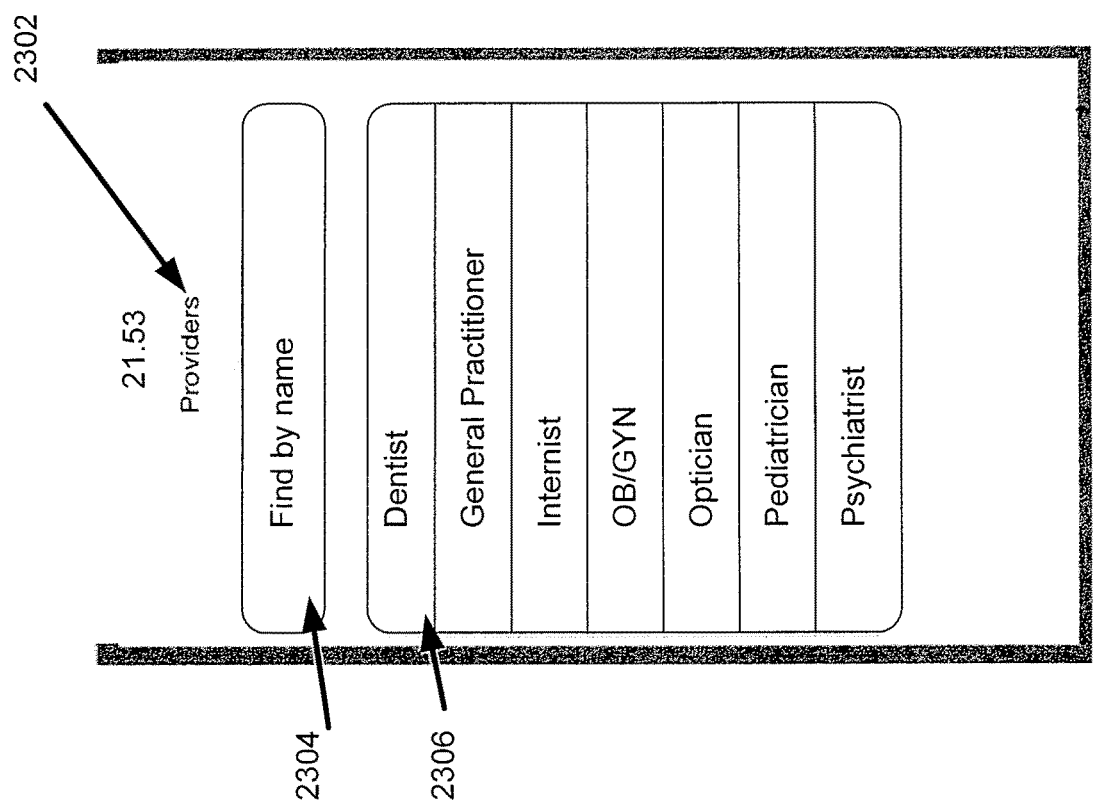

FIGS. 23A and 23B show example displays for selecting a provider. As shown in FIG. 23A, the display includes provider 2302, search 2304, and provider types 2304. As shown in FIG. 23B, the display includes search 2304 and results 2308. In FIG. 23A, provider 2302 indicates to the consumer that they are on a display for finding suppliers. Search 2304 allows the consumer to search for suppliers by entering a particular name of a provider or the type of provider, for example. Provider types 2304 provides the consumer with an alternative option for searching for suppliers by showing a list of different types of suppliers. In FIG. 23B, the consumer has entered several letters to search for a provider. As shown, the consumer has entered "de," into search field 2304 and results 2308 shows "dentists." Thus, the consumer can find suppliers based on using personalized search terms.

Figure 24:
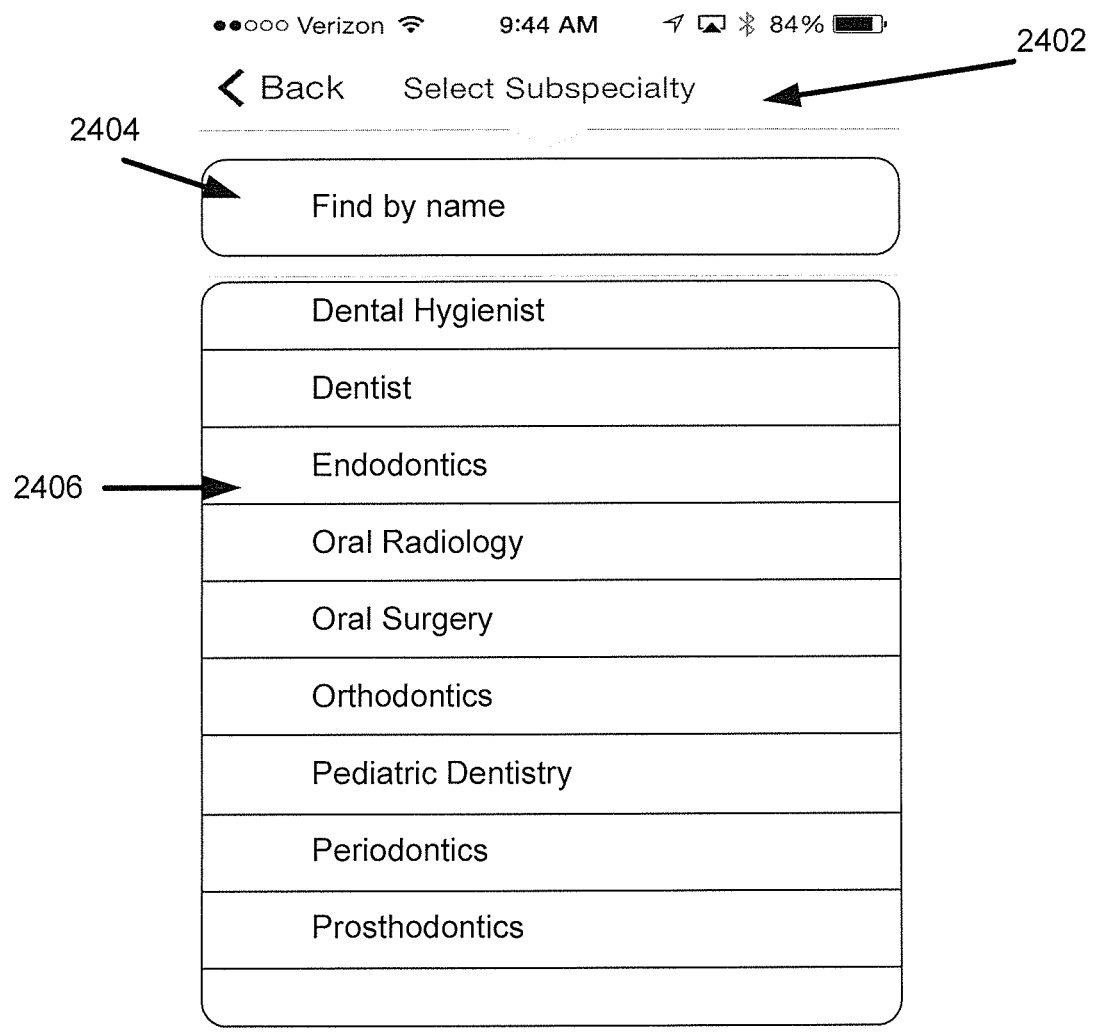

FIG. 24 shows an example display for selecting a sub-specialty of a supplier. This allows a more granular search by the consumer. As shown in FIG. 24, the display includes sub-specialty 2402, search 2404, and sub-specialty list 2406. As shown in FIG. 24, sub-specialty 2402 indicates to the consumer that they are on a display for finding suppliers based on a sub-specialty. Search 2404 allows the consumer to search for a type of sub-specialty or a particular supplier's name. When selected, sub-specialty list 2406 allows the consumer to find a supplier name entered in search field 2404 within that particular sub-specialty. For example, if the consumer enters "Dr. Smith" into search field 2404 and selects "Oral Surgery," then the consumer is provided with doctors named "Dr. Smith" who specialize in oral surgery.

Figure 25:
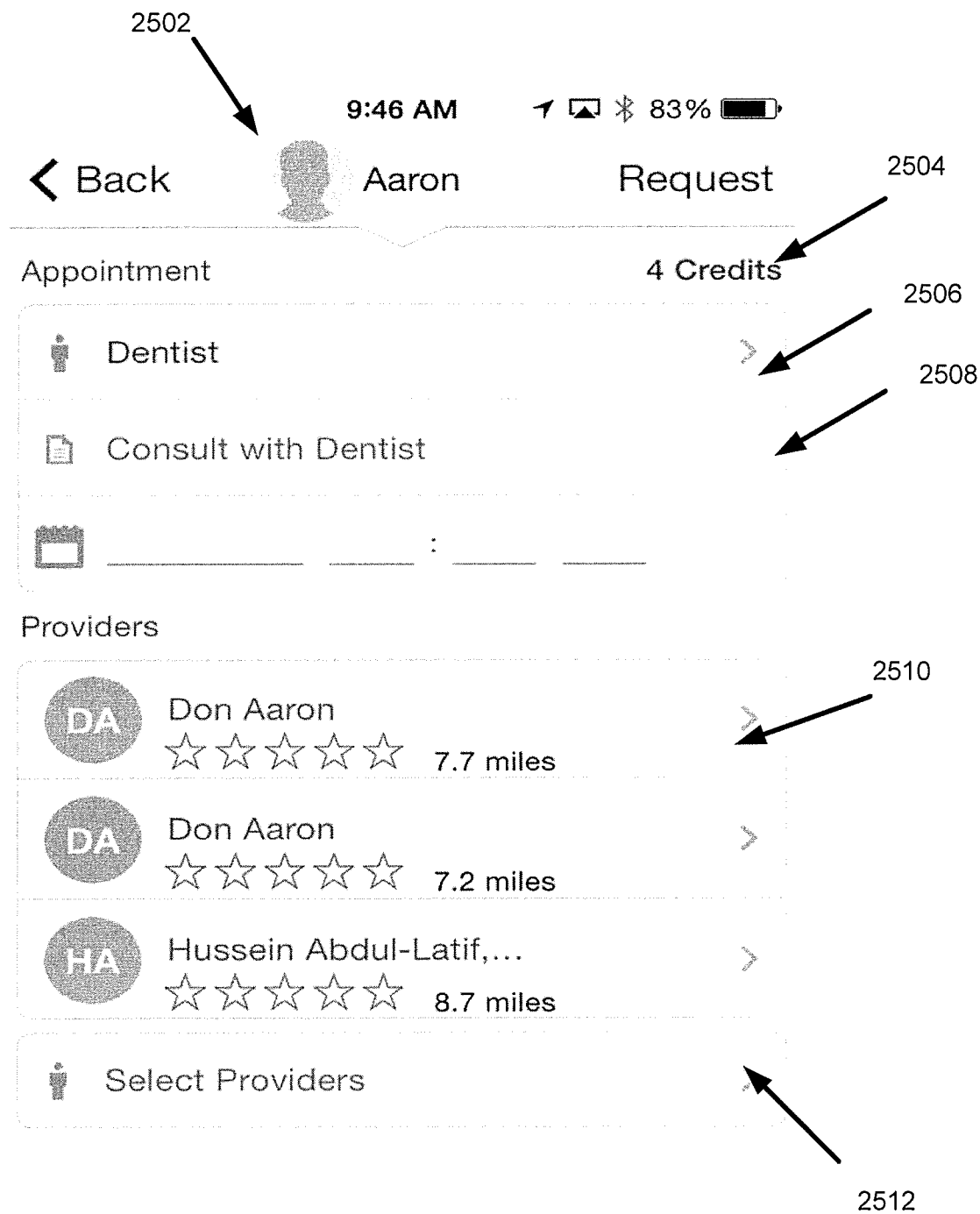

FIG. 25 shows an example display that provides supplier search results to the consumer. As shown in FIG. 25, the display includes user identifier 2502, credit amount 2504, supplier type 2506, appointment reason 2508, supplier results 2510, and select suppliers 2512. In FIG. 25, user identifier 2502 indicates which consumer or family member is requesting the appointment. Credit amount 2504 indicates how many credits are required to schedule the appointment. While four credits are shown, appointments can be scheduled for zero credits (i.e., for free), or any other credit amount. Supplier type 2506 indicates the type of supplier and appointment reason 2508 indicates the reason for the appointment. The consumer can select supplier type 2506 to change the supplier and also can change the reason for the appointment by selecting appointment reason 2508.

Supplier results field 2510 indicates the search results based on the consumer's inputs into the application. As shown, the search results include the supplier's name, the distance between the supplier and the consumer, and stars that can be used rate the supplier. Selecting one of the supplier results (e.g., touching, swiping, etc.) can bring up additional information about the supplier, such as address, years in practice, gender, etc. If the consumer highlights/selects on the search results, then select suppliers 2512 allows the consumer to select that particular supplier for an appointment.

Figure 26:
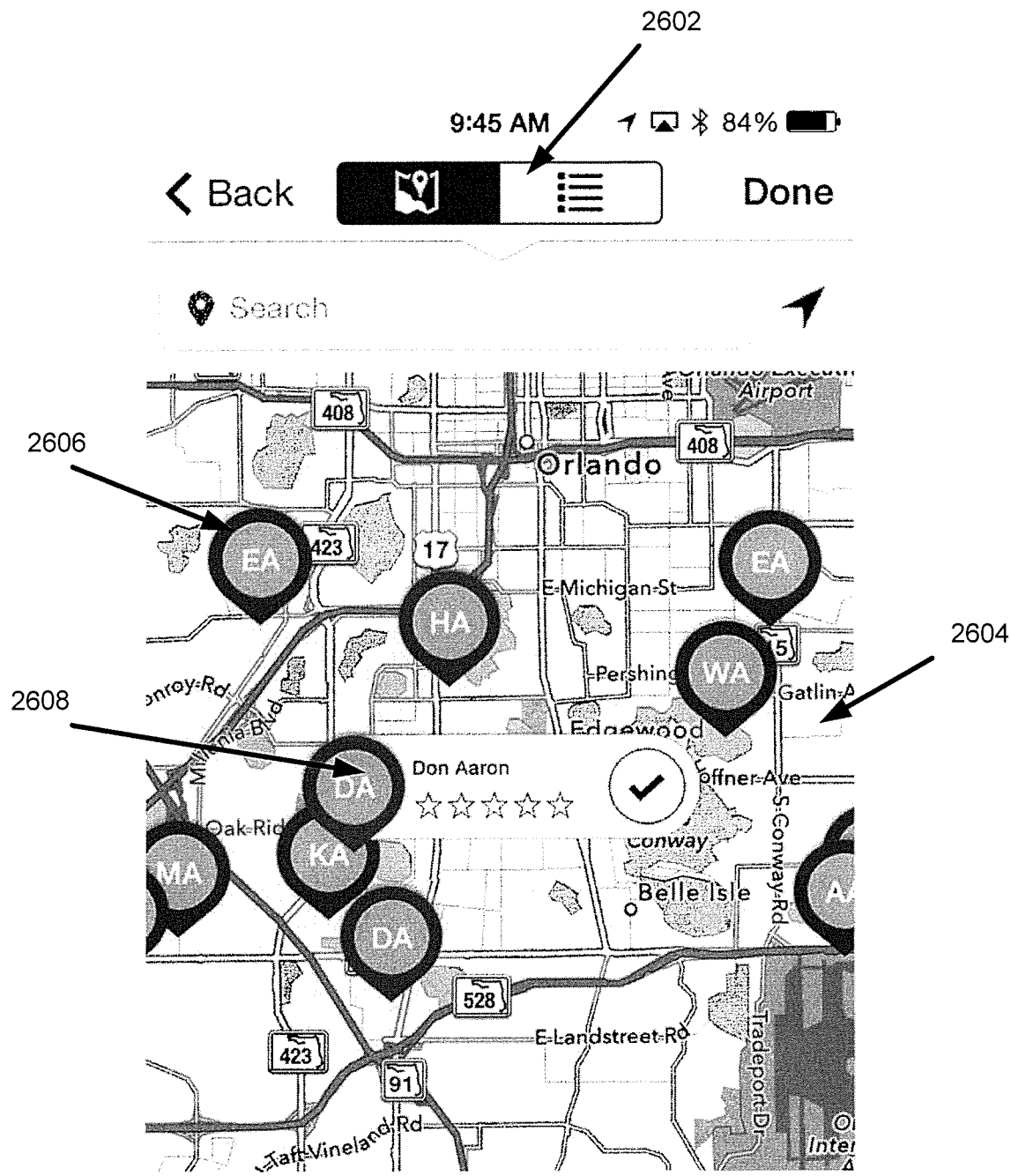

FIG. 26 shows an example display that provides the search results in a displayed graphical map. As shown in FIG. 26, the display includes search result type 2602, map 2604, icon 2606, and icon 2608. As shown in FIG. 26, search result type 2602 allows the consumer to select the search results in a map display or as a list; which in this example, the consumer has selected the map display. Map 2604 shows a map with icons that show the locations of one or more suppliers that were generated by the consumer's search. As shown in map 2604, icon 2606 indicates a supplier by the supplier's initials (e.g., "EA," "HA," etc.). The icons can be differentiated by identifying those suppliers that were part of the consumer's search results and those suppliers that were not part of the search results but may be of interest to the consumer based a partial match to the consumer's search criteria. For example, as shown in FIG. 26, icon 2606 is differently colored from icon 2608 since icon 2608 was part of the consumer's search results. By providing suppliers who did not match the consumer's search results, the consumer is provided with additional supplier choices.

Further as shown in FIG. 26, by selecting an icon, additional information can be displayed regarding a particular supplier. As shown in FIG. 26, selecting icon 2608 shows the supplier's name and also a rating; however, selecting icon 2608 can also show other information such as address, specialty, etc., of the particular supplier.

Figures 27A, 27B:
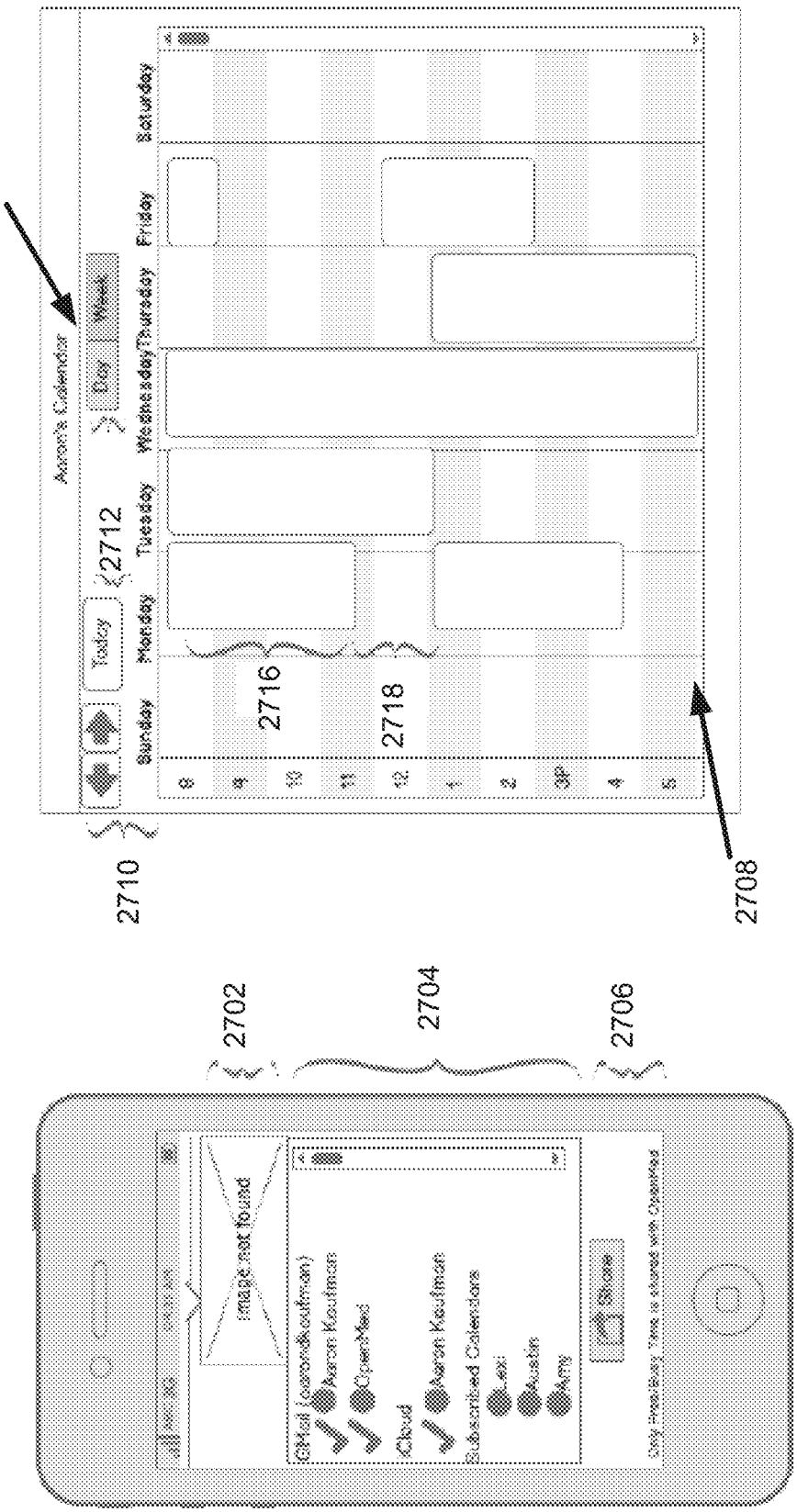

FIGS. 27A and 28B show example displays for integrating the consumer's calendar into the supplier's scheduling system. As shown in FIG. 27A, the display includes image 2702, calendar types 2704, and share 2706. As shown in FIG. 27B, the display includes calendar 2708, buttons 2710, day 2712, date selection 2714, time block 2716, and free time 2718. In FIG. 27A, image 2702 indicates an image for a particular consumer or no image if one was never provided. Calendar types 2704 allow the consumer to select the calendar with which they wish to share with the scheduling application and also with the supplier. Once the consumer has selected the calendar types, the consumer can select share 2706 to share the calendar information with the supplier. This allows the supplier to determine alternate times if the consumer's requested appointment cannot be fulfilled by the supplier.

FIG. 27B shows calendar 2708 that is displayed on the supplier's device. As shown in FIG. 27B, calendar 2708 does not show any specific information about other appointments made by the consumer, but whether blocks of times are free or busy. This is a graphical interface that shows free and busy time of the consumer, e.g., times in which the consumer may be available for an appointment. As shown in FIG. 27B, buttons 2710 allow the supplier to select different days or weeks. Day 2712 shows a particular day selected by the supplier (e.g., today). Date selection 2714 allows the supplier to display different periods of time (e.g., day, week, etc.) with buttons 2710. Time block 2716 shows a block of time that is not available on the consumer's calendar. Thus, the supplier is made aware of non-available times and can provide alternate times that do not conflict with consumer's calendar. Free time 2718 shows a period of time within calendar 2708 that is available for an appointment. Thus, the supplier can use calendar 2708 and analyze available times by matching available times within the supplier's own calendar. In embodiments, the supplier can integrate calendar 2708 into their own system and automatically generate another calendar or a list of times that shows times that are available to both the supplier and the consumer. The display shown in FIG. 27B can be implemented by the calendar integration module and/or free/busy time module shown in FIG. 3.

Figure 28:
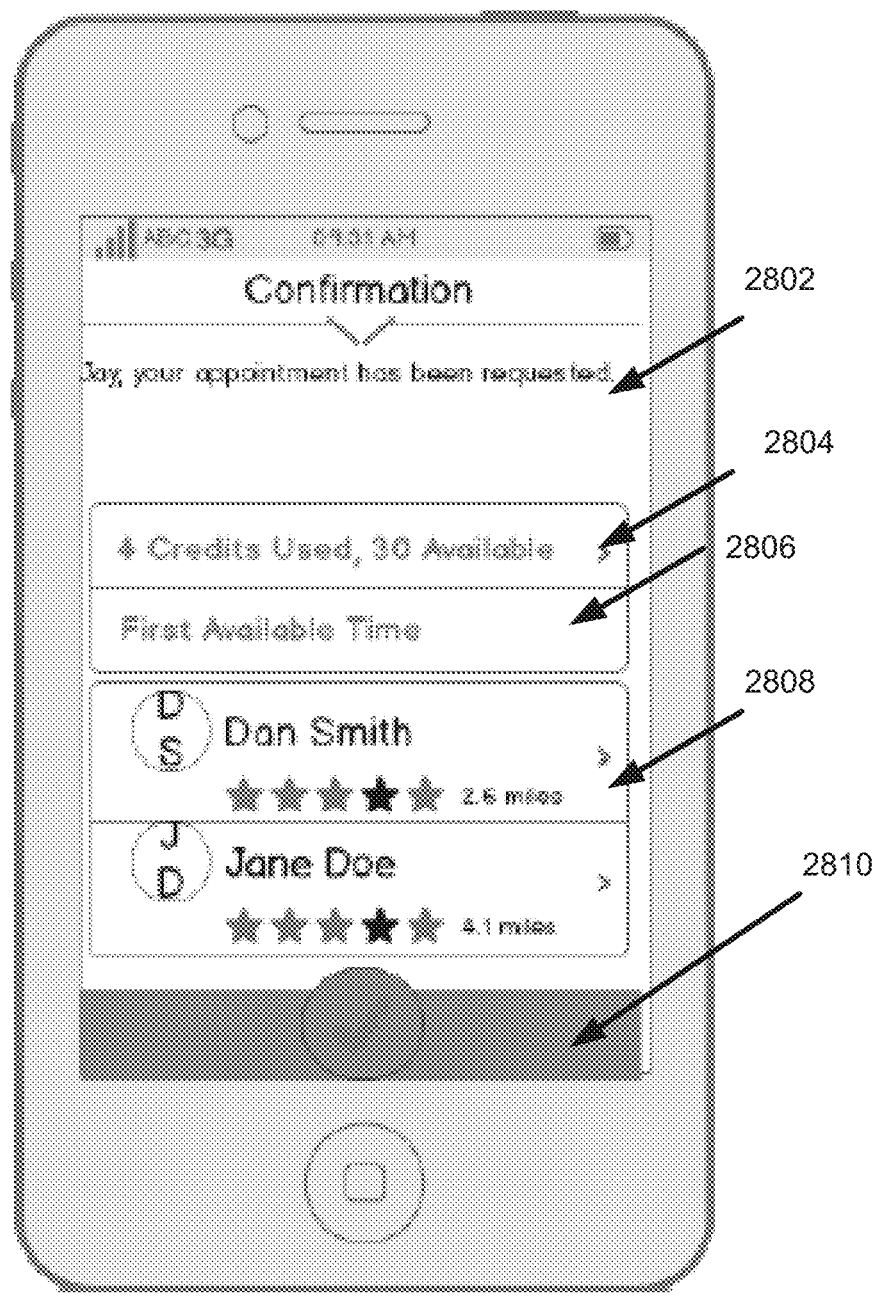

FIG. 28 shows an example display for confirming an appointment. As shown in FIG. 28, the display includes confirmation message 2802, credits used 2804, appointment time 2806, selected suppliers 2808, and confirm 2810. As shown in FIG. 28, confirmation message 2802 indicates to the consumer that the supplier has accepted the consumer's appointment request. Credits used 2804 indicates to the consumer the number of credits used to schedule the appointment and the number of credits left in the consumer's account. Appointment time 2806 indicates the time of the appointment. As shown in FIG. 28, the consumer has selected the first available time. As such, when the first available time becomes available from one or more selected suppliers, the consumer will be provided that time for an appointment. Selected suppliers 2808 shows the suppliers that agreed to the consumer's appointment request. Confirm 2810 indicates a check mark that indicates that the appointment request was accepted. Alternatively, confirm 2810 can be a cross shaped mark that indicates that the appointment request was not accepted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
   prior to a registration process for scheduling an appointment request from a consumer:
      gather information of a plurality of suppliers on a single integrated agnostic computing system from one or more external sources including one or more servers or databases within a networking environment by using an application programming interface (API) of the single integrated agnostic computing system to data mine for the information associated with the suppliers by sending a message requesting the information to the one or more external sources, the one or more external sources being different computing platforms in the networking environment;
      store the gathered information in a storage module, wherein the information being gathered and stored is integrated into the single integrated agnostic computing system from the different computing platforms;
      validate that the stored information of the plurality of suppliers is correct by using a verification module which implements a matching algorithm for the stored information;
      remove non-validated information of the stored information of the plurality of suppliers by using a data cleanser module to delete the stored information that cannot be validated; and
      remove duplicate information of the stored information of the plurality of suppliers by using the data cleanser module to check whether the stored information matches previous information stored in the storage module;
   receive an appointment request from a computing device of the consumer through an email message for scheduling an appointment with one or more of the plurality of suppliers which meet consumer criteria, at least prior to the registering of the one or more of the plurality of suppliers;
   send a request to the one or more of the plurality of suppliers that meet the consumer criteria to register on the single integrated agnostic computing system, after receiving the appointment request from the consumer;
   register the one or more of the plurality of suppliers on the single integrated agnostic computing system by sending a message to the one or more of the plurality of suppliers to register and receiving registration information through at least one supplier device from the one or more of the plurality of suppliers, after receiving the appointment request from the computing device of the consumer;
   validate the registration information of the one or more of the plurality of suppliers on the single integrated agnostic computing system, after registering the one or more of the plurality of suppliers, wherein validating the registration information received from the one or more of the plurality of suppliers comprises:
      generating a code that is sent to the computing device of the at least one registering supplier as a digitized message to ensure that the registration information is not from another source, and
      validating that a received code from the computing device of the at least one registering supplier matches the generated code;
   access a corresponding supplier calendar of the one or more of the plurality of suppliers for scheduling the appointment request;
   provide a notification to the computing device of the consumer through an electronic messaging system if no appointments can be scheduled in response to the appointment request not meeting the consumer criteria and the corresponding supplier calendar of the one or more of the plurality of suppliers; and
   provide available suppliers to the computing device of the consumer based on the consumer criteria, after receiving the request for scheduling of the appointment.

2. The method of claim 1, further comprising storing the information of the plurality of suppliers in one or more databases.

3. The method of claim 1, wherein the gathering of the information of the plurality of suppliers further comprises at least one of sending alerts/pings and notifications to computing devices to request information associated with plurality of suppliers.

4. The method of claim 1, wherein the one or more external sources include social networks.

5. The method of claim 1, further comprising determining whether the one or more of the plurality of suppliers are already registered and, if so, continuing with the scheduling of the appointment for the consumer.

6. The method of claim 1, further comprising escalating the request when the one or more of the plurality of suppliers do not register within a predetermined time period.

7. The method of claim 1, wherein the validating of the registration information received from the one or more of the plurality of suppliers further comprises generating tokens that are sent to the validated computing device of the registering supplier.

8. The method of claim 1, wherein the available suppliers are a perceived quantity of suppliers, any of which may not be registered to schedule the appointment request.

9. The method of claim 1, further comprising storing scheduled appointment times.

10. The method of claim 1, wherein the providing of the available suppliers to the consumer is further based on a proximity to a time period of the requested scheduling of the appointment.

11. The method of claim 1, wherein the providing of the available suppliers to the consumer comprises overlaying identifiers of the available suppliers onto a map or providing a list.

12. The method of claim 1, further comprising integrating a calendar of the consumer with a scheduling application of at least one of the available suppliers in order to coordinate a time for a scheduled appointment.

13. The method of claim 1, further comprising determining a best match for the appointment.

14. The method of claim 1, further comprising providing at least one of auctioning services, purchasing services and swapping services for scheduled appointments.

15. The method of claim 14, wherein the purchasing services comprises a first consumer offering to obtain, with or without a fee, a scheduled appointment of a second consumer.

16. The method of claim 14, wherein the purchasing services comprises the consumer with the schedule appointment offering to sell or give away the scheduled appointment to another consumer.

17. The method of claim 1, further comprising providing an alternate time for scheduling an appointment when a requested time is not available.

18. The method of claim 1, further comprising providing an alternate schedule time to the consumer based on a known free time of the consumer as shown in a shared calendar.

19. The method of claim 18, wherein the shared calendar only shows free times of the consumer.

20. The method of claim 19, wherein the shared calendar is one of multiple calendars on a consumer device and is selectable by the consumer to share with available suppliers.

21. The method of claim 1, further comprising the one or more of the plurality of suppliers initiating a registration process without prompting.

22. The method of claim 1, further comprising:
tracking canceled or missed appointments of the consumer, and scheduling the appointment for the consumer during off peak hours in response to the consumer having a history of canceled or missed appointments; and
if the received code is not received from a validated computing device, providing escalating notifications to the registering supplier.

23. The method of claim 1, wherein the providing of the available suppliers to the computing device of the consumer occurs prior to the registering of the one or more of the plurality of suppliers.

24. The method of claim 1, wherein the providing of the available suppliers to the computing device of the consumer occurs after the validating of the stored information.

25. The method of claim 1, further comprising integrating schedules of the computing device of the consumer and the at least one supplier device onto the single integrated agnostic computing system to schedule the appointment of the consumer.

26. A computer program product for scheduling appointments, the computer program product comprising program code stored in a non-transitory storage medium for implementation on a computing device to:
prior to scheduling an appointment request from a consumer:
gather information of a plurality of non-registered suppliers on a single integrated agnostic computing system from one or more external resources including one or more servers or databases within a networking environment by using an application programming interface (API) of the single integrated agnostic computing system to data mine for the information associated with the plurality of non-registered suppliers by sending a message requesting the information to the one or more external sources, the one or more external sources being different computing platforms in the networking environment;
store the gathered information in a storage module, wherein the information being gathered and stored is integrated into the single integrated agnostic computing system from the different computing platforms;
after gathering and storing the information of the plurality of non-registered suppliers:
validate that the stored information of the plurality of non-registered suppliers is correct by using a verification module which implements a matching algorithm for the stored information;
remove non-validated information of the stored information of the plurality of non-registered suppliers by using a data cleanser module to delete the stored information that cannot be validated;
remove duplicate information of the stored information of the plurality of non-registered suppliers by using the data cleanser module to check whether the stored information matches previous information stored in the storage module;
receive an appointment request from a computing device of the consumer through an email message for scheduling of an appointment with one or more suppliers from the computing device of the consumer which meets consumer criteria, after gathering and storing the information of the plurality of non-registered suppliers;
access a corresponding supplier calendar for the one or more suppliers for scheduling the appointment request;
provide a notification to the computing device of the consumer through an electronic messaging system if no appointments can be scheduled in response to the appointment request not meeting the consumer criteria and the corresponding supplier calendar for the one or more suppliers;
provide one or more perceived available suppliers to the computing device of the consumer, based on the consumer criteria received from the consumer, the one or more perceived available suppliers being a subset of non-registered or registered suppliers that initially meet at least one of the consumer criteria requested from the computing device of the consumer, the providing of the one or more perceived available suppliers being provided in response to the appointment request;
provide a calendar to the computing device of the consumer of selected ones of the one or more perceived available suppliers for entry of dates by the consumer to schedule the appointment, the calendar being representative of a calendar or appointment scheduling program of the one or more perceived available suppliers, wherein providing the calendar to the computing device of the consumer comprises:
obtaining graphical and textual information from at least one supplier device of the one or more perceived available suppliers, and
converting the graphical and textual information of the at least one supplier device into a calendar format that can be viewed by the computing device of the consumer;
obtain graphical and textual information from a schedule of the computing device of the consumer;
convert the graphical and textual information from the computing device of the consumer into a calendar format that can be viewed by the at least one supplier device;
integrate the schedule of the converted graphical and textual information of the computing device of the consumer with the schedule of the converted graphical and textual information of the at least one supplier device onto the single integrated agnostic computing system to schedule the appointment of the consumer; and schedule the appointment for the consumer using the integrated schedule on the single integrated agnostic computing system.

27. The computer program product of claim 26, further comprising program code to send the converted graphical and textual information from the computing device of the consumer with at least one data filled in for the one or more perceived available suppliers to accept.

28. A mobile application system comprising:

a central processing unit (CPU);

a computer readable non-transitory storage medium; and program instructions stored on the computer readable non-transitory storage medium for execution by the CPU to:

receive information of one or more available suppliers of a plurality of registered and/or non-registered suppliers on a single integrated agnostic system from one or more external sources including a data server which has data mined from other computing devices within a networking environment by using an application programming interface (API) of the single integrated agnostic computing system to data mine for the information associated with the plurality of registered and/or non-registered suppliers by sending a message requesting the information to the one or more external sources, the one or more external sources being different computing platforms in the networking environment;

store the gathered information in a storage module, the one or more external sources being different computing platforms in the networking environment and the information being received and stored is integrated into the single integrated agnostic computing system from the different computing platforms;

after receiving and storing the information of the plurality of registered and/or non-registered suppliers;

validate that the stored information of the plurality of registered and/or non-registered suppliers is correct by using a verification module which implements a matching algorithm for the stored information;

remove non-validated information of the stored information of the plurality of registered and/or non-registered suppliers by using a data cleanser module to delete the stored information that cannot be validated; and remove duplicate information of the stored information of the plurality of registered and/or non-registered suppliers by using the data cleanser module to check whether the stored information matches previous information stored in the storage module;

send a request from a consumer to schedule an appointment with one or more suppliers that meet one or more consumer criteria through a computing device of the consumer;

access a corresponding supplier calendar of the one or more suppliers for scheduling the appointment;

provide a notification to the computing device of the consumer through an electronic messaging system if no appointments can be scheduled in response to the request not meeting the consumer criteria and the corresponding supplier calendar for the one or more suppliers;

provide a perceived calendar to the computing device of the consumer of a selected one or more available suppliers of the plurality of registered and/or non-registered suppliers for entry of dates by the consumer to schedule the appointment, the perceived calendar being a representative calendar of at least one possible supplier, wherein providing the perceived calendar to the computing device of the consumer comprises:

obtaining graphical and textual information from at least one supplier device of the one or more available suppliers that initially meets at least one consumer criteria, and converting the graphical and textual information into a calendar format that can be viewed by the computing device of the consumer;

send the perceived calendar with consumer entered dates for the scheduled appointment to the selected one or more available suppliers through the at least one supplier device for confirmation of the scheduled appointment or proposed alternate dates, after providing the perceived calendar;

obtain graphical and textual information from a schedule of the computing device of the consumer;

convert the graphical and textual information from the computing device of the consumer into a calendar format that can be viewed by the at least one supplier device; and integrate the converted graphical and textual information of the computing device of the consumer with the converted graphical and textual information of the at least one supplier device onto the single integrated agnostic computing system to schedule the appointment of the consumer.

29. The mobile application system of claim 28, wherein the perceived calendar is a facsimile of a calendar of the at least one possible supplier that initially meets at least one consumer criteria.

* * * * *